(12) United States Patent
Zhou et al.

(10) Patent No.: US 12,301,449 B2
(45) Date of Patent: May 13, 2025

(54) PATH DETECTION METHOD, APPARATUS, AND COMPUTER STORAGE MEDIUM

(71) Applicant: Huawei Technologies Co., Ltd., Shenzhen (CN)

(72) Inventors: Tianran Zhou, Beijing (CN); Yuezhong Song, Beijing (CN)

(73) Assignee: HUAWEI TECHNOLOGIES CO., LTD., Shenzhen (CN)

(\*) Notice: Subject to any disclaimer, the term of this patent is extended or adjusted under 35 U.S.C. 154(b) by 420 days.

(21) Appl. No.: 17/692,629

(22) Filed: Mar. 11, 2022

(65) Prior Publication Data

US 2022/0200896 A1 Jun. 23, 2022

Related U.S. Application Data

(63) Continuation of application No. PCT/CN2020/115043, filed on Sep. 14, 2020.

(30) Foreign Application Priority Data

Sep. 12, 2019 (CN) .......................... 201910866651.1
Oct. 24, 2019 (CN) .......................... 201911017639.X

(51) Int. Cl.
*H04L 45/00* (2022.01)
*H04L 45/12* (2022.01)
(Continued)

(52) U.S. Cl.
CPC ............ *H04L 45/26* (2013.01); *H04L 45/124* (2013.01); *H04L 45/24* (2013.01); *H04L 43/0829* (2013.01); *H04L 47/34* (2013.01)

(58) Field of Classification Search
CPC ....... H04L 45/26; H04L 45/124; H04L 45/24; H04L 45/02; H04L 43/0829; H04L 47/34
(Continued)

(56) References Cited

U.S. PATENT DOCUMENTS 7,274,711 B2    9/2007  Kajizaki et al.
9,584,419 B1\*   2/2017  Gilgur ..................... H04L 47/11
(Continued)

FOREIGN PATENT DOCUMENTS

CN      101695048 A    4/2010
CN      101958847 A    1/2011
(Continued)

OTHER PUBLICATIONS

R. Hinden, "IPv6 Minimum Path MTU Hop-by-Hop Option," draft-ietf-6man-mtu-option-00, Aug. 9, 2019, 16 pages.
(Continued)

*Primary Examiner* — Candal Elpenord
(74) *Attorney, Agent, or Firm* — Conley Rose, P.C.

(57) ABSTRACT

A path detection method includes a source node that sends a first detection packet including multipath detection indication information and detection data collection indication information, to detect a plurality of paths from the source node to a destination node. A first node directly sends the first detection packet including the multipath detection indication information and the detection data collection indication information to a next-hop node such that the next-hop node of the first node collects detection data in a manner of the first node and no path from the source node to the destination node is missed.

9 Claims, 16 Drawing Sheets

(51) Int. Cl.
*H04L 45/24* (2022.01)
*H04L 43/0829* (2022.01)
*H04L 47/34* (2022.01)

(58) Field of Classification Search
USPC .......................................................... 370/392
See application file for complete search history.

(56) References Cited

U.S. PATENT DOCUMENTS

| | | | |
|---|---|---|---|
| 10,063,447 | B2 | 8/2018 | Pignataro et al. |
| 2001/0055317 | A1 | 12/2001 | Kajizaki et al. |
| 2009/0225758 | A1 | 9/2009 | Morimoto et al. |
| 2012/0051236 | A1* | 3/2012 | Hegde ................. H04L 63/1441 370/252 |
| 2015/0003255 | A1* | 1/2015 | Frost ....................... H04L 45/24 370/238 |
| 2016/0142224 | A1 | 5/2016 | Yoshida et al. |
| 2016/0248749 | A1* | 8/2016 | Mahapatra ............ H04L 69/166 |
| 2018/0077026 | A1* | 3/2018 | Li .......................... H04L 45/02 |
| 2018/0091418 | A1 | 3/2018 | Gao et al. |
| 2020/0028770 | A1* | 1/2020 | Li ............................ H04L 45/74 |
| 2020/0177498 | A1* | 6/2020 | Thomas .................. H04L 43/10 |
| 2020/0259758 | A1* | 8/2020 | Vytla .................... H04L 69/166 |
| 2022/0078090 | A1* | 3/2022 | Sinha .................. H04L 41/5009 |

FOREIGN PATENT DOCUMENTS

| | | |
|---|---|---|
| CN | 102217378 A | 10/2011 |
| CN | 105099937 A | 11/2015 |
| CN | 107872332 A | 4/2018 |
| CN | 108259261 A | 7/2018 |
| CN | 109600322 A | 4/2019 |
| CN | 110995583 A | 4/2020 |
| EP | 3293917 A1 | 3/2018 |

OTHER PUBLICATIONS

P. Lapukhov, et al, "Data-plane probe for in-band telemetry collection," draft-lapukhov-dataplane-probe-01, Jun. 10, 2016, 14 pages.

* cited by examiner

PATH DETECTION METHOD, APPARATUS, AND COMPUTER STORAGE MEDIUM

CROSS-REFERENCE TO RELATED APPLICATIONS

This is a continuation of International Patent Application No. PCT/CN2020/115043 filed on Sep. 14, 2020, which claims priority to Chinese Patent Application No. 201911017639.X filed on Oct. 24, 2019, which claims priority to Chinese Patent Application No. 201910866651.1 filed on Sep. 12, 2019. The disclosures of the aforementioned applications are hereby incorporated by reference in their entireties.

TECHNICAL FIELD

This application relates to the field of routing technologies, and in particular, to a path detection method, an apparatus, and a computer storage medium.

BACKGROUND

With development of routing technologies, a plurality of paths from a source node to a destination node may be deployed. In this scenario, the plurality of paths from the source node to the destination node usually need to be detected, to obtain detection data such as topologies and performance of the plurality of paths from the source node to the destination node, so as to perform operation, management, and maintenance (OAM) on the plurality of paths from the source node to the destination node.

In a related technology, as shown in FIG. 1, a source node R1 sends a detection packet including a multipath information address segment to an intermediate node R2. It is assumed that the multipath information address segment is (0-200). When receiving the detection packet, the intermediate node R2 determines that there are two next-hop intermediate nodes R3 and R6 to a destination node R5, and determines whether multipath information address segments of the two intermediate nodes R3 and R6 fall within (0-200). If the multipath information address segments of the two intermediate nodes R3 and R6 fall within (0-200), for example, if the multipath information address segments of the two intermediate nodes R3 and R6 are (0-100) and (100-200) respectively, the intermediate node R2 returns the multipath information address segments (0-100) and (100-200) of the two intermediate nodes R3 and R6 to the source node R1, and the source node R1 re-sends two detection packets based on the multipath information address segments (0-100) and (100-200) of the intermediate nodes R3 and R6. After receiving the detection packets, the intermediate nodes R3 and R6 each perform a same operation as the intermediate node R2, until a detection packet sent by the source node R1 arrives at the destination node R5. In this way, paths from the source node R1 to the destination node R5 can be detected.

In the foregoing path detection manner, for the intermediate node R2, if a multipath information address segment of either of the intermediate nodes R3 and R6 does not fall within (0-200), the multipath information address segment returned by the intermediate node R2 to the source node does not include the multipath information address segment of the intermediate node. In this way, a detection packet subsequently re-sent by the source node cannot be sent to all next-hop intermediate nodes. That is, detection in the foregoing path detection manner is inaccurate. In addition, in the foregoing path detection manner, the source node needs to send a detection packet to each intermediate node before determining a next-hop intermediate node of the intermediate node. Consequently, the source node needs to send a relatively large quantity of detection packets in an entire path detection process, resulting in low detection efficiency.

SUMMARY

This application provides a path detection method, an apparatus, and a computer storage medium, to improve path detection efficiency and accuracy. The technical solutions are as follows.

According to a first aspect, a path detection method is provided, and the method is performed by a first node in a communications network. The communications network includes a source node, one or more intermediate nodes, and a destination node. The first node is any one of the one or more intermediate nodes. In this method, the first node receives a first detection packet including multipath detection indication information and detection data collection indication information, where the multipath detection indication information is used to indicate that the detection packet is used to detect a plurality of paths from the source node to the destination node, and the detection data collection indication information is used to indicate a type of to-be-collected detection data. The first node adds detection data to the first detection packet based on the multipath detection indication information and the detection data collection indication information, and sends, to a next-hop node of the first node, the first detection packet to which the detection data is added.

According to the path detection method provided in this embodiment of this application, the source node only needs to send the first detection packet including the multipath detection indication information and the detection data collection indication information, to detect a plurality of paths from the source node to the destination node. After receiving the first detection packet, each node on the plurality of paths may obtain detection data based on the multipath detection indication information and the detection data collection indication information in the first detection packet, and add specific detection data to the first detection packet, to implement multipath detection. In this way, the source node can detect a path without repeatedly sending a detection packet, thereby improving path detection efficiency. In addition, because the source node sends the first detection packet including the multipath detection indication information and the detection data collection indication information to a next-hop node, each node on the plurality of paths collects detection data and adds specific detection data based on the multipath detection indication information and the detection data collection indication information in the packet, so that no path from the source node to the destination node is missed, thereby improve path detection accuracy.

Optionally, the type of to-be-collected detection data is a path topology from the source node to the destination node and/or a packet loss rate on the path from the source node to the destination node. When the type of to-be-collected detection data includes the packet loss rate on the path from the source node to the destination node, the first detection packet further includes a packet sequence number. In this scenario, the detection data includes an identity of the first node, an identity of an ingress for receiving the first detection packet, and an identity of an egress for sending the first detection packet.

In this embodiment of this application, the multipath topology or the path packet loss rate can be detected by collecting the identity of the first node, the identity of the ingress for receiving the first detection packet, and the identity of the egress for sending the first detection packet, thereby further improving path detection efficiency. Therefore, the path detection method provided in this embodiment of this application can be widely used.

Optionally, when the first node has at least two next-hop nodes to a destination of the first detection packet, for example, the at least two next-hop nodes include a second node and a third node, that the first node sends, to a next-hop node of the first node, the first detection packet to which the detection data is added includes that the first node sends, to the second node, the first detection packet to which the identity of the first node, the identity of the ingress for receiving the first detection packet, and an identity of a first egress for sending the first detection packet are added, where the first node is connected to the second node through a first port identified by the identity of the first egress for sending the first detection packet, and the first node sends, to the third node, the first detection packet to which the identity of the first node, the identity of the ingress for receiving the first detection packet, and an identity of a second egress for sending the first detection packet are added, where the first node is connected to the third node through a second port identified by the identity of the second egress for sending the first detection packet.

In this embodiment of this application, when the first node has a plurality of next-hop nodes to the destination of the detection packet, the first node needs to send the first detection packet to each next-hop node, so that no path from the source node to the destination node is missed, thereby correspondingly improving path detection accuracy.

Optionally, when the type of to-be-collected detection data is a path topology from the source node to the destination node and/or a packet loss rate on the path from the source node to the destination node, the detection data includes an identity of the first node and an identity of an egress for sending the first detection packet. When the type of to-be-collected detection data includes the packet loss rate on the path from the source node to the destination node, the first detection packet further includes a packet sequence number. In the path detection method in this scenario, when the type of to-be-collected detection data is the path topology from the source node to the destination node, the first node reports, to a control node or the source node in the communications network, the identity of the first node, an identity of an ingress for receiving the first detection packet, and detection data added by a previous-hop node of the first node, or when the type of to-be-collected detection data includes the packet loss rate on the path from the source node to the destination node, the first node reports the identity of the first node, an identity of an ingress for receiving the first detection packet, detection data added by a previous-hop node of the first node, and the packet sequence number to a control node or the source node in the communications network.

In this embodiment of this application, each node directly reports some collected detection data to the source node or the control node, to reduce load of the first detection packet sent to the next-hop node, thereby saving bandwidth required for sending the first detection packet, and improving efficiency of sending the first detection packet.

Optionally, when the first node has at least two next-hop nodes to a destination of the first detection packet, for example, the at least two next-hop nodes include a second node and a third node, that the first node sends, to a next-hop node of the first node, the first detection packet to which the detection data is added includes that the first node sends, to the second node, the first detection packet to which the identity of the first node and an identity of a first egress for sending the first detection packet are added, where the first node is connected to the second node through a first port identified by the identity of the first egress for sending the first detection packet, and the first node sends, to the third node, the first detection packet to which the identity of the first node and an identity of a second egress for sending the first detection packet are added, where the first node is connected to the third node through a second port identified by the identity of the second egress for sending the first detection packet.

When each node directly reports some collected detection data to the source node or the control node, the first node still needs to send the first detection packet to each next-hop node. In this way, each node on the plurality of paths collects detection data and adds specific detection data based on the multipath detection indication information and the detection data collection indication information in the packet, so that no path from the source node to the destination node is missed, thereby correspondingly improving path detection accuracy.

Optionally, the first node determines whether the first node has at least two next-hop nodes to the destination of the first detection packet, and performs the reporting step when determining that the first node has at least two next-hop nodes to the destination of the first detection packet.

In this embodiment of this application, each intermediate node may directly perform the reporting step, or may perform the reporting step when determining that the intermediate node has a plurality of next-hop nodes, thereby improving path detection flexibility.

Optionally, when the type of to-be-collected detection data is a smallest maximum transmission unit (MTU) on the paths from the source node to the destination node, the detection data includes an MTU on a link from the first node to the next-hop node of the first node.

The path detection method provided in this embodiment of this application may be further used to measure a smallest path MTU, thereby improving path detection flexibility.

Optionally, when the first node has at least two next-hop nodes to a destination of the first detection packet, for example, the at least two next-hop nodes include a second node and a third node, that the first node sends, to a next-hop node of the first node, the first detection packet to which the detection data is added includes that the first node sends, to the second node through a first port, the first detection packet to which an MTU on a link from the first node to the second node is added, where the first node is connected to the second node through the first port, and the first node sends, to the third node through a second port, the first detection packet to which an MTU on a link from the first node to the third node is added, where the first node is connected to the third node through the second port.

In this embodiment of this application, when the first node has a plurality of next-hop nodes, the first node needs to send the first detection packet to each next-hop node, so that no path from the source node to the destination node is missed, thereby correspondingly improving path detection accuracy.

Optionally, when the type of to-be-collected detection data is a smallest MTU on the paths from the source node to the destination node, that the first node adds detection data to the first detection packet based on the multipath detection indication information and the detection data collection indication information includes that the first node reserves a smallest MTU after comparing an MTU on a link from the first node to the next-hop node of the first node with an existing MTU in the first detection packet. Correspondingly, sending, by the first node to a next-hop node of the first node, the first detection packet to which the detection data is added includes sending the first detection packet in which the smallest MTU is reserved to the next-hop node of the first node.

Further, to save bandwidth required for transmitting the first detection packet, the first node may directly compare the collected MTU with the existing MTU in the first detection packet, and then reserve only a smallest MTU.

Optionally, the type of to-be-collected detection data includes a delay on the path from the source node to the destination node, and the detection data includes an identity of the first node, an identity of an ingress for receiving the first detection packet, a timestamp for receiving the first detection packet, an identity of an egress for sending the first detection packet, and a timestamp for sending the first detection packet.

The path detection method provided in this embodiment of this application may be further used to measure a transmission delay of a packet, thereby improving path detection flexibility.

Optionally, when the first node has at least two next-hop nodes to a destination of the first detection packet, for example, the at least two next-hop nodes include a second node and a third node, that the first node sends, to a next-hop node of the first node, the first detection packet to which the detection data is added includes that the first node sends, to the second node, the first detection packet to which the identity of the first node, the identity of the ingress for receiving the first detection packet, the timestamp for receiving the first detection packet, an identity of a first egress for sending the first detection packet, and a timestamp for sending the first detection packet through a first port identified by the identity of the first egress are added, where the first node is connected to the second node through the first port, and the first node sends, to the third node, the first detection packet to which the identity of the first node, the identity of the ingress for receiving the first detection packet, the timestamp for receiving the first detection packet, an identity of a second egress for sending the first detection packet, and a timestamp for sending the first detection packet through a second port identified by the identity of the second egress are added, where the first node is connected to the third node through the second port.

In this embodiment of this application, when the first node has a plurality of next-hop nodes, the first node needs to send the first detection packet to each next-hop node, so that no path from the source node to the destination node is missed, thereby correspondingly improving path detection accuracy.

Optionally, when the type of to-be-collected detection data includes a delay on the path from the source node to the destination node, the detection data includes an identity of the first node, an identity of an egress for sending the first detection packet, and a timestamp for sending the first detection packet. In the path detection method in this scenario, the first node may further report, to a control node or the source node in the communications network, the identity of the first node, an identity of an ingress for receiving the first detection packet, a timestamp for receiving the first detection packet, and detection data added by a previous-hop node of the first node.

In this embodiment of this application, each node directly reports some collected detection data to the source node or the control node, to reduce load of the first detection packet sent to the next-hop node, thereby saving bandwidth required for sending the first detection packet, and improving efficiency of sending the first detection packet.

Optionally, when the first node has at least two next-hop nodes to a destination of the first detection packet, for example, the at least two next-hop nodes include a second node and a third node, that the first node sends, to a next-hop node of the first node, the first detection packet to which the detection data is added includes that the first node sends, to the second node, the first detection packet to which the identity of the first node, an identity of a first egress for sending the first detection packet, and a timestamp for sending the first detection packet through a first port identified by the identity of the first egress are added, where the first node is connected to the second node through the first port, and the first node sends, to the third node, the first detection packet to which the identity of the first node, an identity of a second egress for sending the first detection packet, and a timestamp for sending the first detection packet through a second port identified by the identity of the second egress are added, where the first node is connected to the third node through the second port.

When each node directly reports some collected detection data to the source node or the control node, the first node still needs to send the first detection packet to each next-hop node, so that no path from the source node to the destination node is missed, thereby correspondingly improving path detection accuracy.

Optionally, the first node determines whether the first node has at least two next-hop nodes to the destination of the first detection packet, and performs the reporting step when determining that the first node has at least two next-hop nodes to the destination of the first detection packet.

In this embodiment of this application, each intermediate node may directly perform the reporting step, or each intermediate node may perform the reporting step when determining that the intermediate node has a plurality of next-hop nodes, thereby improving path detection flexibility.

Optionally, the first detection packet includes a first instruction and a second instruction, the first instruction carries the multipath detection indication information, and the second instruction carries the detection data collection indication information. Optionally, the first detection packet includes a first instruction and telemetry indication information, the first instruction carries the multipath detection indication information, and the telemetry indication information carries the detection data collection indication information.

That is, in this embodiment of this application, the detection packet may be extended by a field used to indicate the second instruction, to carry the detection data collection indication information. Alternatively, the existing telemetry indication information in the detection packet is used to carry the detection data collection indication information, to improve flexibility of a format of the detection packet.

Optionally, the detection data collection indication information includes a node identity, an identity of an ingress for receiving the first detection packet, and an identity of an egress for sending the first detection packet, and is used to indicate that the type of to-be-collected detection data is the path topology from the source node to the destination node and/or the packet loss rate on the path from the source node to the destination node, or the detection data collection indication information includes an MTU, and is used to indicate that the type of to-be-collected detection data is the smallest MTU on the paths from the source node to the destination node, or the detection data collection indication information includes a node identity, an identity of an ingress for receiving the first detection packet, a timestamp for receiving the first detection packet, an identity of an egress for sending the first detection packet, and a timestamp for sending the first detection packet, and is used to indicate that the type of to-be-collected detection data is the delay on the path from the source node to the destination node.

Optionally, the detection data collection indication information includes the type of to-be-collected detection data, and is used to indicate the first node to determine the to-be-collected data based on a correspondence between the type included in the detection data collection indication information and the to-be-collected data.

That is, in this embodiment of this application, the to-be-collected specific data may be indicated in the detection data collection indication information, or the type may be indicated in the detection data collection indication information. The intermediate node may obtain the to-be-collected specific data from the correspondence based on the type, to improve flexibility of a format of the detection packet.

Optionally, the first detection packet further includes indication information indicating a source address and destination address pair of the packet.

In addition, the first detection packet may further include the indication information indicating the source address and destination address pair of the packet. In this way, another node in the network can determine a source address and a destination address of the packet provided that the other node obtains the indication information, without parsing source address and destination address information carried in another part of the packet. This improves packet processing efficiency.

According to a second aspect, a path detection method is provided, and is performed by a first node in a communications network. The communications network includes a source node, one or more intermediate nodes, and a destination node, and the first node is any one of the one or more intermediate nodes. The method includes that the first node receives a first detection packet including multipath detection indication information and detection data collection indication information, where the multipath detection indication information is used to indicate that the detection packet is used to detect a plurality of paths from the source node to the destination node, and the detection data collection indication information is used to indicate that a type of to-be-collected detection data is a smallest MTU on the paths from the source node to the destination node. The first node reports, to a control node or the source node in the communications network, an MTU on a link from the first node to a next-hop node of the first node based on the multipath detection indication information and the detection data collection indication information. The first node sends the received first detection packet to the next-hop node of the first node.

Each node directly reports collected detection data to the source node or the control node, to reduce load of the first detection packet sent to the next-hop node, thereby saving bandwidth required for sending the first detection packet, and improving efficiency of sending the first detection packet.

Optionally, when the first node has at least two next-hop nodes to a destination of the first detection packet, for example, the at least two next-hop nodes include a second node and a third node, that the first node sends the received first detection packet to the next-hop node of the first node includes that the first node sends the received first detection packet to the second node through a first port, where the first node is connected to the second node through the first port, and the first node sends the received first detection packet to the third node through a second port, where the first node is connected to the third node through the second port.

When each node directly reports collected detection data to the source node or the control node, the first node still needs to send the first detection packet to each next-hop node, so that no path from the source node to the destination node is missed, thereby correspondingly improving path detection accuracy.

Optionally, the first node determines whether the first node has at least two next-hop nodes to the destination of the first detection packet, and when determining that the first node has at least two next-hop nodes to the destination of the first detection packet, the first node performs the step of reporting, to a control node or the source node in the communications network, an MTU on a link from the first node to a next-hop node of the first node based on the multipath detection indication information and the detection data collection indication information. In this case, in this method, the first node also reports an existing MTU in the first detection packet to the control node or the source node.

Optionally, when the first node determines that the first node has only one next-hop node to the destination of the first detection packet, in this method, the first node does not perform the reporting step, and instead, adds, to the first detection packet, the MTU on the link from the first node to the next-hop node of the first node, and the first node sends, to the next-hop node of the first node, the first detection packet to which the MTU on the link from the first node to the next-hop node of the first node is added.

In this embodiment of this application, each intermediate node may directly perform the reporting step, or each intermediate node may perform the reporting step when determining that the intermediate node has a plurality of next-hop nodes, thereby improving path detection flexibility.

According to a third aspect, a path detection method is provided, and is performed by a source node in a communications network. The communications network includes the source node, one or more intermediate nodes, and a destination node. The method includes that the source node generates a first detection packet including multipath detection indication information and detection data collection indication information, where the multipath detection indication information is used to indicate that the detection packet is used to detect a plurality of paths from the source node to the destination node, and the detection data collection indication information is used to indicate a type of to-be-collected detection data. The source node sends the first detection packet to a next-hop node of the source node, to indicate the next-hop node of the source node to perform any method in the first aspect, or indicate the next-hop node of the source node to perform any method in the second aspect.

Optionally, the type of to-be-collected detection data includes one or more of a path topology from the source node to the destination node, a packet loss rate on the path from the source node to the destination node, a smallest MTU on the paths from the source node to the destination node, and a delay on the path from the source node to the destination node.

The path detection method provided in this application may be applied to a plurality of scenarios, thereby improving path detection flexibility.

Optionally, the first detection packet includes a first instruction and a second instruction, the first instruction carries the multipath detection indication information, and the second instruction carries the detection data collection indication information. Optionally, the first detection packet includes a first instruction and telemetry indication information, the first instruction carries the multipath detection indication information, and the telemetry indication information carries the detection data collection indication information.

That is, in this embodiment of this application, the detection packet may be extended by a field used to indicate the second instruction, to carry the detection data collection indication information. Alternatively, the existing telemetry indication information in the detection packet is used to carry the detection data collection indication information, to improve flexibility of a format of the detection packet.

Optionally, the detection data collection indication information includes a node identity, an identity of an ingress for receiving the first detection packet, and an identity of an egress for sending the first detection packet, and is used to indicate that the type of to-be-collected detection data is the path topology from the source node to the destination node and/or the packet loss rate on the path from the source node to the destination node, or the detection data collection indication information includes an MTU, and is used to indicate that the type of to-be-collected detection data is the smallest MTU on the paths from the source node to the destination node, or the detection data collection indication information includes a node identity, an identity of an ingress for receiving the first detection packet, a timestamp for receiving the first detection packet, an identity of an egress for sending the first detection packet, and a timestamp for sending the first detection packet, and is used to indicate that the type of to-be-collected detection data is the delay on the path from the source node to the destination node.

Optionally, the detection data collection indication information includes the type of to-be-collected detection data, and is used to indicate the first node to determine the to-be-collected data based on a correspondence between the type included in the detection data collection indication information and the to-be-collected data.

That is, in this embodiment of this application, the to-be-collected specific data may be indicated in the detection data collection indication information, or the type may be indicated in the detection data collection indication information. The intermediate node may obtain the to-be-collected specific data from the correspondence based on the type, to improve flexibility of a format of the detection packet.

Optionally, the first detection packet further includes indication information indicating a source address and destination address pair of the packet.

In addition, the first detection packet may further include the indication information indicating the source address and destination address pair of the packet. In this way, another node in the network can determine a source address and a destination address of the packet provided that the other node obtains the indication information, without parsing source address and destination address information carried in another part of the packet. This improves packet processing efficiency.

According to a fourth aspect, a first node in a communications network is provided. The communications network includes a source node, one or more intermediate nodes, and a destination node, the first node is any one of the one or more intermediate nodes, and the first node includes a memory and a processor.

The memory is configured to store a computer program. The processor is configured to execute the computer program stored in the memory, to perform the following path detection method includes the following.

The first node receives a first detection packet including multipath detection indication information and detection data collection indication information, where the multipath detection indication information is used to indicate that the detection packet is used to detect a plurality of paths from the source node to the destination node, and the detection data collection indication information is used to indicate a type of to-be-collected detection data. The first node adds detection data to the first detection packet based on the multipath detection indication information and the detection data collection indication information, and sends, to a next-hop node of the first node, the first detection packet to which the detection data is added.

Optionally, the type of to-be-collected detection data is a path topology from the source node to the destination node and/or a packet loss rate on the path from the source node to the destination node. When the type of to-be-collected detection data includes the packet loss rate on the path from the source node to the destination node, the first detection packet further includes a packet sequence number. In this scenario, the detection data includes an identity of the first node, an identity of an ingress for receiving the first detection packet, and an identity of an egress for sending the first detection packet.

Optionally, when the first node has at least two next-hop nodes to a destination of the first detection packet, for example, the at least two next-hop nodes include a second node and a third node, that the first node sends, to a next-hop node of the first node, the first detection packet to which the detection data is added includes that the first node sends, to the second node, the first detection packet to which the identity of the first node, the identity of the ingress for receiving the first detection packet, and an identity of a first egress for sending the first detection packet are added, where the first node is connected to the second node through a first port identified by the identity of the first egress for sending the first detection packet, and the first node sends, to the third node, the first detection packet to which the identity of the first node, the identity of the ingress for receiving the first detection packet, and an identity of a second egress for sending the first detection packet are added, where the first node is connected to the third node through a second port identified by the identity of the second egress for sending the first detection packet.

Optionally, when the type of to-be-collected detection data is a path topology from the source node to the destination node and/or a packet loss rate on the path from the source node to the destination node, the detection data includes an identity of the first node and an identity of an egress for sending the first detection packet. When the type of to-be-collected detection data includes the packet loss rate on the path from the source node to the destination node, the first detection packet further includes a packet sequence number. In the path detection method in this scenario, when the type of to-be-collected detection data is the path topology from the source node to the destination node, the first node reports, to a control node or the source node in the communications network, the identity of the first node, an identity of an ingress for receiving the first detection packet, and detection data added by a previous-hop node of the first node, or when the type of to-be-collected detection data includes the packet loss rate on the path from the source node to the destination node, the first node reports the identity of the first node, an identity of an ingress for receiving the first detection packet, detection data added by a previous-hop node of the first node, and the packet sequence number to a control node or the source node in the communications network.

Optionally, when the first node has at least two next-hop nodes to a destination of the first detection packet, for example, the at least two next-hop nodes include a second node and a third node, that the first node sends, to a next-hop node of the first node, the first detection packet to which the detection data is added includes that the first node sends, to the second node, the first detection packet to which the identity of the first node and an identity of a first egress for sending the first detection packet are added, where the first node is connected to the second node through a first port identified by the identity of the first egress for sending the first detection packet, and the first node sends, to the third node, the first detection packet to which the identity of the first node and an identity of a second egress for sending the first detection packet are added, where the first node is connected to the third node through a second port identified by the identity of the second egress for sending the first detection packet.

Optionally, the first node determines whether the first node has at least two next-hop nodes to the destination of the first detection packet, and performs the reporting step when determining that the first node has at least two next-hop nodes to the destination of the first detection packet.

Optionally, when the type of to-be-collected detection data is a smallest MTU on the paths from the source node to the destination node, that the first node adds detection data to the first detection packet based on the multipath detection indication information and the detection data collection indication information includes that the first node reserves a smallest MTU after comparing an MTU on a link from the first node to the next-hop node of the first node with an existing MTU in the first detection packet. Correspondingly, sending, by the first node to a next-hop node of the first node, the first detection packet to which the detection data is added includes sending the first detection packet in which the smallest MTU is reserved to the next-hop node of the first node.

Optionally, when the first node has at least two next-hop nodes to a destination of the first detection packet, for example, the at least two next-hop nodes include a second node and a third node, that the first node sends, to a next-hop node of the first node, the first detection packet to which the detection data is added includes that the first node sends, to the second node through a first port, the first detection packet to which an MTU on a link from the first node to the second node is added, where the first node is connected to the second node through the first port, and the first node sends, to the third node through a second port, the first detection packet to which an MTU on a link from the first node to the third node is added, where the first node is connected to the third node through the second port.

Optionally, when the type of to-be-collected detection data is a smallest MTU on the paths from the source node to the destination node, the detection data includes a smallest MTU on the paths from the first node and the source node.

Optionally, the type of to-be-collected detection data includes a delay on the path from the source node to the destination node, and the detection data includes an identity of the first node, an identity of an ingress for receiving the first detection packet, a timestamp for receiving the first detection packet, an identity of an egress for sending the first detection packet, and a timestamp for sending the first detection packet.

Optionally, when the first node has at least two next-hop nodes to a destination of the first detection packet, for example, the at least two next-hop nodes include a second node and a third node, that the first node sends, to a next-hop node of the first node, the first detection packet to which the detection data is added includes that the first node sends, to the second node, the first detection packet to which the identity of the first node, the identity of the ingress for receiving the first detection packet, the timestamp for receiving the first detection packet, an identity of a first egress for sending the first detection packet, and a timestamp for sending the first detection packet through a first port identified by the identity of the first egress are added, where the first node is connected to the second node through the first port, and the first node sends, to the third node, the first detection packet to which the identity of the first node, the identity of the ingress for receiving the first detection packet, the timestamp for receiving the first detection packet, an identity of a second egress for sending the first detection packet, and a timestamp for sending the first detection packet through a second port identified by the identity of the second egress are added, where the first node is connected to the third node through the second port.

Optionally, when the type of to-be-collected detection data includes a delay on the path from the source node to the destination node, the detection data includes an identity of the first node, an identity of an egress for sending the first detection packet, and a timestamp for sending the first detection packet. In the path detection method in this scenario, the first node may further report, to a control node or the source node in the communications network, the identity of the first node, an identity of an ingress for receiving the first detection packet, a timestamp for receiving the first detection packet, and detection data added by a previous-hop node of the first node.

Optionally, when the first node has at least two next-hop nodes to a destination of the first detection packet, for example, the at least two next-hop nodes include a second node and a third node, that the first node sends, to a next-hop node of the first node, the first detection packet to which the detection data is added includes that the first node sends, to the second node, the first detection packet to which the identity of the first node, an identity of a first egress for sending the first detection packet, and a timestamp for sending the first detection packet through a first port identified by the identity of the first egress are added, where the first node is connected to the second node through the first port, and the first node sends, to the third node, the first detection packet to which the identity of the first node, an identity of a second egress for sending the first detection packet, and a timestamp for sending the first detection packet through a second port identified by the identity of the second egress are added, where the first node is connected to the third node through the second port.

Optionally, the first node determines whether the first node has at least two next-hop nodes to the destination of the first detection packet, and performs the reporting step when determining that the first node has at least two next-hop nodes to the destination of the first detection packet.

Optionally, the first detection packet includes a first instruction and a second instruction, the first instruction carries the multipath detection indication information, and the second instruction carries the detection data collection indication information. Optionally, the first detection packet includes a first instruction and telemetry indication information, the first instruction carries the multipath detection indication information, and the telemetry indication information carries the detection data collection indication information.

Optionally, the detection data collection indication information includes a node identity, an identity of an ingress for receiving the first detection packet, and an identity of an egress for sending the first detection packet, and is used to indicate that the type of to-be-collected detection data is the path topology from the source node to the destination node and/or the packet loss rate on the path from the source node to the destination node, or the detection data collection indication information includes an MTU, and is used to indicate that the type of to-be-collected detection data is the smallest MTU on the paths from the source node to the destination node, or the detection data collection indication information includes a node identity, an identity of an ingress for receiving the first detection packet, a timestamp for receiving the first detection packet, an identity of an egress for sending the first detection packet, and a timestamp for sending the first detection packet, and is used to indicate that the type of to-be-collected detection data is the delay on the path from the source node to the destination node.

Optionally, the detection data collection indication information includes the type of to-be-collected detection data, and is used to indicate the first node to determine the to-be-collected data based on a correspondence between the type included in the detection data collection indication information and the to-be-collected data.

Optionally, the first detection packet further includes indication information indicating a source address and destination address pair of the packet, and the indication information may be included in a third instruction of the first detection packet.

Beneficial effects of any method performed above are explained and described in the path detection method according to the first aspect, and are not described herein again.

According to a fifth aspect, a first node in a communications network is provided. The communications network includes a source node, one or more intermediate nodes, and a destination node, the first node is any one of the one or more intermediate nodes, and the first node includes a memory and a processor.

The memory is configured to store a computer program.

The processor is configured to execute the computer program stored in the memory, to perform the following path detection method.

The first node receives a first detection packet including multipath detection indication information and detection data collection indication information, where the multipath detection indication information is used to indicate that the detection packet is used to detect a plurality of paths from the source node to the destination node, and the detection data collection indication information is used to indicate that a type of to-be-collected detection data is a smallest MTU on the paths from the source node to the destination node. The first node reports, to a control node or the source node in the communications network, an MTU on a link from the first node to a next-hop node of the first node based on the multipath detection indication information and the detection data collection indication information. The first node sends the received first detection packet to the next-hop node of the first node.

Optionally, when the first node has at least two next-hop nodes to a destination of the first detection packet, for example, the at least two next-hop nodes include a second node and a third node, that the first node sends the received first detection packet to the next-hop node of the first node includes that the first node sends the received first detection packet to the second node through a first port, where the first node is connected to the second node through the first port, and the first node sends the received first detection packet to the third node through a second port, where the first node is connected to the third node through the second port.

Optionally, the first node determines whether the first node has at least two next-hop nodes to the destination of the first detection packet, and when determining that the first node has at least two next-hop nodes to the destination of the first detection packet, the first node performs the step of reporting, to a control node or the source node in the communications network, an MTU on a link from the first node to a next-hop node of the first node based on the multipath detection indication information and the detection data collection indication information. In this case, in this method, the first node also reports an existing MTU in the first detection packet to the control node or the source node.

Optionally, when the first node determines that the first node has only one next-hop node to the destination of the first detection packet, in this method, the first node does not perform the reporting step, and instead, adds, to the first detection packet, the MTU on the link from the first node to the next-hop node of the first node, and the first node sends, to the next-hop node of the first node, the first detection packet to which the MTU on the link from the first node to the next-hop node of the first node is added.

Beneficial effects of any method performed above are explained and described in the path detection method according to the second aspect, and are not described herein again.

According to a sixth aspect, a source node in a communications network is provided. The communications network includes the source node, one or more intermediate nodes, and a destination node, and the source node includes a memory and a processor.

The memory is configured to store a computer program.

The processor is configured to execute the computer program stored in the memory, to perform the following path detection method.

The source node generates a first detection packet including multipath detection indication information and detection data collection indication information, where the multipath detection indication information is used to indicate that the detection packet is used to detect a plurality of paths from the source node to the destination node, and the detection data collection indication information is used to indicate a type of to-be-collected detection data. The source node sends the first detection packet to a next-hop node of the source node.

Optionally, the type of to-be-collected detection data includes one or more of a path topology from the source node to the destination node, a packet loss rate on the path from the source node to the destination node, a smallest MTU on the paths from the source node to the destination node, and a delay on the path from the source node to the destination node.

Optionally, the first detection packet includes a first instruction and a second instruction, the first instruction carries the multipath detection indication information, and the second instruction carries the detection data collection indication information. Optionally, the first detection packet includes a first instruction and telemetry indication information, the first instruction carries the multipath detection indication information, and the telemetry indication information carries the detection data collection indication information.

Optionally, the detection data collection indication information includes a node identity, an identity of an ingress for receiving the first detection packet, and an identity of an egress for sending the first detection packet, and is used to indicate that the type of to-be-collected detection data is the path topology from the source node to the destination node and/or the packet loss rate on the path from the source node to the destination node, or the detection data collection indication information includes an MTU, and is used to indicate that the type of to-be-collected detection data is the smallest MTU on the paths from the source node to the destination node, or the detection data collection indication information includes a node identity, an identity of an ingress for receiving the first detection packet, a timestamp for receiving the first detection packet, an identity of an egress for sending the first detection packet, and a timestamp for sending the first detection packet, and is used to indicate that the type of to-be-collected detection data is the delay on the path from the source node to the destination node.

Optionally, the detection data collection indication information includes the type of to-be-collected detection data, and is used to indicate the first node to determine the to-be-collected data based on a correspondence between the type included in the detection data collection indication information and the to-be-collected data.

Optionally, the first detection packet further includes indication information indicating a source address and destination address pair of the packet.

Beneficial effects of any method performed above are explained and described in the path detection method according to the third aspect, and are not described herein again.

According to a seventh aspect, a path detection system is provided. The path detection system includes a source node, one or more intermediate nodes, and a destination node.

The source node is configured to generate a first detection packet including multipath detection indication information and detection data collection indication information, where the multipath detection indication information is used to indicate that the detection packet is used to detect a plurality of paths from the source node to the destination node, and the detection data collection indication information is used to indicate a type of to-be-collected detection data, and send the first detection packet to an intermediate node, where the intermediate node is a next-hop node of the source node.

Optionally, the type of to-be-collected detection data includes one or more of a path topology from the source node to the destination node, a packet loss rate on the path from the source node to the destination node, a smallest MTU on the paths from the source node to the destination node, and a delay on the path from the source node to the destination node.

Optionally, the first detection packet includes a first instruction and a second instruction, the first instruction carries the multipath detection indication information, and the second instruction carries the detection data collection indication information.

Optionally, the first detection packet includes a first instruction and telemetry indication information, the first instruction carries the multipath detection indication information, and the telemetry indication information carries the detection data collection indication information.

Optionally, the detection data collection indication information includes a node identity, an identity of an ingress for receiving the first detection packet, and an identity of an egress for sending the first detection packet, and is used to indicate that the type of to-be-collected detection data is the path topology from the source node to the destination node and/or the packet loss rate on the path from the source node to the destination node, or the detection data collection indication information includes an MTU, and is used to indicate that the type of to-be-collected detection data is the smallest MTU on the paths from the source node to the destination node, or the detection data collection indication information includes a node identity, an identity of an ingress for receiving the first detection packet, a timestamp for receiving the first detection packet, an identity of an egress for sending the first detection packet, and a timestamp for sending the first detection packet, and is used to indicate that the type of to-be-collected detection data is the delay on the path from the source node to the destination node.

Optionally, the detection data collection indication information includes the type of to-be-collected detection data, and is used to indicate the first node to determine the to-be-collected data based on a correspondence between the type included in the detection data collection indication information and the to-be-collected data.

Optionally, the first detection packet further includes indication information indicating a source address and destination address pair of the packet.

The intermediate node in the path detection system in the seventh aspect is configured to receive the first detection packet including the multipath detection indication information and the detection data collection indication information, add detection data to the first detection packet based on the multipath detection indication information and the detection data collection indication information, and send, to a next-hop node of the intermediate node, the first detection packet to which the detection data is added.

Optionally, the intermediate node is further configured to receive the first detection packet including the multipath detection indication information and the detection data collection indication information. The intermediate node adds detection data to the first detection packet based on the multipath detection indication information and the detection data collection indication information, and sends, to a next-hop node of the intermediate node, the first detection packet to which the detection data is added.

Optionally, the type of to-be-collected detection data is the path topology from the source node to the destination node and/or the packet loss rate on the path from the source node to the destination node. When the type of to-be-collected detection data includes the packet loss rate on the path from the source node to the destination node, the first detection packet further includes a packet sequence number. The detection data includes an identity of the intermediate node, an identity of an ingress for receiving the first detection packet, and an identity of an egress for sending the first detection packet.

Optionally, when the intermediate node has at least two next-hop nodes to a destination of the first detection packet, and the at least two next-hop nodes include a second node and a third node, the intermediate node is configured to send, to the second node, the first detection packet to which the identity of the intermediate node, the identity of the ingress for receiving the first detection packet, and an identity of a first egress for sending the first detection packet are added, where the intermediate node is connected to the second node through a first port identified by the identity of the first egress for sending the first detection packet, and send, to the third node, the first detection packet to which the identity of the intermediate node, the identity of the ingress for receiving the first detection packet, and an identity of a second egress for sending the first detection packet are added, where the intermediate node is connected to the third node through a second port identified by the identity of the second egress for sending the first detection packet.

Optionally, when the type of to-be-collected detection data is the path topology from the source node to the destination node and/or the packet loss rate on the path from the source node to the destination node, the detection data includes an identity of the first node and an identity of an egress for sending the first detection packet, and when the type of to-be-collected detection data includes the packet loss rate on the path from the source node to the destination node, the first detection packet further includes a packet sequence number.

The intermediate node is further configured to, when the type of to-be-collected detection data is the path topology from the source node to the destination node, report, to a control node or the source node in the communications network, the identity of the intermediate node, an identity of an ingress for receiving the first detection packet, and detection data added by a previous-hop node of the intermediate node, or when the type of to-be-collected detection data includes the packet loss rate on the path from the source node to the destination node, report the identity of the intermediate node, an identity of an ingress for receiving the first detection packet, detection data added by a previous-hop node of the intermediate node, and the packet sequence number to a control node or the source node in the communications network.

Optionally, when the intermediate node has at least two next-hop nodes to a destination of the first detection packet, and the at least two next-hop nodes include a second node and a third node, the intermediate node is further configured to send, to the second node, the first detection packet to which the identity of the intermediate node and an identity of a first egress for sending the first detection packet are added, where the intermediate node is connected to the second node through a first port identified by the identity of the first egress for sending the first detection packet, and send, to the third node, the first detection packet to which the identity of the intermediate node and an identity of a second egress for sending the first detection packet are added, where the intermediate node is connected to the third node through a second port identified by the identity of the second egress for sending the first detection packet.

Optionally, the intermediate node is further configured to determine whether the intermediate node has at least two next-hop nodes to the destination of the first detection packet, and perform the reporting step when determining that the intermediate node has at least two next-hop nodes to the destination of the first detection packet.

Optionally, when the type of to-be-collected detection data is the smallest MTU on the paths from the source node to the destination node, the detection data includes an MTU on a link from the intermediate node to the next-hop node of the intermediate node.

Optionally, when the intermediate node has at least two next-hop nodes to a destination of the first detection packet, and the at least two next-hop nodes include a second node and a third node, the intermediate node is further configured to send, to the second node through a first port, the first detection packet to which an MTU on a link from the intermediate node to the second node is added, where the intermediate node is connected to the second node through the first port, and send, to the third node through a second port, the first detection packet to which an MTU on a link from the intermediate node to the third node is added, where the intermediate node is connected to the third node through the second port.

Optionally, when the type of to-be-collected detection data is the smallest MTU on the paths from the source node to the destination node, the intermediate node is further configured to reserve a smallest MTU after the first node compares an MTU on a link from the first node to the next-hop node of the first node with an existing MTU in the first detection packet, and send the first detection packet in which the smallest MTU is reserved to the next-hop node of the first node.

Optionally, the type of to-be-collected detection data includes the delay on the path from the source node to the destination node, and the detection data includes an identity of the intermediate node, an identity of an ingress for receiving the first detection packet, a timestamp for receiving the first detection packet, an identity of an egress for sending the first detection packet, and a timestamp for sending the first detection packet.

Optionally, when the intermediate node has at least two next-hop nodes to a destination of the first detection packet, and the at least two next-hop nodes include a second node and a third node, the intermediate node is further configured to send, to the second node, the first detection packet to which the identity of the intermediate node, the identity of the ingress for receiving the first detection packet, the timestamp for receiving the first detection packet, an identity of a first egress for sending the first detection packet, and a timestamp for sending the first detection packet through a first port identified by the identity of the first egress are added, where the intermediate node is connected to the second node through the first port, and send, to the third node, the first detection packet to which the identity of the intermediate node, the identity of the ingress for receiving the first detection packet, the timestamp for receiving the first detection packet, an identity of a second egress for sending the first detection packet, and a timestamp for sending the first detection packet through a second port identified by the identity of the second egress are added, where the intermediate node is connected to the third node through the second port.

Optionally, the type of to-be-collected detection data includes the delay on the path from the source node to the destination node, and the detection data includes an identity of the intermediate node, an identity of an egress for sending the first detection packet, and a timestamp for sending the first detection packet.

The intermediate node is further configured to report, to a control node or the source node in the communications network, the identity of the intermediate node, an identity of an ingress for receiving the first detection packet, a timestamp for receiving the first detection packet, and detection data added by a previous-hop node of the intermediate node.

Optionally, when the intermediate node has at least two next-hop nodes to a destination of the first detection packet, and the at least two next-hop nodes include a second node and a third node, the intermediate node is further configured to send, to the second node, the first detection packet to which the identity of the intermediate node, an identity of a first egress for sending the first detection packet, and a timestamp for sending the first detection packet through a first port identified by the identity of the first egress are added, where the intermediate node is connected to the second node through the first port, and send, to the third node, the first detection packet to which the identity of the intermediate node, an identity of a second egress for sending the first detection packet, and a timestamp for sending the first detection packet through a second port identified by the identity of the second egress are added, where the intermediate node is connected to the third node through the second port.

Optionally, the intermediate node is further configured to determine whether the intermediate node has at least two next-hop nodes to the destination of the first detection packet, and perform the reporting step when determining that the intermediate node has at least two next-hop nodes to the destination of the first detection packet.

According to an eighth aspect, a path detection system is provided. The path detection system includes a source node, one or more intermediate nodes, and a destination node.

The source node in the path detection system is configured to generate a first detection packet including multipath detection indication information and detection data collection indication information, where the multipath detection indication information is used to indicate that the detection packet is used to detect a plurality of paths from the source node to the destination node, and the detection data collection indication information is used to indicate a type of to-be-collected detection data, and send the first detection packet to an intermediate node, where the intermediate node is a next-hop node of the source node.

Optionally, the type of to-be-collected detection data includes a smallest MTU on the paths from the source node to the destination node.

Optionally, the first detection packet includes a first instruction and a second instruction, the first instruction carries the multipath detection indication information, and the second instruction carries the detection data collection indication information.

Optionally, the first detection packet includes a first instruction and telemetry indication information, the first instruction carries the multipath detection indication information, and the telemetry indication information carries the detection data collection indication information.

Optionally, the detection data collection indication information includes an MTU, and is used to indicate that the type of to-be-collected detection data is the smallest MTU on the paths from the source node to the destination node.

Optionally, the detection data collection indication information includes the type of to-be-collected detection data, and is used to indicate the first node to determine the to-be-collected data based on a correspondence between the type included in the detection data collection indication information and the to-be-collected data.

Optionally, the first detection packet further includes indication information indicating a source address and destination address pair of the packet.

The intermediate node in the path detection system in the eighth aspect is configured to receive the first detection packet including the multipath detection indication information and the detection data collection indication information, where the detection data collection indication information is used to indicate that the type of to-be-collected detection data is the smallest MTU on the paths from the source node to the destination node, report, to a control node or the source node in the communications network, an MTU on a link from the first node to a next-hop node of the first node based on the multipath detection indication information and the detection data collection indication information, and send the received first detection packet to the next-hop node of the intermediate node.

Optionally, when the intermediate node has at least two next-hop nodes to a destination of the first detection packet, and the at least two next-hop nodes include a second node and a third node, the intermediate node is further configured to send the received first detection packet to the second node through a first port, where the intermediate node is connected to the second node through the first port, and send, by the intermediate node, the received first detection packet to the third node through a second port, where the intermediate node is connected to the third node through the second port.

Optionally, the intermediate node is further configured to determine whether the intermediate node has at least two next-hop nodes to the destination of the first detection packet, when determining that the intermediate node has at least two next-hop nodes to the destination of the first detection packet, perform the step of reporting, to a control node or the source node in the communications network, an MTU on a link from the intermediate node to a next-hop node of the intermediate node based on the multipath detection indication information and the detection data collection indication information.

In this case, the intermediate node is further configured to report an existing MTU in the first detection packet to the control node or the source node.

Optionally, when the intermediate node has only one next-hop node to the destination of the first detection packet, the intermediate node is further configured to add the MTU on the link from the intermediate node to the next-hop node of the intermediate node to the first detection packet, and send, to the next-hop node of the intermediate node, the first detection packet to which the MTU on the link from the intermediate node to the next-hop node of the intermediate node is added.

According to a ninth aspect, a first node in a communications network is provided. The communications network includes a source node, one or more intermediate nodes, and a destination node, and the first node is any one of the one or more intermediate nodes. The first node has a function of implementing behavior in the path detection method in the first aspect. The first node includes a receiving module configured to receive a first detection packet including multipath detection indication information and detection data collection indication information, where the multipath detection indication information is used to indicate that the detection packet is used to detect a plurality of paths from the source node to the destination node, and the detection data collection indication information is used to indicate a type of to-be-collected detection data, an adding module configured to add detection data to the first detection packet based on the multipath detection indication information and the detection data collection indication information, and a sending module configured to send, to a next-hop node of the first node, the first detection packet to which the detection data is added.

Optionally, the type of to-be-collected detection data is a path topology from the source node to the destination node and/or a packet loss rate on the path from the source node to the destination node. When the type of to-be-collected detection data includes the packet loss rate on the path from the source node to the destination node, the first detection packet further includes a packet sequence number. The detection data includes an identity of the first node, an identity of an ingress for receiving the first detection packet, and an identity of an egress for sending the first detection packet.

Optionally, when the first node has at least two next-hop nodes to a destination of the first detection packet, and the at least two next-hop nodes include a second node and a third node, the sending module is configured to send, to the second node, the first detection packet to which the identity of the first node, the identity of the ingress for receiving the first detection packet, and an identity of a first egress for sending the first detection packet are added, where the first node is connected to the second node through a first port identified by the identity of the first egress for sending the first detection packet, and send, to the third node, the first detection packet to which the identity of the first node, the identity of the ingress for receiving the first detection packet, and an identity of a second egress for sending the first detection packet are added, where the first node is connected to the third node through a second port identified by the identity of the second egress for sending the first detection packet.

Optionally, when the type of to-be-collected detection data is a path topology from the source node to the destination node and/or a packet loss rate on the path from the source node to the destination node, the detection data includes an identity of the first node and an identity of an egress for sending the first detection packet, and when the type of to-be-collected detection data includes the packet loss rate on the path from the source node to the destination node, the first detection packet further includes a packet sequence number.

The first node further includes a reporting module configured to, when the type of to-be-collected detection data is the path topology from the source node to the destination node, report, to a control node or the source node in the communications network, the identity of the first node, an identity of an ingress for receiving the first detection packet, and detection data added by a previous-hop node of the first node, where the reporting module is alternatively configured to, when the type of to-be-collected detection data includes the packet loss rate on the path from the source node to the destination node, report the identity of the first node, an identity of an ingress for receiving the first detection packet, detection data added by a previous-hop node of the first node, and the packet sequence number to a control node or the source node in the communications network.

Optionally, when the first node has at least two next-hop nodes to a destination of the first detection packet, and the at least two next-hop nodes include a second node and a third node, the sending module is configured to send, to the second node, the first detection packet to which the identity of the first node and an identity of a first egress for sending the first detection packet are added, where the first node is connected to the second node through a first port identified by the identity of the first egress for sending the first detection packet, and send, to the third node, the first detection packet to which the identity of the first node and an identity of a second egress for sending the first detection packet are added, where the first node is connected to the third node through a second port identified by the identity of the second egress for sending the first detection packet.

Optionally, the reporting module is configured to determine whether the first node has at least two next-hop nodes to the destination of the first detection packet, and perform the reporting step when determining that the first node has at least two next-hop nodes to the destination of the first detection packet.

Optionally, when the type of to-be-collected detection data is a smallest MTU on the paths from the source node to the destination node, the detection data includes an MTU on a link from the first node to the next-hop node of the first node.

Optionally, when the first node has at least two next-hop nodes to a destination of the first detection packet, and the at least two next-hop nodes include a second node and a third node, the sending module is configured to send, to the second node through a first port, the first detection packet to which an MTU on a link from the first node to the second node is added, where the first node is connected to the second node through the first port, and send, to the third node through a second port, the first detection packet to which an MTU on a link from the first node to the third node is added, where the first node is connected to the third node through the second port.

Optionally, when the type of to-be-collected detection data is a smallest MTU on the paths from the source node to the destination node, the first node has at least two next-hop nodes to a destination of the first detection packet, and the at least two next-hop nodes include a second node and a third node, the sending module is further configured to send, to the second node, the first detection packet in which a smallest MTU is reserved, where the smallest MTU is obtained after the first node compares an MTU on a link from the first node to the second node with an existing MTU in the first detection packet, and send, to the third node, the first detection packet in which a smallest MTU is reserved, where the smallest MTU is obtained after the first node compares an MTU on a link from the first node to the third node with the existing MTU in the first detection packet.

Optionally, the type of to-be-collected detection data includes a delay on the path from the source node to the destination node, and the detection data includes an identity of the first node, an identity of an ingress for receiving the first detection packet, a timestamp for receiving the first detection packet, an identity of an egress for sending the first detection packet, and a timestamp for sending the first detection packet.

Optionally, when the first node has at least two next-hop nodes to a destination of the first detection packet, and the at least two next-hop nodes include a second node and a third node, the sending module is configured to send, to the second node, the first detection packet to which the identity of the first node, the identity of the ingress for receiving the first detection packet, the timestamp for receiving the first detection packet, an identity of a first egress for sending the first detection packet, and a timestamp for sending the first detection packet through a first port identified by the identity of the first egress are added, where the first node is connected to the second node through the first port, and send, to the third node, the first detection packet to which the identity of the first node, the identity of the ingress for receiving the first detection packet, the timestamp for receiving the first detection packet, an identity of a second egress for sending the first detection packet, and a timestamp for sending the first detection packet through a second port identified by the identity of the second egress are added, where the first node is connected to the third node through the second port.

Optionally, the type of to-be-collected detection data includes a delay on the path from the source node to the destination node, and the detection data includes an identity of the first node, an identity of an egress for sending the first detection packet, and a timestamp for sending the first detection packet.

The first node further includes a reporting module configured to report, to a control node or the source node in the communications network, the identity of the first node, an identity of an ingress for receiving the first detection packet, a timestamp for receiving the first detection packet, and detection data added by a previous-hop node of the first node.

Optionally, when the first node has at least two next-hop nodes to a destination of the first detection packet, and the at least two next-hop nodes include a second node and a third node, the sending module is configured to send, to the second node, the first detection packet to which the identity of the first node, an identity of a first egress for sending the first detection packet, and a timestamp for sending the first detection packet through a first port identified by the identity of the first egress are added, where the first node is connected to the second node through the first port, and send, to the third node, the first detection packet to which the identity of the first node, an identity of a second egress for sending the first detection packet, and a timestamp for sending the first detection packet through a second port identified by the identity of the second egress are added, where the first node is connected to the third node through the second port.

Optionally, the reporting module is configured to determine whether the first node has at least two next-hop nodes to the destination of the first detection packet, and perform the reporting step when determining that the first node has at least two next-hop nodes to the destination of the first detection packet.

Optionally, the first detection packet includes a first instruction and a second instruction, the first instruction carries the multipath detection indication information, and the second instruction carries the detection data collection indication information.

Optionally, the first detection packet includes a first instruction and telemetry indication information, the first instruction carries the multipath detection indication information, and the telemetry indication information carries the detection data collection indication information.

Optionally, the detection data collection indication information includes a node identity, an identity of an ingress for receiving the first detection packet, and an identity of an egress for sending the first detection packet, and is used to indicate that the type of to-be-collected detection data is the path topology from the source node to the destination node and/or the packet loss rate on the path from the source node to the destination node, or the detection data collection indication information includes an MTU, and is used to indicate that the type of to-be-collected detection data is the smallest MTU on the paths from the source node to the destination node, or the detection data collection indication information includes a node identity, an identity of an ingress for receiving the first detection packet, a timestamp for receiving the first detection packet, an identity of an egress for sending the first detection packet, and a timestamp for sending the first detection packet, and is used to indicate that the type of to-be-collected detection data is the delay on the path from the source node to the destination node.

Optionally, the detection data collection indication information includes the type of to-be-collected detection data, and is used to indicate the first node to determine the to-be-collected data based on a correspondence between the type included in the detection data collection indication information and the to-be-collected data.

Optionally, the first detection packet further includes indication information indicating a source address and destination address pair of the packet.

According to a tenth aspect, a first node in a communications network is provided. The communications network includes a source node, one or more intermediate nodes, and a destination node, the first node is any one of the one or more intermediate nodes, and the first node includes a receiving module configured to receive a first detection packet including multipath detection indication information and detection data collection indication information, where the multipath detection indication information is used to indicate that the detection packet is used to detect a plurality of paths from the source node to the destination node, and the detection data collection indication information is used to indicate a type of to-be-collected detection data is a smallest MTU on the paths from the source node to the destination node, a reporting module configured to report, to a control node or the source node in the communications network, an MTU on a link from the first node to a next-hop node of the first node based on the multipath detection indication information and the detection data collection indication information, and a sending module configured to send the received first detection packet to the next-hop node of the first node.

Optionally, when the first node has at least two next-hop nodes to a destination of the first detection packet, and the at least two next-hop nodes include a second node and a third node, the sending module is configured to send, by the first node, the received first detection packet to the second node through a first port, where the first node is connected to the second node through the first port, and send, by the first node, the received first detection packet to the third node through a second port, where the first node is connected to the third node through the second port.

Optionally, the reporting module is further configured to determine whether the first node has at least two next-hop nodes to the destination of the first detection packet, and when determining that the first node has at least two next-hop nodes to the destination of the first detection packet, perform the step of reporting, to a control node or the source node in the communications network, an MTU on a link from the first node to a next-hop node of the first node based on the multipath detection indication information and the detection data collection indication information. In this case, the first node further includes an adding module configured to report, by the first node, an existing MTU in the first detection packet to the control node or the source node.

Optionally, if the first node has only one next-hop node to the destination of the first detection packet, the adding module is further configured to add an MTU on a link from the first node to the next-hop node of the first node to the first detection packet.

The sending module is further configured to send, to the next-hop node of the first node, the first detection packet to which the MTU on the link from the first node to the next-hop node of the first node is added.

In this application, the source node only needs to send the first detection packet including the multipath detection indication information and the detection data collection indication information, to detect a plurality of paths from the source node to the destination node. Therefore, the source node can detect a path without repeatedly sending a detection packets, thereby improving path detection efficiency. In addition, because the first node directly sends the first detection packet including the multipath detection indication information and the detection data collection indication information to the next-hop node, the next-hop node of the first node collects the detection data in a same manner as the first node, so that no path from the source node to the destination node is missed, thereby improving path detection accuracy.

According to an eleventh aspect, a source node in a communications network is provided. The communications network includes the source node, one or more intermediate nodes, and a destination node, and the source node includes a generation module configured to generate a first detection packet including multipath detection indication information and detection data collection indication information, where the multipath detection indication information is used to indicate that the detection packet is used to detect a plurality of paths from the source node to the destination node, and the detection data collection indication information is used to indicate a type of to-be-collected detection data, and a sending module configured to send the first detection packet to a next-hop node of the source node.

Optionally, the type of to-be-collected detection data includes one or more of a path topology from the source node to the destination node, a packet loss rate on the path from the source node to the destination node, a smallest MTU on the paths from the source node to the destination node, and a delay on the path from the source node to the destination node.

Optionally, the first detection packet includes a first instruction and a second instruction, the first instruction carries the multipath detection indication information, and the second instruction carries the detection data collection indication information.

Optionally, the first detection packet includes a first instruction and telemetry indication information, the first instruction carries the multipath detection indication information, and the telemetry indication information carries the detection data collection indication information.

Optionally, the detection data collection indication information includes a node identity, an identity of an ingress for receiving the first detection packet, and an identity of an egress for sending the first detection packet, and is used to indicate that the type of to-be-collected detection data is the path topology from the source node to the destination node and/or the packet loss rate on the path from the source node to the destination node, or the detection data collection indication information includes an MTU, and is used to indicate that the type of to-be-collected detection data is the smallest MTU on the paths from the source node to the destination node, or the detection data collection indication information includes a node identity, an identity of an ingress for receiving the first detection packet, a timestamp for receiving the first detection packet, an identity of an egress for sending the first detection packet, and a timestamp for sending the first detection packet, and is used to indicate that the type of to-be-collected detection data is the delay on the path from the source node to the destination node.

According to a twelfth aspect, a computer readable storage medium is further provided. The computer readable storage medium stores an instruction, and when the instruction is run on a computer, the computer is enabled to perform any path detection method according to the first aspect, the second aspect, or the third aspect.

According to a thirteenth aspect, a computer program product including an instruction is further provided. When the instruction is run on a computer, the computer is enabled to perform any path detection method according to the first aspect, the second aspect, or the third aspect.

According to a fourteenth aspect, a chip is provided. The chip is configured in a source node and is used in a communications network, and the communications network includes the source node, one or more intermediate nodes, and a destination node. The chip includes a processor and an interface circuit.

The interface circuit is configured to receive an instruction and transmit the instruction to the processor.

The processor is configured to perform the path detection method according to any one of the third aspect.

According to a fifteenth aspect, a chip is provided. The chip is configured in a first node and is used in a communications network, the communications network includes a source node, one or more intermediate nodes, and a destination node, the first node is any one of the one or more intermediate nodes, and the chip includes a processor and an interface circuit.

The interface circuit is configured to receive an instruction and transmit the instruction to the processor.

The processor is configured to perform the path method according to any one of the first aspect or the path method according to any one of the second aspect.

According to a sixteenth aspect, a control node in a communications network is provided. The control node is configured to receive detection data reported by a destination node or by a destination node and an intermediate node, and analyze, based on the reported detection data, one or more of a path topology from a source node to the destination node, a smallest MTU on paths from the source node to the destination node, a delay on the path from the source node to the destination node, and a packet loss rate on the path from the source node to the destination node.

DESCRIPTION OF EMBODIMENTS

Figure 1:
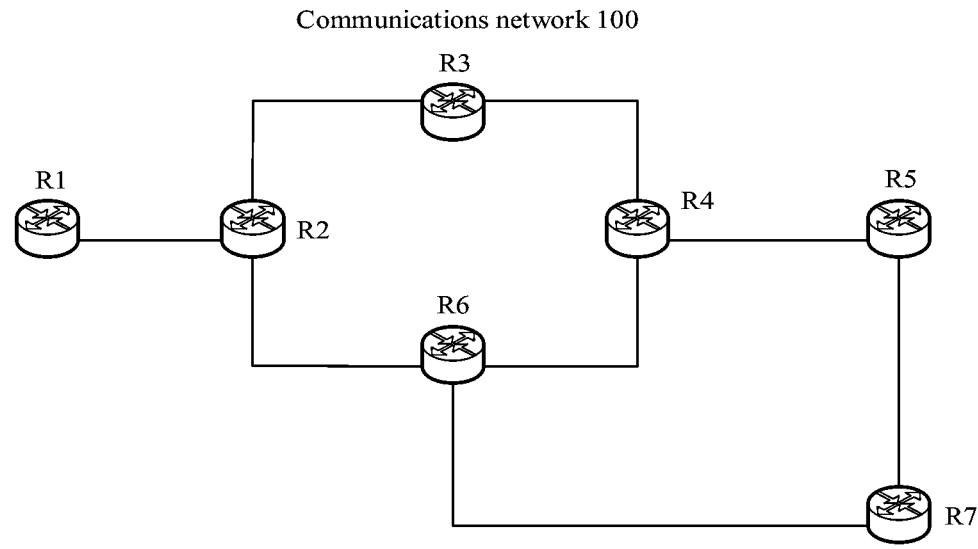
FIG. 1 is a schematic architectural diagram of a communications network according to an embodiment of this application.

To make objectives, technical solutions, and advantages of this application clearer, the following further describes implementations of this application in detail with reference to accompanying drawings.

It should be understood that "a plurality of" is two or more than two in this specification. In descriptions of this application, "I" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, for convenience of clear description of the technical solutions in the embodiments of this application, in the embodiments of this application, terms such as "first", "second", and the like are used to distinguish same objects or similar objects whose functions and purposes are basically the same. A person skilled in the art may understand that the terms such as "first" and "second" do not limit a quantity or an execution sequence, and the terms such as "first" and "second" do not indicate a definite difference.

Before a path detection method provided in the embodiments of this application is used, an application scenario in the embodiments of this application is first described.

Conventional traceroute is used to measure a path between devices (hosts or network devices) on a network, and is widely used for the following purposes:

(1) to diagnose a connectivity problem between devices;

(2) to calculate network performance, such as a delay and a packet loss rate; and (3) to restore a network topology.

Network detection technologies include a Paris traceroute (a new path tracing technology) solution and a Multiprotocol Label Switching (MPLS)-label switched path (LSP) multipath trace solution.

In the Paris traceroute solution, a multipath detection algorithm (MDA) (which is mainly used to change a field used for hash in a data packet) is implemented on a source device, and a plurality of groups of detection packets (which are used to detect a path from a source device to a destination device) are generated according to the MDA algorithm. Each group of detection packets includes a different field used by an intermediate device for a hash algorithm, to cover all possible paths. This solution has the following two disadvantages. To detect all paths, a plurality of redundant detection packets is received on each path during each detection. The MDA algorithm does not ensure that all paths are detected, but to cover all possible paths. However, some paths may be missed, resulting in inaccurate collected information.

In the MPLS LSP multipath trace solution, the source device sends data packets with different time to lives (TTLs) and hash fields to intermediate devices. The intermediate device returns hash fields corresponding to all outbound interfaces to the source device, and the source device reconstructs corresponding packets to complete multipath information collection. This solution has the following two disadvantages. It is uncertain that each outbound interface can find an address segment in multipath information (used for hash) specified by a previous node. As a result, collected information is inaccurate. There are some redundant detection packets on a shared path, and a period for detecting all path information is long (detection is performed on each path hop by hop, and serial detection is performed between paths).

It can be learned that the conventional traceroute method is inaccuracy and low efficiency in multipath scenarios (ECMP), unequal-cost multipath (UCMP), and link aggregation group (LAG). However, the path detection method provided in the embodiments of this application is used in the foregoing multipath scenarios, to improve accuracy and efficiency of obtaining detection data in the multipath scenarios.

In addition, a device and a node in the embodiments of this application may be exchanged. For example, a source device may be referred to as a source node, an intermediate device may be referred to as an intermediate node, and a destination device may be referred to as a destination node. In the embodiments, information about a path from the source device to the destination device needs to be detected, and the detected path information is reported to a controller device or forwarded to the source device. The controller device or the source device analyzes a multipath topology from the source device to the destination device or path performance based on the detected path information. In addition, the source node may also be referred to as a head node.

The path detection method provided in the embodiments of this application is used in a communications network including a plurality of paths, and the communications network includes a source node, one or more intermediate nodes, and a destination node. FIG. 1 is a schematic architectural diagram of a communications network according to an embodiment of this application. A topology between nodes and a specific quantity of nodes in the communications network shown in FIG. 1 are merely used as examples for description, and do not constitute limitations on the communications network to which the path detection method provided in the embodiments of this application can be applied.

As shown in FIG. 1, the communications network 100 includes a source node R1, intermediate nodes R2, R3, R4, R6, and R7, and a destination node R5. As shown in FIG. 1, the source node R1 may be connected to the intermediate node R2 in a wireless or wired manner for communication, and the intermediate node R2 may be connected to the intermediate node R3 in a wired or wireless manner for communication, the intermediate node R3 may be connected to the intermediate node R4 in a wired or wireless manner for communication, and the intermediate node R4 may be connected to the destination node R5 in a wired or wireless manner for communication. That is, the source node R1, the intermediate node R2, the intermediate node R3, the intermediate node R4, and the destination node R5 form a first path from the source node R1 to the destination node R5.

As shown in FIG. 1, the intermediate node R2 may further be connected to the intermediate node R6 in a wired or wireless manner for communication, and the intermediate node R6 may be connected to the intermediate node R4 in a wired or wireless manner for communication. In this case, the source node R1, the intermediate node R2, the intermediate node R6, the intermediate node R4, and the destination node R5 form a second path from the source node R1 to the destination node R5.

In addition, as shown in FIG. 1, the intermediate node R6 may further be connected to the intermediate node R7 in a wired or wireless manner for communication, and the intermediate node R7 may be connected to the intermediate node R5 in a wired or wireless manner for communication. In this case, the source node R1, the intermediate node R2, the intermediate node R6, the intermediate node R7, and the destination node R5 form a third path from the source node R1 to the destination node R5.

Each node in the communications network shown in FIG. 1 may be any device, for example, may be a device such as a router, a gateway, or a switch. Examples are not described one by one herein.

The following describes in detail the path detection method provided in the embodiments of this application.

Figure 2:
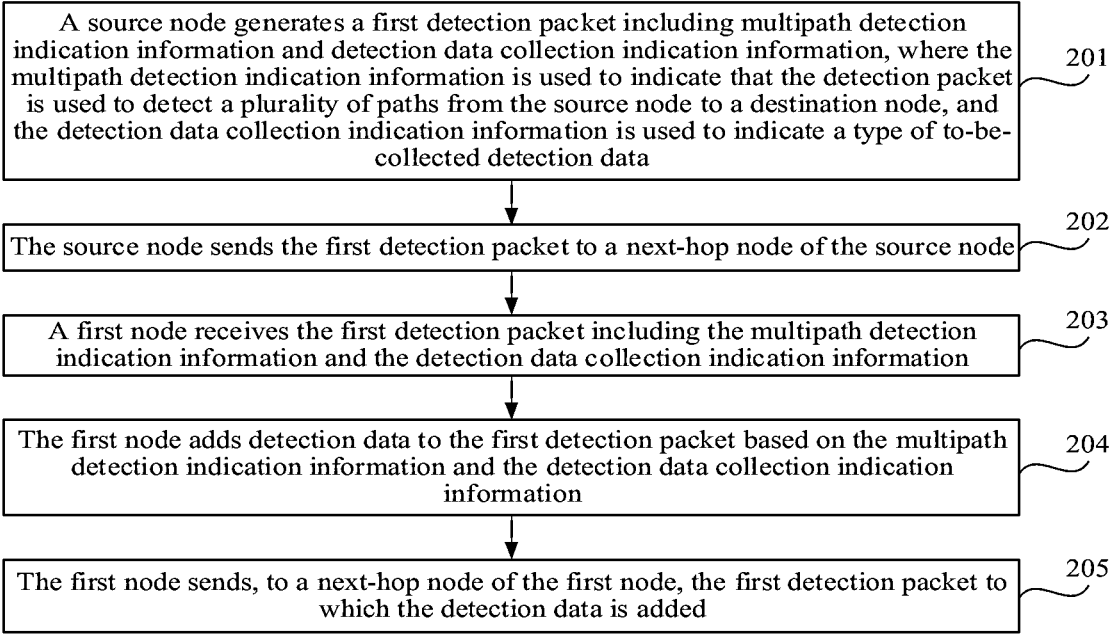
FIG. 2 is a flowchart of a path detection method according to an embodiment of this application.

FIG. 2 is a schematic flowchart of a path detection method according to an embodiment of this application. The path detection method may be applied to the communications network shown in FIG. 1. As shown in FIG. 2, the path detection method includes the following steps.

Step 201: A source node generates a first detection packet including multipath detection indication information and detection data collection indication information, where the multipath detection indication information is used to indicate that the detection packet is used to detect a plurality of paths from the source node to a destination node, and the detection data collection indication information is used to indicate a type of to-be-collected detection data.

To improve path detection efficiency and path detection accuracy, this embodiment of this application provides a method using a detection packet. For ease of subsequent description, the detection packet is referred to as the first detection packet. The first detection packet includes the multipath detection indication information and the detection data collection indication information. In a specific implementation, the first detection packet includes a first instruction and a second instruction, the first instruction carries the multipath detection indication information, and the second instruction carries the detection data collection indication information. In another specific implementation, the first detection packet includes a first instruction and telemetry indication information, the first instruction carries the multipath detection indication information, and the telemetry indication information carries the detection data collection indication information. The first instruction may alternatively be referred to as an instruction A, and the second instruction may alternatively be referred to as an instruction B. That is, in this embodiment of this application, the multipath detection indication information may be represented by an instruction A used to indicate multipath information collection. The detection data collection indication information may be represented by an information collection instruction B, or an existing telemetry indication information is used to indicate a type of to-be-collected detection data.

In a specific implementation, a field encapsulated in the instruction B or the telemetry indication information may be the type of to-be-collected detection data. In this scenario, a correspondence between a type and to-be-collected specific data is prestored in each node in the communications network. For example, when the type is a path topology from the source node to the destination node or a packet loss rate on the path from the source node to the destination node, corresponding to-be-collected specific data includes an identity (ID) of a current node, an ID of an ingress, and an ID of an egress. When the type is a smallest MTU on the paths from the source node to the destination node, corresponding to-be-collected specific data includes an MTU on a link from a current node to a next-hop node. When the type is a delay on the path from the source node to the destination node, corresponding to-be-collected specific data includes timestamps for receiving and sending the packet, an ID of a current node, an ID of an ingress, and an ID of an egress. Subsequently, when any node receives the first detection packet including the instruction B or the telemetry indication information, the node may learn of to-be-collected specific data based on the type encapsulated in the instruction B or the telemetry indication information and the stored correspondence.

The correspondence between a type and to-be-collected specific data may be pre-published by a control node in the communications network, or configured by a network management system on each node. This is not limited. In addition, the control node in the communications network is configured to manage all nodes in the communications network shown in FIG. 1, for example, publish configuration information of all the nodes. The control node may alternatively be referred to as a controller, a controller device, or the like.

In another specific implementation, the detection data collection indication information in the first detection packet may be implemented by encapsulating to-be-collected specific data in the instruction B or the telemetry indication information. For example, when the path topology from the source node to the destination node needs to be detected or the packet loss rate on the path from the source node to the destination node needs to be detected in a current scenario, a field encapsulated in the instruction B or the telemetry indication information may be an ID of a current node, an ID of an ingress, and an ID of an egress. When the smallest MTU on the paths from the source node to the destination node needs to be detected in a current scenario, a field encapsulated in the instruction B or the telemetry indication information may be an MTU. When the delay on the path from the source node to the destination node needs to be detected in a current scenario, a field encapsulated in the instruction B or the telemetry indication information may be timestamps for receiving and sending the packet, an ID of a current node, an ID of an ingress, and an ID of an egress.

It should be noted that the detection data collection indication information may indicate only one type of to-be-collected detection data, or may indicate a plurality of types of to-be-collected detection data. When the detection data collection indication information indicates a plurality of types of to-be-collected detection data, a first node may collect a plurality of types of detection data at the same time. Examples are not described one by one herein.

In addition, the first detection packet may further include indication information indicating a source address and destination address pair of the packet. In a specific implementation, the first detection packet may further include a third instruction, and the third instruction carries the indication information indicating the source address and destination address pair of the packet. For example, the third instruction is represented by an instruction C. The instruction C indicates that a source address is an address of R1 and a destination address is an address of R6 in the source address and destination address pair in the first detection packet. A value of the instruction C may be 1 or another value.

Different source address and destination address pairs have different values. In this way, as long as another node in the network learns that the value of the instruction C included in the detection packet is 1, the other node may determine that the source address of the packet is the address of the R1 and the destination address of the packet is the address of the R6, without parsing source address and destination address information carried in another part of the packet. This improves packet processing efficiency. The instruction C in the detection packet in the following other embodiments has a same meaning.

Figure 3:
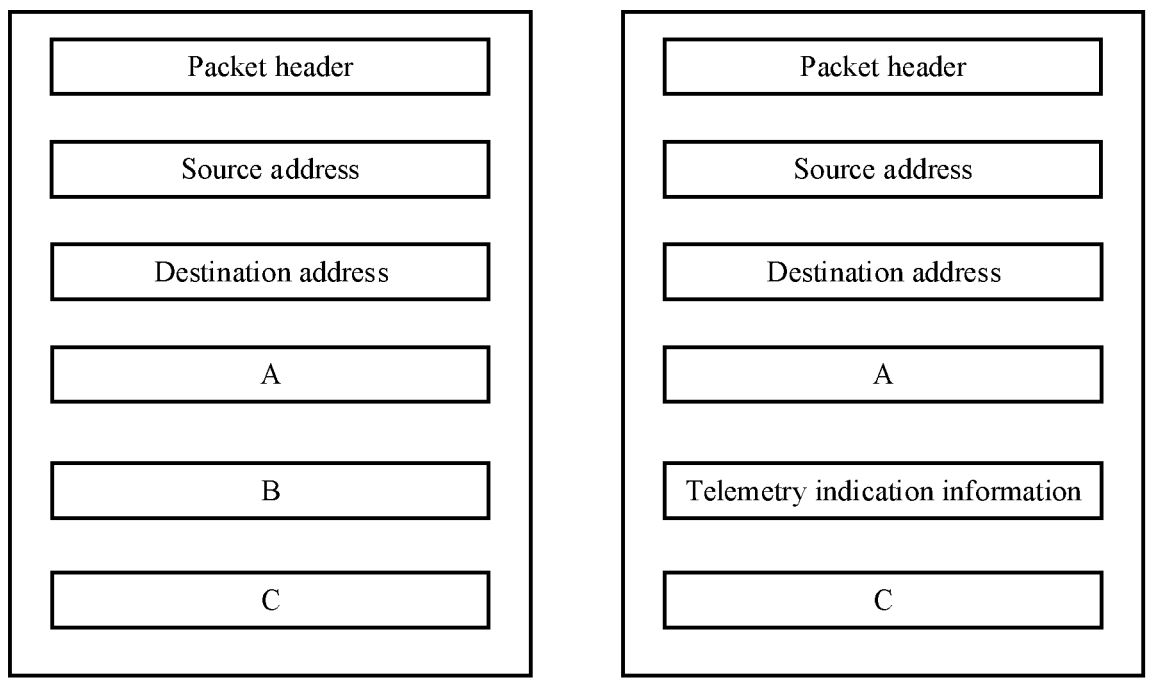
FIG. 3 is a schematic structural diagram of a detection packet according to an embodiment of this application.

FIG. 3 shows structures of two types of first detection packets according to an embodiment of this application. The first detection packet on the left of FIG. 3 includes a header, a source address (source), and a destination address (destination), and A, B, and C represent the foregoing instructions A, B, and C respectively. The first detection packet on the right of FIG. 3 includes a header, a source address (source), and a destination address (destination), and A, telemetry indication information, and C represent the instruction A, the telemetry indication information (represented as the telemetry indication information in FIG. 3), and the instruction C respectively. A packet structure of a detection packet in the following other embodiments may be the same as the packet structure shown in FIG. 3.

Step 202: The source node sends the first detection packet to a next-hop node of the source node.

It can be learned from step 201 that an instruction B or telemetry indication information encapsulated in the first detection packet sent by the source node to the next-hop node may vary with a detection scenario. The following separately explains and describes different scenarios. Details are not described herein.

Step 203: The first node receives the first detection packet including the multipath detection indication information and the detection data collection indication information.

In this case, the first node is the next-hop node of the source node. When the first node sends the first detection packet to a next-hop node of the first node by performing step 203 to step 205, the next-hop node of the first node may forward the first detection packet by referring to step 203 to step 205. Therefore, in this embodiment of this application, the first node in step 203 to step 205 may be actually any intermediate node in the communications network.

Step 204: The first node adds detection data to the first detection packet based on the multipath detection indication information and the detection data collection indication information.

To collect detection data, the first node needs to add the detection data to the first detection packet based on the multipath detection indication information and the detection data collection indication information. Detection data added by the first node is different varies with a detection scenario. The following separately explains and describes different scenarios, and details are not described herein.

Step 205: The first node sends, to the next-hop node of the first node, the first detection packet to which the detection data is added.

The first detection packet may be forwarded to the next-hop node in step 205, so that each next-hop node can continue to collect detection data and add specific detection data.

In this embodiment of this application, the source node only needs to send the first detection packet in step 201, to detect the plurality of paths from the source node to the destination node. Therefore, the source node does not need to repeatedly send a detection packet, and no path from the source node to the destination node is missed. The path detection method provided in this embodiment of this application can improve both path detection efficiency and path detection accuracy.

It can be learned from the embodiment shown in FIG. 2 that the path detection method provided in this embodiment of this application may be applied to different detection scenarios. For example, the method may be applied to a scenario in which the path topology from the source node to the destination node needs to be detected, or may be applied to a scenario in which the packet loss rate on the path from the source node to the destination node needs to be detected, or may be applied to a scenario in which the smallest MTU on the paths from the source node to the destination node needs to be detected, or may be applied to a scenario in which the delay on the path from the source node to the destination node needs to be detected. The following separately describes path detection processes in the foregoing scenarios. It should be noted that the foregoing scenarios are merely used as examples for description, and do not constitute a limitation on the path detection method provided in the embodiments of this application. The path detection method provided in the embodiments of this application may also be applied to another detection scenario. For example, the method may alternatively be applied to a scenario in which a jitter status on the path from the source node to the destination node needs to be detected. In this case, a type of to-be-collected detection data may also be indicated based on the detection data collection indication information, and details are not described herein again.

Figure 4:
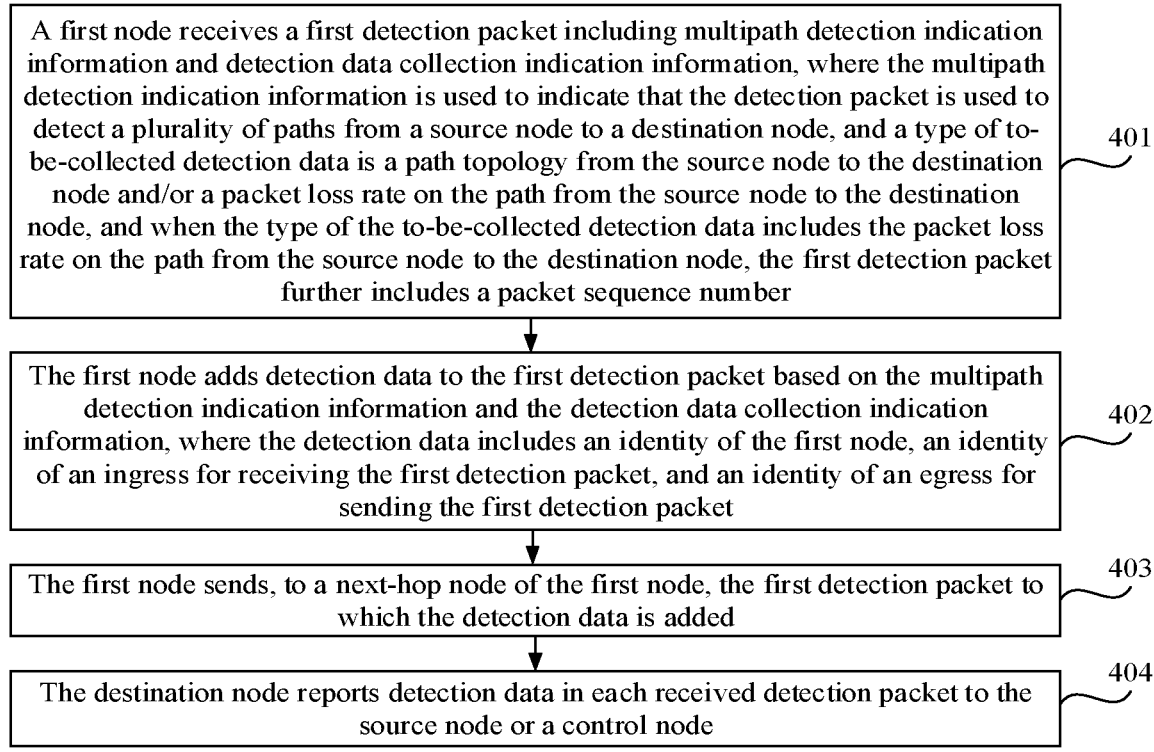
FIG. 4 is a flowchart of another path detection method according to an embodiment of this application.

FIG. 4 is a flowchart of a path detection method according to an embodiment of this application. The method is applied to a scenario in which a path topology from a source node to a destination node and/or a packet loss rate on a path from the source node to the destination node need/needs to be detected. As shown in FIG. 4, the method includes the following steps.

Step 401: A first node receives a first detection packet including multipath detection indication information and detection data collection indication information, where the multipath detection indication information is used to indicate that the detection packet is used to detect a plurality of paths from the source node to the destination node, and a type of to-be-collected detection data is the path topology from the source node to the destination node and/or the packet loss rate on the path from the source node to the destination node, and when the type of to-be-collected detection data includes the packet loss rate on the path from the source node to the destination node, the first detection packet further includes a packet sequence number.

That is, the embodiment shown in FIG. 4 may be applied to a scenario in which the path topology from the source node to the destination node needs to be detected, or may be applied to a scenario in which the packet loss rate on the path from the source node to the destination node needs to be detected, or may be applied to a scenario in which both the two types of detection data need to be detected. In the latter two scenarios, the first detection packet needs to include the packet sequence number, so that the source node or a control node subsequently determines the packet loss rate based on the packet sequence number.

Step 402: The first node adds detection data to the first detection packet based on the multipath detection indication information and the detection data collection indication information, where the detection data includes an identity of the first node, an identity of an ingress for receiving the first detection packet, and an identity of an egress for sending the first detection packet.

In a specific implementation, when receiving the first detection packet, the first node may first add the identity of the first node and the identity of the ingress for receiving the first detection packet to the first detection packet, then send the first detection packet through the egress, and then add the identity of the egress for sending the first detection packet to the first detection packet or encapsulate the identity in the first detection packet. For a specific implementation process, refer to detailed descriptions in the following embodiment shown in FIG. 5.

Step 403: The first node sends, to a next-hop node of the first node, the first detection packet to which the detection data is added.

In a specific implementation, when the first node has at least two next-hop nodes to a destination of the first detection packet, the following uses an example in which the first node has two next-hop nodes (referred to as a second node and a third node) to the destination of the first detection packet for description. The first node is connected to the second node through a first port, and is connected to the third node through a second port. An identity of the first port is an identity of a first egress, and an identity of the second port is an identity of a second egress. In this scenario, an implementation process in which the first node sends, to the next-hop node of the first node, the first detection packet to which the detection data is added includes that the first node sends, to the second node through the first port, the first detection packet to which the identity of the first node, the identity of the ingress for receiving the first detection packet, and the identity of the first egress for sending the first detection packet are added, and the first node sends, to the third node through the second port, the first detection packet to which the identity of the first node, the identity of the ingress for receiving the first detection packet, and the identity of the second egress for sending the first detection packet are added.

In the foregoing implementation, when the first node has at least two next-hop nodes to the destination of the first detection packet, the first node needs to make a copy of the first detection packet, to send the first detection packet to each next-hop node. In this way, no path from the source node to the destination node is missed.

When receiving the first detection packet, the next-hop node may also continue to collect detection data and forward the first detection packet with reference to step 401 to step 403, until the destination node receives the first detection packet.

Step 404: The destination node reports detection data in each received detection packet to the source node or the control node.

Because there is the plurality of paths from the source node to the destination node, the destination node finally receives a plurality of first detection packets. In this case, in a specific implementation, the destination node may modify destination addresses of the received first detection packets, to report the received first detection packets to the control node or the source node in the communications network, and the control node or the source node analyzes the plurality of paths from the source node to the destination node based on the detection data that is added by nodes and that is carried in the received first detection packets.

In another specific implementation, the destination node may alternatively report, to the control node or the source node in the communications network, the detection data that is added by nodes and that is carried in the received first detection packets, the control node or the source node analyzes the plurality of paths from the source node to the destination node based on the detection data added by the nodes.

It may be understood that the destination node may further report the detection data to the control node (for example, a packet format used for packet exchange between the control node and the destination node) or the source node by using another packet format. Details are not described herein again.

Figure 5:
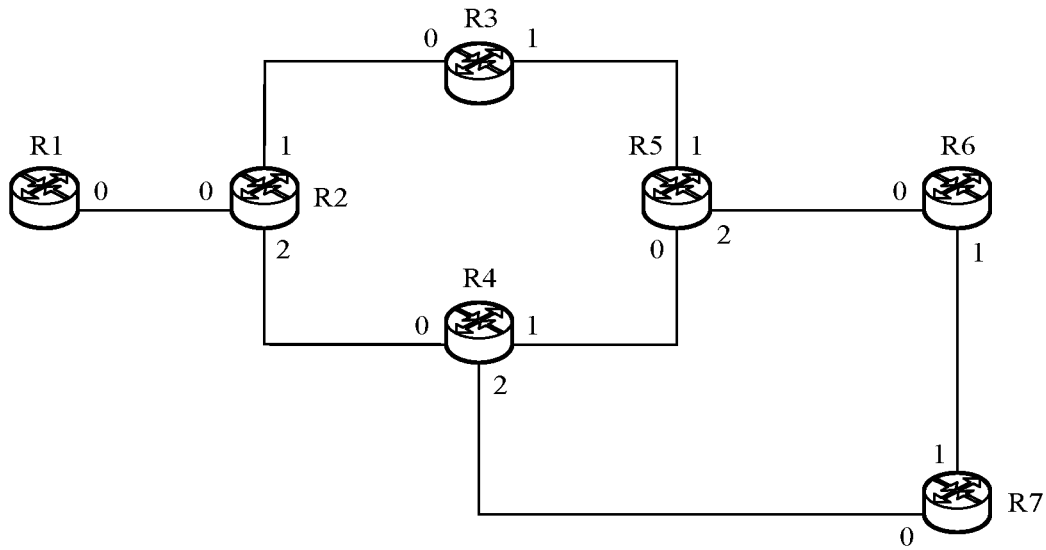
FIG. 5 is a schematic architectural diagram of another communications network according to an embodiment of this application.

The following further describes step 401 to step 404 by using a communications network shown in FIG. 5.

Assuming that a current scenario is the scenario in which the path topology from the source node to the destination node needs to be detected, and the detection data collection indication information in the first detection packet is implemented by adding to-be-collected specific data to an instruction B or telemetry indication information, the source node encapsulates a node ID (R1) of the source node and an ID (0) of an outbound interface for forwarding the first detection packet in the generated first detection packet including the detection data collection indication information, and forwards the first detection packet to an intermediate node R2, to indicate the R2 to collect detection data based on the specific data indicated in the detection data indication information.

After receiving the first detection packet, the intermediate node R2 identifies, based on an instruction A, that multipath data collection needs to be performed. The intermediate node R2 encapsulates, based on the information collection instruction B or the telemetry indication information, information that needs to be carried, to be specific, encapsulates a node ID (R2) of the R2 and a detection packet inbound interface ID (0). The R2 detects that the R2 has a plurality of paths to a destination address of the first detection packet, in other words, the R2 has N (N>1) outbound interfaces (two outbound interfaces in this embodiment). In other words, the R2 may have two next-hop nodes (R3 and R4) to the destination of the first detection packet. In a specific implementation, the plurality of outbound interfaces may be detected by using technologies such as ECMP, UCMP, and LAG. The R2 makes N–1 copies of the detection packet (N=2 in this embodiment, and therefore, one copy is made), and encapsulates identities of corresponding outbound interfaces in N packets obtained after copy (in this embodiment, identities of an outbound interface 1 and an outbound interface 2 are encapsulated in two packets obtained after copy respectively). Then, the R2 forwards, through the outbound interface 1, a packet encapsulated with the identity of the outbound interface 1, and forwards, through the outbound interface 2, a packet encapsulated with the identity of the outbound interface 2.

It should be noted that detecting a quantity of outbound interfaces and encapsulating the node ID (R2) and the detection packet inbound interface ID (0) are not limited in sequence. After the detecting step, the node ID (R2), the detection packet inbound interface ID (0), and a corresponding outbound interface identity may be encapsulated in each of the two detection packets. For ease of description, in the embodiments of this application (including the following embodiments), a packet received by the R2 from the R1 may be referred to as the first detection packet, and detection packets to which different outbound interface information or other information (as described in the following other embodiments) is added and that are sent through different outbound interfaces are referred to as a second detection packet (a detection packet sent through the outbound interface R2(1)) and a third detection packet (a detection packet sent through the outbound interface R2(2)). It may be understood that the first detection packet, the second detection packet, and the third detection packet are merely for ease of differentiation. In essence, a subject of the second detection packet and the third detection packet is still the first detection packet received from the R1, and only different outbound interface information or other information is added. A subject of any detection packet in subsequent content is still the first detection packet received from the R1.

After receiving the second detection packet, the R3 performs the same operation as the R2. After encapsulating a node ID of the R3, an inbound interface ID, and an outbound interface ID, the R3 sends the detection packet to R5. Then, the R5 performs the same operation and sends the detection packet to a destination node R6. Information finally encapsulated in the detection packet of the R6 is R1(0)-(0)R2(1)-(0)R3(1)-(1)R5(2)-(0)R6. Herein, R1 to R6 are IDs of all nodes through which the packet passes, information on the left of a node ID is an ID of an inbound interface through which the detection packet enters the node, and information right of a node ID is an ID of an outbound interface through which the detection packet leaves the node.

After receiving the detection packet, the R4 performs an operation similar to that of the R2, and encapsulates a node ID of the R4 and an inbound interface ID. Because the R4 has a plurality of interfaces, the R4 obtains two detection packets through copy. The two detection packets are R1(0)-(0)R2(2)-(0)R4(1) and R1(0)-(0)R2(2)-(0)R4(2). Then, the R4 forwards the detection packet R1(0)-(0)R2(2)-(0)R4(1) to the R5 through an outbound interface 1, and forwards the detection packet R1(0)-(0)R2(2)-(0)R4(2) to a node R7 through an outbound interface 2. After receiving the detection packets from the R4, the R5 and the R7 perform corresponding operations and send the respective received detection packets to the destination node R6. The R6 receives another two detection packets: R1(0)-(0)R2(2)-(0)R4(1)-(0)R5(2)-(0)R6 and R1(0)-(0)R2(2)-(0)R4(2)-(0)R7(1)-(1)R6.

For this detection from the source node R1 to the destination node R6, the destination node R6 receives three detection packets in total, and detection data added to the three detection packets is R1(0)-(0)R2(1)-(0)R3(1)-(1)R5(2)-(0)R6, R1(0)-(0)R2(2)-(0)R4(1)-(0)R5(2)-(0)R6, and R1(0)-(0)R2(2)-(0)R4(2)-(0)R7(1)-(1)R6. The destination node R6 may report the information to the control node or forward the information to the source node by using a detection packet. For example, the R6 may change destination addresses of the three detection packets to an address of the source node or the control node, to report the three detection packets to the control node or forward the three detection packets to the source node. The control node or the source node calculates the topology from the R1 to the R6 based on the received detection packets.

For the plurality of received detection packets, the control node or the source node may associate, based on destination addresses and source addresses in the detection packets or instructions C in the detection packets, detection packets used to perform detection from a same source node to the destination node. For the associated detection packets, node identities, node ingress identities, and node egress identities in the detection packets are obtained, and the multipath topology from the destination node to the source node may be restored based on the obtained data.

If a current scenario is the scenario in which the packet loss rate on the path from the source node to the destination node needs to be detected, because the first detection packet includes the packet sequence number, the destination node may determine, based on packet sequence numbers in the received detection packets, packets that are sent by the source node and that are successfully received. The destination node may report the detection packets to the control node or forward the detection packets to the source node, and the control node or the source node determines the packet loss rate on the path from the source node to the destination node based on the successfully received detection packets and all detection packets sent by the source node.

The outbound interface in the foregoing embodiment is also an egress, and the inbound interface is also an ingress. In other words, in this embodiment of this application, the outbound interface and the egress may be exchanged, and the inbound interface and the ingress may be exchanged.

In addition, in the embodiment shown in FIG. 4, after receiving the first detection packet, each node only needs to add detection data to the first detection packet. Finally, the destination node reports, to the source node or the control node, all detection data collected by the nodes, and then, the source node or the control node analyzes the plurality of paths from the source node to the destination node. This path detection mode may also be referred to as a trace (trace) mode.

The multipath topology is detected in this embodiment, so that a detection packet redundancy problem can be resolved, and detection efficiency and detection accuracy are improved.

In the embodiment shown in FIG. 4, the destination node reports, to the source node or the control node, all the detection data added by the intermediate nodes to the first detection packet. In the embodiments of this application, alternatively, each intermediate node may report the detection data to the source node or the control node. This is explained and described in the following embodiments.

Figure 6:
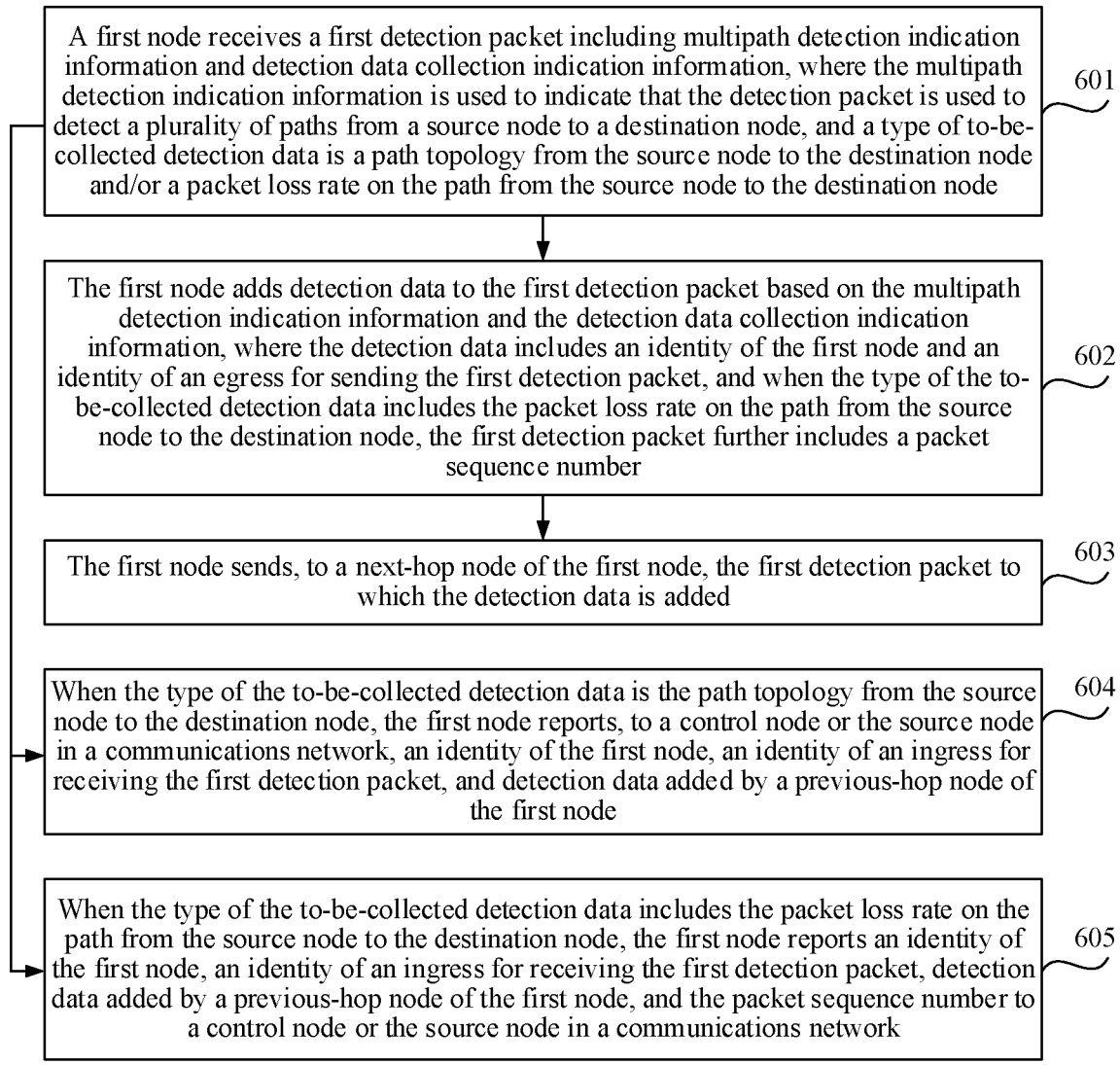
FIG. 6 is a flowchart of another path detection method according to an embodiment of this application.

FIG. 6 is a flowchart of a path detection method according to an embodiment of this application. The method is also applied to a scenario in which a path topology from a source node to a destination node and/or a packet loss rate on a path from the source node to the destination node need/needs to be detected. As shown in FIG. 6, the method includes the following steps.

Step 601: A first node receives a first detection packet including multipath detection indication information and detection data collection indication information, where the multipath detection indication information is used to indicate that the detection packet is used to detect a plurality of paths from the source node to the destination node, and a type of to-be-collected detection data is the path topology from the source node to the destination node and/or the packet loss rate on the path from the source node to the destination node.

For an implementation of step 601, refer to step 401. Details are not described herein again.

Step 602: The first node adds detection data to the first detection packet based on the multipath detection indication information and the detection data collection indication information, where the detection data includes an identity of the first node and an identity of an egress for sending the first detection packet, and when the type of to-be-collected detection data includes the packet loss rate on the path from the source node to the destination node, the first detection packet further includes a packet sequence number.

For a specific implementation process, refer to detailed descriptions in the following embodiment shown in FIG. 5.

In step 602, the first node adds, to the first detection packet, the identity of the first node and the identity of the egress for sending the detection packet, and directly reports data such as the identity of the first node, an ingress identity, and detection data added by a previous-hop node of the first node to the source node or the destination node by using step 604 and step 605. In this way, load of a detection packet sent by the first node to a next-hop node can be reduced, thereby improving efficiency of forwarding the detection packet.

Step 603: The first node sends, to the next-hop node of the first node, the first detection packet to which the detection data is added.

In this embodiment, the first node needs to report the detection data to the source node or a control node. Therefore, in a specific implementation, when the first node has at least two next-hop nodes to a destination of the first detection packet, the following uses an example in which the first node has two next-hop nodes (referred to as a second node and a third node) to the destination of the first detection packet for description. The first node is connected to the second node through a first port, and is connected to the third node through a second port. An identity of the first port is an identity of a first egress, and an identity of the second port is an identity of a second egress. In this scenario, an implementation process in which the first node sends, to the next-hop node of the first node, the first detection packet to which the detection data is added includes that the first node sends, to the second node, the first detection packet to which the identity of the first node and the identity of the first egress for sending the first detection packet are added, where the first node is connected to the second node through the first port identified by the identity of the first egress for sending the first detection packet, and the first node sends, to the third node, the first detection packet to which the identity of the first node and the identity of the second egress for sending the first detection packet are added, where the first node is connected to the third node through the second port identified by the identity of the second egress for sending the first detection packet.

That is, after reporting some detection data to the source node or the destination node, the first node only needs to encapsulate the identity of the first node and the identity of the egress for sending the detection packet in the first detection packet, and then send the encapsulated first detection packet to the next-hop node.

Step 604: When the type of to-be-collected detection data is the path topology from the source node to the destination node, the first node reports, to a control node or the source node in a communications network, an identity of the first node, an identity of an ingress for receiving the first detection packet, and detection data added by a previous-hop node of the first node.

For a specific implementation process, refer to detailed descriptions in the following embodiment shown in FIG. 5.

Step 605: When the type of to-be-collected detection data includes the packet loss rate on the path from the source node to the destination node, the first node reports an identity of the first node, an identity of an ingress for receiving the first detection packet, detection data added by a previous-hop node of the first node, and the packet sequence number to a control node or the source node in a communications network.

For a specific implementation process, refer to detailed descriptions in the following embodiment shown in FIG. 5.

By performing step 604 and step 605, the first node may report the detection data to the control node or the source node.

In step 604 and step 605, the first node may directly report the detection data to the control node or the source node, or may first use the first detection packet to carry the detection data for reporting. In the latter implementation, the first node may first add the identity of the first node and the identity of the ingress for receiving the first detection packet to the first detection packet, and then report, to the source node or the destination node, the first detection packet to which the two pieces of detection data are added. Subsequently, when the first node needs to send the detection packet to the next-hop node, the first node deletes the identity of the ingress for receiving the first detection packet and the detection data added by the previous-hop node of the first node, and encapsulates the identity of the egress for sending the detection packet, so that the first detection packet can be sent to the next-hop node. It may be understood that the detection data may be reported to the control node (for example, a packet format used for packet exchange between the control node and the intermediate node) or the source node by using another packet format. When the detection data is directly reported or the detection data is reported in another packet format, the first node may delete the detection data added by the previous-hop node, and then add the identity of the first node and the identity of the egress for sending the detection packet. Certainly, the first node may directly add the identity of the first node and the identity of the egress for sending the detection packet without deleting the detection data added by the previous-hop node.

The following further describes step 601 to step 605 by using a communications network shown in FIG. 5.

Assuming that a current scenario is the scenario in which the path topology from the source node to the destination node needs to be detected, and the detection data collection indication information in the first detection packet is implemented by adding to-be-collected specific data to an instruction B or telemetry indication information, the source node encapsulates a node ID (R1) of the source node and an ID (0) of an outbound interface for forwarding the detection packet in the detection packet, and forwards the detection packet to an intermediate node R2. The following uses an example in which each intermediate node uses the first detection packet to carry the detection data for reporting.

After receiving the detection packet, the intermediate node R2 identifies, based on an instruction A, that multipath data collection needs to be performed. The node R2 encapsulates, in the first detection packet based on the instruction B or the telemetry indication information, information that needs to be carried, to be specific, encapsulates a node ID (R2) of the node R2 and a detection packet inbound interface ID (0). The R2 detects that the R2 has a plurality of paths to a destination address of the first detection packet, in other words, the R2 has N (N>1) outbound interfaces (two outbound interfaces in this embodiment). In other words, the R2 may have two next-hop nodes (R3 and R4) to the destination of the first detection packet. In a specific implementation, the plurality of outbound interfaces may be detected by using technologies such as ECMP, UCMP, and LAG. The R2 reports the first detection packet encapsulated with (R1(0)-(0)R2) to the control node or forwards the first detection packet to the source node, and then deletes the ingress identity of the R2 and detection data (R1(0) in this embodiment) added by another node in the encapsulated first detection packet. The R2 makes N−1 copies of the detection packet obtained after the data is deleted (in this embodiment, there are two outbound interfaces, and therefore one copy is made), and encapsulates identities of corresponding outbound interfaces in the N detection packets obtained after copy (in this embodiment, identities of an outbound interface 1 and an outbound interface 2 are encapsulated in two detection packets obtained after copy respectively). Then, the R2 sends a detection packet encapsulated with the node ID and the identity of the outbound interface 1 (R2(1)) to the R3 through the outbound interface 1, and sends a detection packet encapsulated with the node ID and the identity of the outbound interface 2 (R2(2)) to the R4 through the outbound interface 2. It should be noted that, in this embodiment, the detection data is reported to the controller or the source node by using a detection packet, another manner of reporting the detection data is also applicable, and details are not described herein. In all scenarios in which the detection data is reported in the following embodiments, a manner of reporting the detection packet is used.

In addition, it should be noted that detecting a quantity of outbound interfaces and encapsulating the node ID (R2) and the detection packet inbound interface ID (0) are not limited in sequence. After the detecting step, the node ID (R2) and the detection packet inbound interface ID (0) may be encapsulated in each of the two detection packets. In this case, only one of the detection packets needs to be reported. After one of the detection packets is reported, data in the two detection packets is deleted, and finally, corresponding outbound interface identities are encapsulated in the detection packets obtained after the data is deleted. In addition, it should also be noted that after the R2 reports, to the source node or the control node, the two detection packets to which the detection data is added, the R2 may directly continue to send the two packets to two next-hop nodes respectively without deleting the data in the detection packets. In this case, the controller may determine data that is used to determine a detection result.

After receiving the detection packet, the R3 performs the same operation as the R2, and encapsulates a node ID of the R3 and an inbound interface ID. The R3 sends the detection packet encapsulated with (R2(1)-(0)R3) to the control node or forwards the packet to the source node. The R3 detects whether the R3 has a plurality of outbound interfaces to the destination address of the first detection packet (only one outbound interface in this embodiment). In other words, the R3 may have one next-hop node (R5) to the destination of the first detection packet. The R3 deletes the data R2(1) encapsulated by the R2 and the inbound interface identity encapsulated by the R3 in the detection packet, then encapsulates an outbound interface identity (1) of the R3, and sends the detection packet encapsulated with R3(1) to the R5. In addition, it should be noted that after the R3 reports, to the source node or the control node, the detection packet to which the detection data is added, the R3 may directly continue to send the packet to the next-hop node without deleting the data in the detection packet.

The detection packet received by the R5 includes only information about the R3, that is, R3(1). The R5 encapsulates a node ID (R5) of the R5 and detection packet inbound interface ID (1), and then reports a detection packet encapsulated with (R3(1)-R5(1)) to the control node or forwards the detection packet to the source node. The R5 detects whether the R5 has a plurality of outbound interfaces to the destination address of the first detection packet (only one outbound interface in this embodiment). In other words, the R5 may have one next-hop node (R6) to the destination of the first detection packet. The R5 deletes the data R3(1) encapsulated by the R3 and the inbound interface identity encapsulated by the R5 in the detection packet, then encapsulates an outbound interface identity (2) of the R5, and sends the detection packet encapsulated with R5(2) to the R6. In addition, it should be noted that after the R5 reports, to the source node or the control node, the detection packet to which the detection data is added, the R5 may directly continue to send the packet to the next-hop node without deleting the data in the detection packet.

After receiving the detection packet, another node performs processing in a manner similar to that of the R2 or the R3. For example, if the R4 has two outbound interfaces to the destination node R6, the R4 performs processing in a manner similar to that of the R2. If the R5 has one outbound interface to the destination node, the R5 performs processing in a manner similar to that of the R3. Details are not described herein.

The R6 finally receives three detection packets (from the R3, the R4, and R7), and data encapsulated in the three detection packets is R5(2)-(0)R6, R5(2)-(0)R6, and R7(1)-(1)R6. The R6 reports the three detection packets to the control node or forwards the three detection packets to the source node.

The control node or the source node receives nine detection packets in total, and content carried in the nine detection packets is R1(0)-(0)R2, R2(1)-(0)R3, R2(2)-(0)R4, R3(1)-(1)R5, R4(1)-(0)R5, R4(2)-(0)R7, R5(2)-(0)R6, R5(2)-(0)R6, and R7(1)-(1)R6. In this case, a restored multipath topology from the R1 to the R6 may be consistent with the paths shown in FIG. 5. For a specific manner, refer to the foregoing embodiments. Details are not described herein again.

For the plurality of received detection packets, the control node or the source node may associate, based on destination addresses and source addresses in the detection packets or instructions C in the detection packets, detection packets used to perform detection from a same source node to the destination node. For the associated detection packets, node identities, node ingress identities, and node egress identities in the detection packets are obtained, and the multipath topology from the destination node to the source node may be restored based on the obtained data.

For the communications network shown in FIG. 5, if each intermediate node directly reports the detection data, sequences of reporting the detection data, encapsulating data in the first detection packet, and sending the detection packet by each intermediate node to a next-hop node are not limited. The R2 in FIG. 5 is used as an example for description. After receiving the detection packet encapsulated with R1(0), the intermediate node R2 may first report R1(0)-(0)R2 to the source node or the control node, and then delete R1(0) in the first detection packet, encapsulate the outbound interface identity of the R2, and send the processed detection packet to the next-hop node. Alternatively, after receiving the detection packet encapsulated with R1(0), the intermediate node R2 may first delete R1(0) in the first detection packet, encapsulate the outbound interface identity of the R2, and send the processed detection packet to the next-hop node, and then report R1(0)-(0)R2 to the source node or the control node. In a scenario in which detection data is directly reported, for an implementation of another node, refer to processing of the intermediate node R2. Details are not described herein again.

In addition, if a current scenario is the scenario in which the packet loss rate on the path from the source node to the destination node needs to be detected, the path detection method provided in this embodiment of this application may also be completed with reference to the foregoing process, and the packet sequence number of the first detection packet needs to be added to the data reported by the first node to the source node or the control node. In this case, because each intermediate node reports data to the source node or the control node, the source node or the control node may not only determine a packet loss rate on each path from the source node to the destination node, but also determine a specific packet loss location on any path. Details are not described herein.

The multipath topology is detected in this embodiment, so that a detection packet redundancy problem can also be resolved, and detection efficiency and detection accuracy are improved.

In the embodiment shown in FIG. 6, each intermediate node reports the detection data to the source node or the control node. In the embodiments of this application, alternatively, some intermediate nodes in the intermediate nodes may report detection data, and other nodes do not need to report detection data. The intermediate node that reports the detection data may be an intermediate node that meets a specified condition. The specified condition may be that the intermediate node has a plurality of next-hop nodes to the destination node, or may be another specified condition. The following embodiment is described by using an example in which the specified condition is that the intermediate node has a plurality of next-hop nodes to the destination node.

Figure 7:
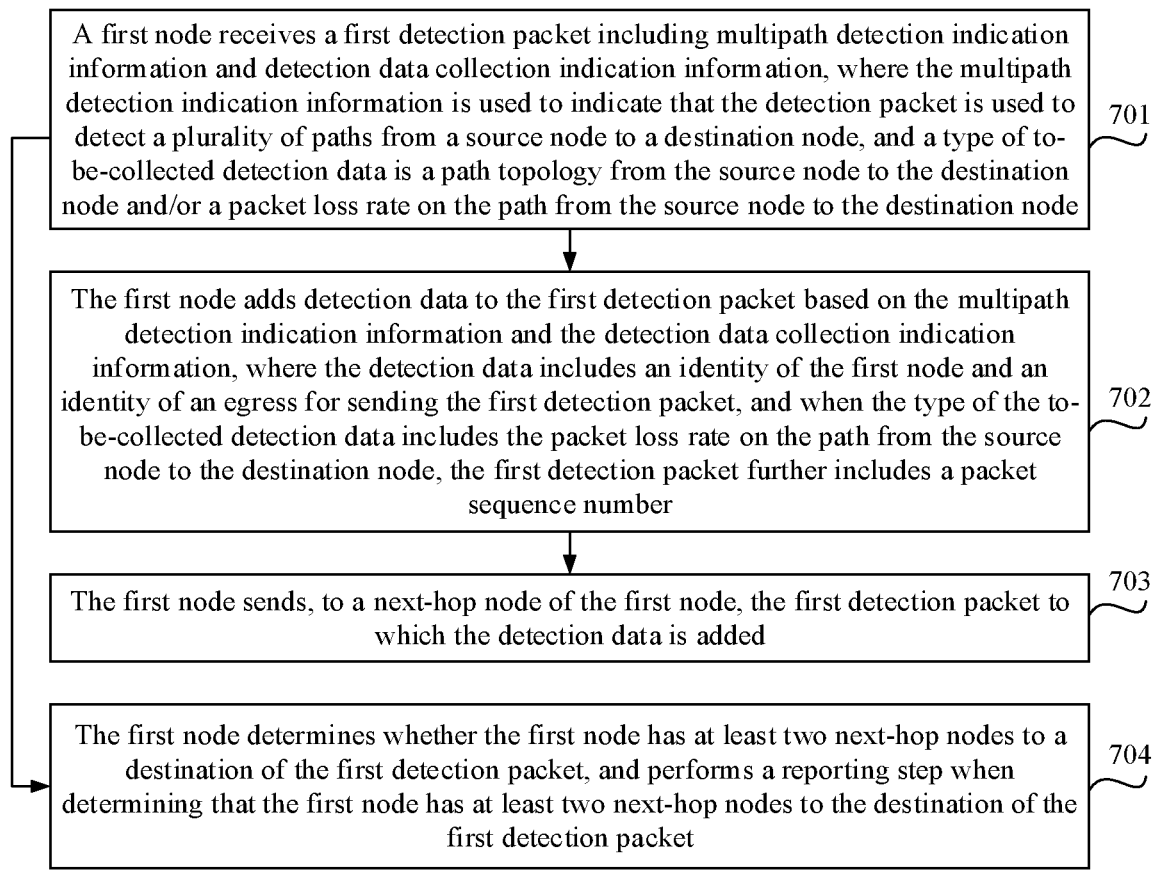
FIG. 7 is a flowchart of another path detection method according to an embodiment of this application.

FIG. 7 is a flowchart of a path detection method according to an embodiment of this application. The method is also applied to a scenario in which a path topology from a source node to a destination node and/or a packet loss rate on a path from the source node to the destination node need/needs to be detected. As shown in FIG. 7, the method includes the following steps.

Step 701: A first node receives a first detection packet including multipath detection indication information and detection data collection indication information, where the multipath detection indication information is used to indicate that the detection packet is used to detect a plurality of paths from the source node to the destination node, and a type of to-be-collected detection data is the path topology from the source node to the destination node and/or the packet loss rate on the path from the source node to the destination node.

For an implementation of step 701, refer to step 601. Details are not described herein again.

Step 702: The first node adds detection data to the first detection packet based on the multipath detection indication information and the detection data collection indication information, where the detection data includes an identity of the first node and an identity of an egress for sending the first detection packet, and when the type of to-be-collected detection data includes the packet loss rate on the path from the source node to the destination node, the first detection packet further includes a packet sequence number.

For an implementation of step 702, refer to step 602. Details are not described herein again.

Step 703: The first node sends, to a next-hop node of the first node, the first detection packet to which the detection data is added.

For an implementation of step 703, refer to step 603. Details are not described herein again.

Step 704: The first node determines whether the first node has at least two next-hop nodes to a destination of the first detection packet, and performs a reporting step when determining that the first node has at least two next-hop nodes to the destination of the first detection packet.

In this embodiment, the reporting step in step 604 and/or step 605 and the step of forwarding the first detection packet in step 702 and step 703 are performed only when the first node has at least two next-hop nodes to the destination node. Otherwise, the first node performs the steps of adding the detection data and forwarding the first detection packet in step 402 and step 403.

The following further describes step 701 to step 704 by using a communications network shown in FIG. 5.

Assuming that a current scenario is the scenario in which the path topology from the source node to the destination node needs to be detected, and the detection data collection indication information in the first detection packet is implemented by adding to-be-collected specific data to an instruction B or telemetry indication information, the source node encapsulates a node ID (R1) of the source node and an ID (0) of an outbound interface for forwarding the detection packet in the detection packet, and forwards the detection packet to an intermediate node R2. The following uses an example in which an intermediate node uses the first detection packet to carry the detection data for reporting.

After receiving the detection packet, the intermediate node R2 identifies, based on an instruction A, that multipath data collection needs to be performed. The node R2 encapsulates, in the first detection packet based on the instruction B or the telemetry indication information, information that needs to be carried, to be specific, encapsulates a node ID (R2) of the node R2 and a detection packet inbound interface ID (0). The R2 detects that the R2 has a plurality of paths to a destination address of the first detection packet, in other words, the R2 has N (N>1) outbound interfaces (two outbound interfaces in this embodiment). In other words, the R2 may have two next-hop nodes (R3 and R4) to the destination of the first detection packet. In a specific implementation, the plurality of outbound interfaces may be detected by using technologies such as ECMP, UCMP, and LAG. The R2 reports the first detection packet encapsulated with (R1(0)-(0)R2) to a control node or forwards the first detection packet to the source node, and then deletes the ingress identity of the R2 and detection data (R1(0) in this embodiment) added by another node in the encapsulated first detection packet. The R2 makes N−1 copies of the detection packet obtained after the data is deleted (in this embodiment, there are two outbound interfaces, and therefore one copy is made), and encapsulates identities of corresponding outbound interfaces in the N detection packets obtained after copy (in this embodiment, identities of an outbound interface 1 and an outbound interface 2 are encapsulated in two detection packets obtained after copy respectively). Then, the R2 sends a detection packet encapsulated with the node ID and the identity of the outbound interface 1 (R2(1)) to the R3 through the outbound interface 1, and sends a detection packet encapsulated with the node ID and the identity of the outbound interface 2 (R2(2)) to the R4 through the outbound interface 2. It should be noted that, in this embodiment, the detection data is reported to the controller or the source node by using a detection packet, another manner of reporting the detection data is also applicable, and details are not described herein. In all scenarios in which the detection data is reported in the following embodiments, a manner of reporting the detection packet is used. In addition, it should be noted that detecting a quantity of outbound interfaces, deleting data in the detection packet, and encapsulating the node ID (R2) and the detection packet inbound interface ID (0) are not limited in sequence. After the detecting step, the node ID (R2) and the detection packet inbound interface ID (0) may be encapsulated in each of the two detection packets. In this case, only one of the detection packets needs to be reported. After one of the detection packets is reported, data in the two detection packets is deleted, and finally, corresponding outbound interface identities are encapsulated in the detection packets obtained after the data is deleted.

After receiving the detection packet, the R3 identifies, based on the instruction A, that multipath data collection needs to be performed, and the node R3 encapsulates a node ID of the node R3 and a detection packet inbound interface ID based on the instruction B. After detecting that the R3 has only one outbound interface to the destination of the detection packet (on other words, the R3 has only one next-hop node to the destination of the detection packet), the R3 directly encapsulates an outbound interface ID in the detection packet without reporting the detection data, and then sends a detection packet encapsulated with (R2(1)-(0)R3(1)) to R5. It should also be noted that detecting a quantity of outbound interfaces and encapsulating the node ID (R3) and the detection packet inbound interface ID (0) are not limited in sequence. After the detecting step, the node ID (R3), the detection packet inbound interface ID, and a corresponding outbound interface identity may be encapsulated in the detection packet.

After the R5 receives the packet, because the R5 has only one next-hop node to the destination node, the R5 performs the same operation as the R3, and then sends the detection packet encapsulated with (R2(1)-(0)R3(1)-(1)R5(2)) to the destination node R6.

After receiving the detection packet, the R6 encapsulates an ID of the R6 and a detection packet inbound interface ID in the detection packet. Information finally encapsulated in the detection packet is R2(1)-(0)R3(1)-(1)R5(2)-(0)R6. Herein, R2 to R6 are IDs of all nodes through which the packet passes, information on the left of a node ID is an ID of an inbound interface through which the detection packet enters the node, and information on the right of a node ID is an ID of an outbound interface through which the detection packet leaves the node. For example, in (0)R3(1), (0) on the left of the node ID R3 indicates an ID (0) of an inbound interface through which the detection packet enters the node R3, and (1) on the right of the node ID R3 indicates an ID (1) of an outbound interface through which the detection packet leaves the node R3. Compared with the information (that is, the R1(0)-(0)R2(1)-(0)R3(1)-(1)R5(2)-(0)R6) carried in the detection packet in the embodiment shown in FIG. 4, information carried in the packet is reduced. Especially, if there are a plurality of multipath nodes (that is, like the R2 node, the multipath node has a plurality of paths to the destination node R6) on a path from the R2 to the R6, less content is added to the detection packet that arrives at the R6. This helps save resources such as bandwidth.

In addition, compared with the embodiment shown in FIG. 6, not all nodes need to report information to the control node or the source node. In this embodiment, only the multipath node reports detection data to the control node or the source node, thereby reducing interaction load between the nodes and the controller. In addition, because the multipath node reports the detection data, and the detection packet sent by the multipath node to a next-hop node carries only a part of the detection data, content added to the detection packet that arrives at the destination R6 is still less than content added to the detection packet that arrives at the R6 in the embodiment shown in FIG. 4. This helps save resources such as bandwidth. Therefore, compared with the embodiment shown in FIG. 6, this embodiment reduces interaction load between the nodes and the controller. Compared with the embodiment shown in FIG. 4, this embodiment saves resources such as bandwidth.

In addition, after the R2 sends, to the R4 through the outbound interface 2, the detection packet encapsulated with the node ID and the outbound interface 2 (R2(2)), after the R4 receives the detection packet, the R4 identifies, based on the instruction A, that multipath data collection needs to be performed. The node R4 encapsulates a node ID of the node R4 and detection packet inbound interface ID based on the instruction B, to be specific, encapsulates the node ID (R4) of the node R4 and the detection packet inbound interface ID (0). The R4 detects that the R4 has a plurality of paths to the destination address, in other words, the R4 has N (N>1) outbound interfaces (two outbound interfaces in this embodiment). In other words, the R4 may have two next-hop nodes (the R5 and R7) to the destination R6 of the first detection packet. In a specific implementation, technologies such as ECMP, UCMP, and LAG may be used to detect whether the R4 has a plurality of outbound interfaces to the destination of the detection packet. When the R4 detects that the R4 has a plurality of outbound interfaces to the destination of the detection packet (in this embodiment, the R4 has two outbound interfaces 1 and 2, and correspondingly, has two next-hop nodes (the R5 and the R7) to the destination R6 of the first detection packet), the R4 first reports the detection packet encapsulated with (R2(2)-(0)R4) to the control node or forwards the detection packet to the source node, and then deletes the ingress identity of the R4 and detection data (R2(2) in this embodiment) added by another node in the encapsulated first detection packet. The R4 makes N−1 copies of the detection packet obtained after the data is deleted (in this embodiment, there are two outbound interfaces, and therefore one copy is made), and encapsulates corresponding outbound interface information in the N detection packets obtained after copy (in this embodiment, identities of the outbound interface 1 and the outbound interface 2 are encapsulated in the two constructed packets respectively). The R4 sends a detection packet (R4(1)) encapsulated with the identity of the outbound interface 1 to the R5 through the outbound interface 1, and sends a detection packet (R4(2)) encapsulated with the identity of the outbound interface 2 to the R7 through the outbound interface 2. The R5 and the R7 each perform corresponding processing and send a detection packet to the R6, and the R6 receives a detection packet encapsulated with R4(1)-(0)R5 (2)-(0)R6 and a detection packet encapsulated with R4(2)-(0)R7(1)-(1)R6. It should also be noted that, in this embodiment, the detection data is reported to the controller or the source node by using a detection packet, another manner of reporting the detection data is also applicable, and details are not described herein. In all scenarios in which the detection data is reported in the following embodiments, a manner of reporting the detection packet is used.

In addition, it should also be noted that detecting a quantity of outbound interfaces and encapsulating the node ID (R4) and the detection packet inbound interface ID (0) are not limited in sequence. After the detecting step, the node ID (R4) and the detection packet inbound interface ID (0) may be encapsulated in each of the two detection packets obtained after copy. In this case, only one of the detection packets needs to be reported. After one of the detection packets is reported, data in the two detection packets is deleted, and finally, corresponding outbound interface identities are encapsulated in detection packets obtained after the data is deleted. In addition, it should also be noted that after the R2 reports, to the source node or the control node, the two detection packets to which the detection data is added, the R2 may directly continue to send the two packets to the two next-hop nodes respectively without deleting the data in the detection packets.

Finally, the R6 receives three detection packets, and reports the three detection packets to the control node or forwards the three detection packets to the source node. In this embodiment, the control node or the source node receives five detection packets in total. The control node or the source node may obtain, from the packets, complete information of three paths from the R1 to the R6 by associating the packets reported by the R6 with the packet reported by the R2 and the packet reported by the R4, to restore the multipath topology from the R1 to the R6. For example, the multipath topology from the R1 to the R6 may be restored in a specific association manner by using a value of an instruction C in a packet or by directly associating source address information and destination address information carried in all detection packets. For example, values of the instructions C may be used to indicate to collect all detection packets including a same pair of a source node address and a destination node address, and then detection data in the collected detection packets is obtained. The obtained detection data is R1(0)-(0)R(2), R2(1)-(0)R3(1)-(1)R5(2)-(0)R6, R2(2)-(0)R4, R4(1)-(0)R5(2)-(0)R6, and R4(2)-(0)R7(1)-(1)R6. The multipath topology shown in FIG. 5 may be restored based on the detection data.

It may be understood that, in a specific implementation, whether to send a detection packet to the control node or the source node may be set for different intermediate nodes. A specific setting requirement may be set based on a service requirement. The embodiments of this application are not limited to the two reporting manners shown in FIG. 6 and FIG. 7. The detection mode shown in FIG. 6 may be referred to as a per-hop mode, and the detection mode shown in FIG. 7 may be referred to as a per-section mode.

Figure 8:
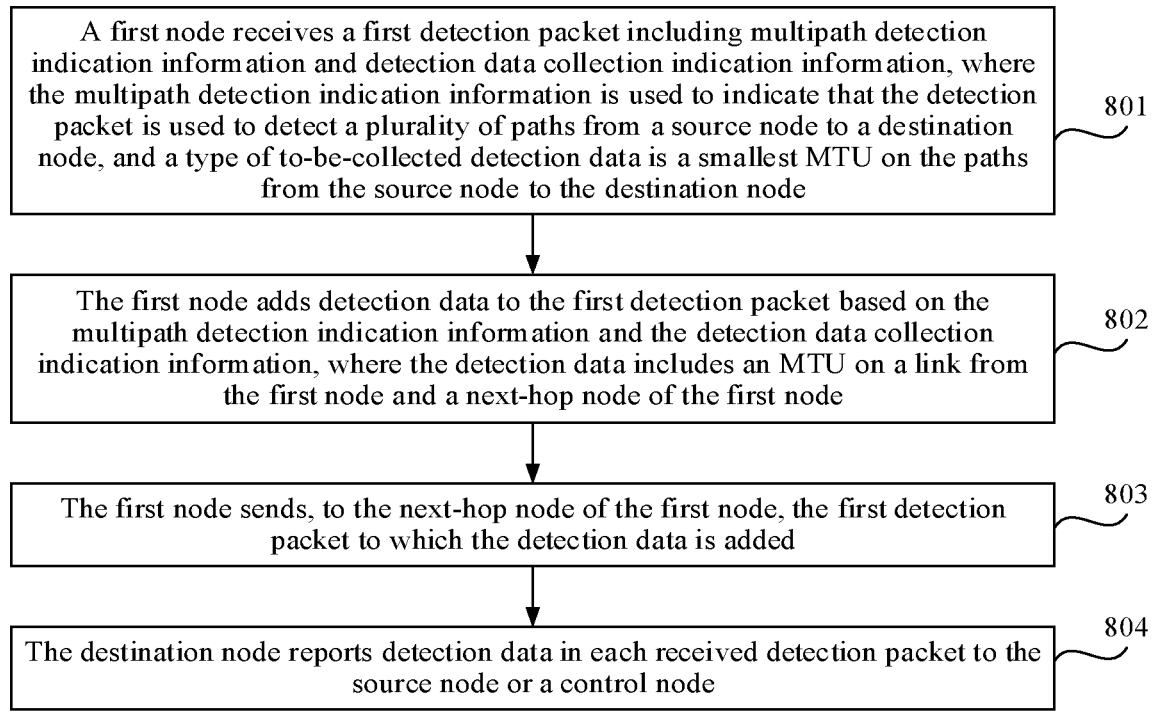
FIG. 8 is a flowchart of another path detection method according to an embodiment of this application.

FIG. 8 is a flowchart of a path detection method according to an embodiment of this application. The method is applied to a scenario in which a smallest MTU from a source node to a destination node needs to be detected. In the embodiment shown in FIG. 8, a path is detected in a trace mode. As shown in FIG. 8, the method includes the following steps.

Step 801: A first node receives a first detection packet including multipath detection indication information and detection data collection indication information, where the multipath detection indication information is used to indicate that the detection packet is used to detect a plurality of paths from the source node to the destination node, and a type of to-be-collected detection data is a smallest MTU on the paths from the source node to the destination node.

Step 802: The first node adds detection data to the first detection packet based on the multipath detection indication information and the detection data collection indication information, where the detection data includes an MTU on a link from the first node and a next-hop node of the first node.

It can be learned from the implementation of step 403 that, in a specific implementation, when the first node has at least two next-hop nodes to a destination of the first detection packet, the following uses an example in which the first node has two next-hop nodes (referred to as a second node and a third node) to the destination of the first detection packet for description. The first node is connected to the second node through a first port, and is connected to the third node through a second port. In this scenario, an implementation process in which the first node sends, to the next-hop node of the first node, the first detection packet to which the detection data is added may include that the first node sends, to the second node through the first port, the first detection packet to which an MTU on a link from the first node to the second node is added, and the first node sends, to the third node through the second port, the first detection packet to which an MTU on a link from the first node to the third node is added.

It should be noted that the MTU on the link from the first node to the next-hop node of the first node may also be referred to as an MTU of a port of the first node or an MTU of a port of the next-hop node of the first node. The port of the first node and the port of the next-hop node of the first node are two ports that connect the first node and the next-hop node of the first node, and MTUs of the two ports are the same.

Step 803: The first node sends, to the next-hop node of the first node, the first detection packet to which the detection data is added.

Step 804: The destination node reports detection data in each received detection packet to the source node or a control node.

For an implementation process of step 801 to step 804, basically refer to step 401 to step 404. Only added detection data in the implementation process is different, and details are not described herein again.

Figure 9:
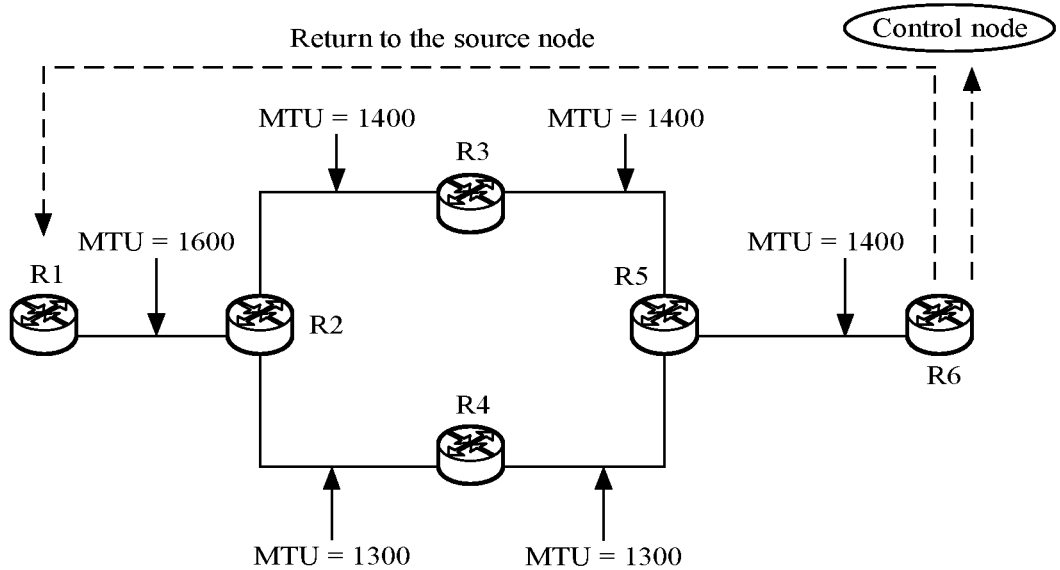
FIG. 9 is a schematic architectural diagram of another communications network according to an embodiment of this application.

The following further describes the path detection method shown in FIG. 8 with reference to a communications network shown in FIG. 9.

As shown in FIG. 9, the source node encapsulates an MTU value of the source node, for example, an MTU (1600), in the detection packet and sends the detection packet to R2.

After receiving the detection packet, the intermediate node R2 identifies, based on an instruction A, that multipath data collection needs to be performed. The node R2 encapsulates, based on an instruction B or telemetry indication information, information that needs to be carried. Further, the R2 detects that the R2 has a plurality of paths to the destination address, in other words, the R2 has N (N>1) outbound interfaces (two outbound interfaces in this embodiment). In other words, the R2 may have two next-hop nodes (R3 and R4) to the destination R6 of the first detection packet. In a specific implementation, technologies such as ECMP, UCMP, and LAG may be used to detect whether the R2 has a plurality of outbound interfaces to the destination of the detection packet. When detecting that the R2 has a plurality of outbound interfaces to the destination of the detection packet, the R2 makes N–1 copies of the detection packet (one copy in this embodiment), adds an MTU (1400) and an MTU (1300) to the two packets obtained after copy respectively, and then sends the two detection packets through corresponding outbound interfaces. The intermediate nodes R3, the R4, and R5 perform the same operation as the R2.

The destination node R6 receives two detection packets, and MTU values encapsulated in the two detection packets are MTU=1600, 1400, 1400, and 1400 and MTU=1600, 1300, 1300, and 1400 respectively. The destination node R6 may report the information to the control node or forward the information to the source node, and the control node or the source node calculates, based on the received information, that a smallest MTU value on the paths from the R1 to the R6 is 1300.

In a specific implementation, the control node or the source node may associate the three detection packets reported by the destination node based on values of instructions C in the packets, or directly by using source address and destination address information carried in the detection packets. For example, the value of the instruction C may be used to indicate to collect all detection packets including a same pair of source node address and destination node address, and then detection data in the collected detection packets is obtained. The obtained detection data is 1600, 1400, 1400, and 1400, and 1600, 1300, 1300, and 1400. The smallest MTU 1300 on the paths from the source node to the destination node shown in FIG. 9 may be restored based on the detection data.

In addition, the smallest MTU on the paths from the source node to the destination node finally needs to be obtained. Therefore, in another specific implementation, that the first node adds detection data to the first detection packet based on the multipath detection indication information and the detection data collection indication information includes that the first node reserves a smallest MTU after comparing the MTU on the link from the first node to the next-hop node of the first node with an existing MTU in the first detection packet. In this case, that the first node sends, to a next-hop node of the first node, the first detection packet to which the detection data is added includes sending the first detection packet in which the smallest MTU is reserved to the next-hop node of the first node.

For example, the first node has two next-hop nodes (referred to as a second node and a third node) to the destination of the first detection packet. In this scenario, the first node compares an MTU on a link from the first node and the second node with an existing MTU in the first detection packet, and then sends the first detection packet in which a smallest MTU is reserved to the second node. The first node compares an MTU on a link from the first node to the third node with the existing MTU in the first detection packet, and then sends the first detection packet in which a smallest MTU is reserved to the third node.

That is, when adding the currently collected MTU, the first node directly performs comparison, and reserves only a smallest MTU, to reduce load of the first detection packet, thereby improving efficiency of transmitting the first detection packet.

The following further describes the foregoing process with reference to the communications network shown in FIG. 9.

As shown in FIG. 9, the source node encapsulates an MTU value of the source node, for example, an MTU (1600), in the detection packet and sends the detection packet to R2.

After receiving the detection packet, the intermediate node R2 identifies, based on an instruction A, that multipath data collection needs to be performed. The node R2 encapsulates, based on an instruction B or telemetry indication information, information that needs to be carried. (during encapsulation, the node R2 compares an MTU with an MTU in the packet. If the MTU is less than the MTU in the packet, the node R2 changes the MTU in the packet. Otherwise, the node R2 does not change the MTU in the packet). Further, the R2 detects that the R2 has a plurality of paths to the destination address, in other words, the R2 has N (N>1) outbound interfaces (two outbound interfaces in this embodiment). In other words, the R2 may have two next-hop nodes (R3 and R4) to the destination R6 of the first detection packet. In a specific implementation, technologies such as ECMP, UCMP, and LAG may be used to detect whether the R2 has a plurality of outbound interfaces to the destination of the detection packet. When the R2 detects that the R2 has a plurality of outbound interfaces to the destination of the detection packet, the R2 makes N−1 copies of the detection packet (one copy is made in this embodiment), and encapsulates, in two packets obtained after copy, information that needs to be carried. The R2 reserves 1400 in the detection packet sent to the R3 after comparing 1400 with existing 1600 in the detection packet, and then sends the detection packet in which 1400 is reserved to the R3 through a corresponding outbound interface. The R2 reserves 1300 in the detection packet sent to the R4 after comparing 1300 with existing 1600 in the detection packet, and then sends the detection packet in which 1300 is reserved to the R4 through a corresponding outbound interface.

The intermediate nodes R3, the R4, and R5 perform the same operation as the R2.

The destination node R6 receives two detection packets, and MTU values encapsulated in the two detection packets are MTU=1400 and MTU=1300. The destination node R6 may report the information to the control node or forward the information to the source node, and the control node or the source node calculates, based on the received information, that the smallest MTU value on the paths from the R1 to the R6 is 1300.

According to the method for detecting the MTUs of nodes on the plurality of paths in this embodiment, problems of redundant detection packets, low detection efficiency, and low accuracy are resolved.

It can be learned from the embodiments shown in FIG. 6 and FIG. 7 that during detection of the smallest MTU, the first node may also report a detected smallest MTU in a per-section mode or a per-hop mode, rather than the destination node finally reports the detected smallest MTU. The following further describes detection of the smallest MTU in the two modes.

Figure 10:
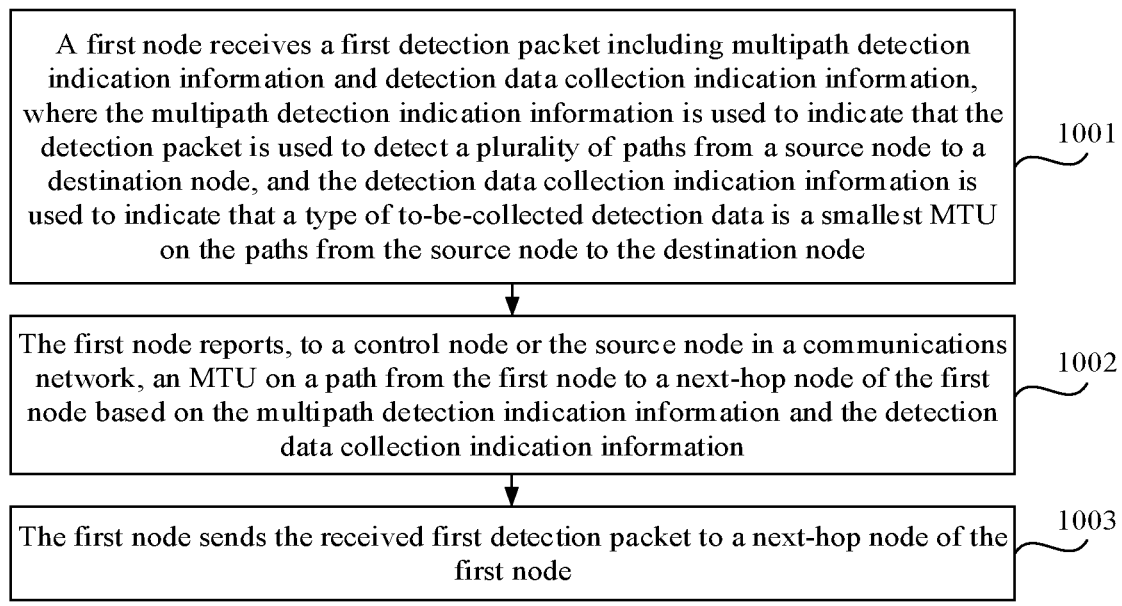
FIG. 10 is a flowchart of another path detection method according to an embodiment of this application.

FIG. 10 is a flowchart of a path detection method according to an embodiment of this application. The method is applied to a scenario in which a smallest MTU from a source node to a destination node needs to be detected. In the embodiment shown in FIG. 10, a path is detected in a per-hop mode. As shown in FIG. 10, the method includes the following steps.

Step 1001: A first node receives a first detection packet including multipath detection indication information and detection data collection indication information, where the multipath detection indication information is used to indicate that the detection packet is used to detect a plurality of paths from the source node to the destination node, and the detection data collection indication information is used to indicate that a type of to-be-collected detection data is a smallest MTU on the paths from the source node to the destination node.

For an implementation of step 1001, refer to step 801. Details are not described herein again.

Step 1002: The first node reports, to a control node or the source node in a communications network, an MTU on a link from the first node to a next-hop node of the first node based on the multipath detection indication information and the detection data collection indication information.

In the embodiment shown in FIG. 10, each node reports, to the control node or the source node, an MTU collected by the node, to save bandwidth required for transmitting the detection packet.

Step 1003: The first node sends the received first detection packet to the next-hop node of the first node.

It can be learned from the implementation of step 403 that, in a specific implementation, when the first node has at least two next-hop nodes to a destination of the first detection packet, the following uses an example in which the first node has two next-hop nodes (referred to as a second node and a third node) to the destination of the first detection packet for description. The first node is connected to the second node through a first port, and is connected to the third node through a second port. In this scenario, an implementation process in which the first node sends the received first detection packet to the next-hop node of the first node includes that the first node sends the received first detection packet to the second node through the first port, and the first node sends the received first detection packet to the third node through the second port.

The following further describes the path detection method shown in FIG. 10 with reference to a communications network shown in FIG. 9.

It is assumed that the detection data collection indication information in the first detection packet is implemented by adding to-be-collected specific data to an instruction B or telemetry indication information. As shown in FIG. 9, the source node encapsulates an MTU value of the source node, for example, an MTU (1600), in the detection packet and sends the detection packet to R2. The following uses an example in which an intermediate node uses the first detection packet to carry detection data for reporting.

After receiving the detection packet, the intermediate node R2 identifies, based on an instruction A, that multipath data collection needs to be performed. The node R2 encapsulates, based on the information collection instruction B or the telemetry indication information, information that needs to be carried. Further, the R2 detects that the R2 has a plurality of paths to the destination address, in other words, the R2 has N (N>1) outbound interfaces (two outbound interfaces in this embodiment). In other words, the R2 may have two next-hop nodes (R3 and R4) to the destination R6 of the first detection packet. In a specific implementation, technologies such as ECMP, UCMP, and LAG may be used to detect whether the R2 has a plurality of outbound interfaces to the destination of the detection packet. When the R2 detects that the R2 has a plurality of outbound interfaces to the destination of the detection packet, the R2 makes N−1 copies (in this embodiment, there are two outbound interfaces, and therefore, one copy is made) of the received detection packet, adds an MTU (1400) and an MTU (1300) to the two detection packets obtained after copy respectively, and then reports, to the control node, the two detection packets to which the MTUs are added or forwards the two detection packets to the source node. Then, the R2 deletes the existing MTUs in the two detection packets and sends, respectively through an outbound interface 1 and an outbound interface 2, the two detection packets obtained after the MTUs are deleted. It should also be noted that after the R2 reports, to the source node or the control node, the two detection packets to which the detection data is added, the R2 may directly continue to send the two packets to the two next-hop nodes respectively without deleting the data in the detection packets. In addition, when reporting the MTUs, the R2 may directly use one detection packet to carry the two MTUs for reporting, instead of reporting the two MTUs by using two detection packets respectively. Details are not described herein again.

After receiving the detection packet, the R3 performs the same operation as the R2. The R3 identifies, based on the instruction A, that multipath data collection needs to be performed. The node R3 encapsulates, based on the information collection instruction B or the telemetry indication information, information that needs to be carried. Further, the R3 detects whether the R3 has a plurality of outbound interfaces to the destination. In this embodiment, the R3 has only one outbound interface to the destination R6. The R3 encapsulates an MTU (1400) in the detection packet, and reports the encapsulated detection packet to the source node or the control node. Then, the R3 deletes the MTU in the detection packet, and sends the detection packet obtained after deletion to R5. It should be noted that after the R3 reports, to the source node or the control node, the detection packet to which the detection data is added, the R3 may directly continue to send the detection packet to the R5 without deleting the data in the detection packet.

After receiving the detection packet, the R5 performs processing similar to that of the R3. If the R5 detects that the R5 has only one outbound interface to the destination R6, the R5 encapsulates an MTU (1400) collected by the R5 in the detection packet, and then reports the detection packet to the control node or forwards the detection packet to the source node. Then, the R5 deletes the MTU in the detection packet, and sends the detection packet obtained after deletion to the R6. The R5 sends the received detection packet to the R6 through an outbound interface 2. It should be noted that after the R5 reports, to the source node or the control node, the detection packet to which the detection data is added, the R5 may directly continue to send the detection packet to the R6 without deleting the data in the detection packet.

Another node performs processing similar to that of the R2. After receiving the detection packet sent by a previous-hop node, the other node reports an MTU collected by the other node to the control node or forwards the MTU to the source node, and sends the received detection packet to a next-hop node. Details are not described herein.

After receiving MTUs reported by the nodes, the control node or the source node may determine the smallest MTU on the paths from the source node to the destination node. In a specific implementation, for the plurality of received detection packets, the control node or the source node may associate, based on destination addresses and source addresses in the detection packets or instructions C in the detection packets, detection packets used to perform detection from a same source node to the destination node. For the associated detection packets, MTUs in the detection packet are obtained, and the smallest MTU on the paths from the destination node to the source node may be determined based on the obtained data.

According to the method for detecting MTUs of the nodes on the plurality of paths in this embodiment, problems of redundant detection packets, low detection efficiency, and low accuracy are resolved.

In the embodiment shown in FIG. 10, each of the intermediate nodes reports the detection data to the source node or the control node. In the embodiments of this application, some intermediate nodes in the intermediate nodes may report detection data, and other nodes do not need to report detection data. The intermediate node that reports the detection data may be an intermediate node that meets a specified condition. The specified condition may be that the intermediate node has a plurality of next-hop nodes to the destination node, or may be another specified condition. The following embodiment is described by using an example in which the specified condition is that the intermediate node has a plurality of next-hop nodes to the destination node.

Figure 11:
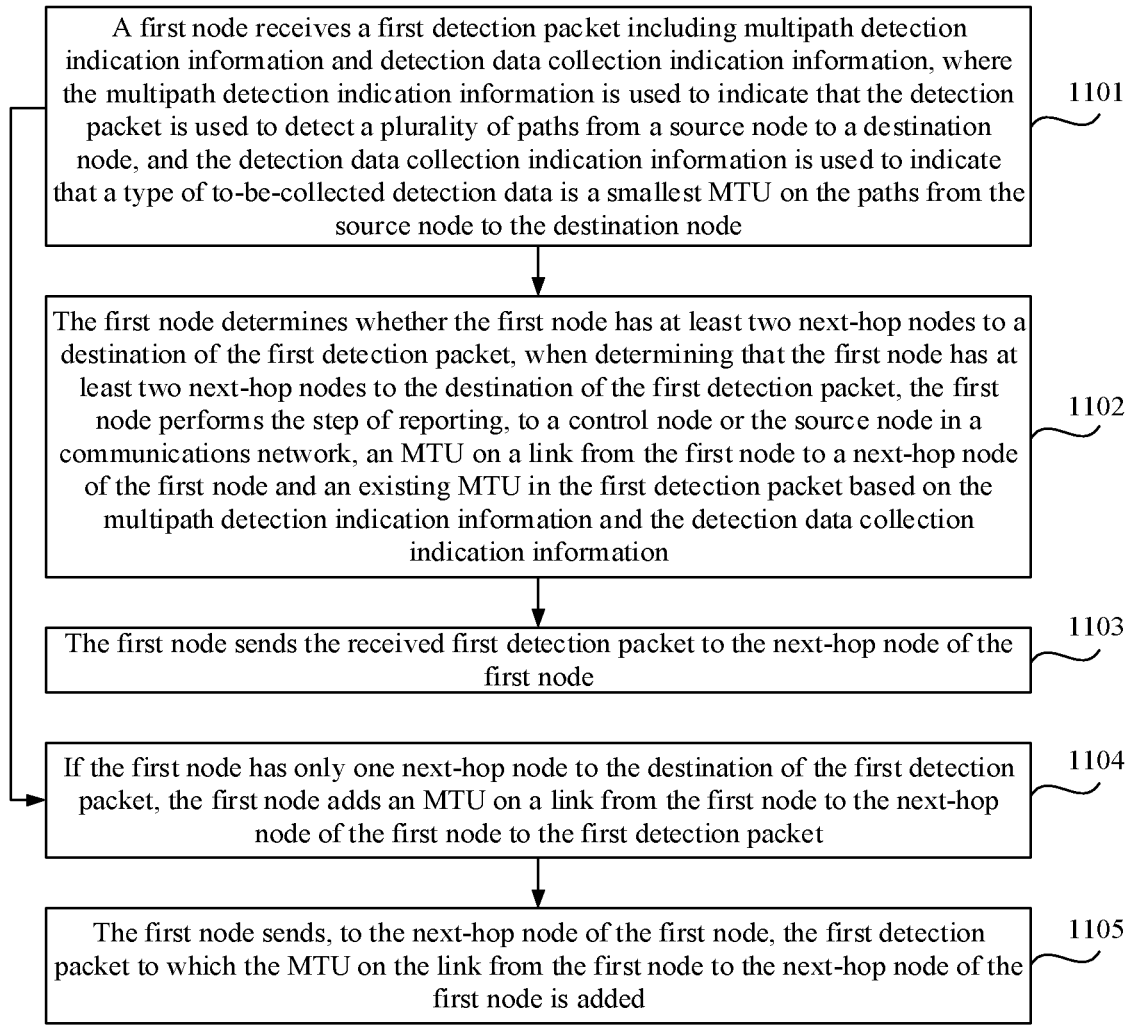
FIG. 11 is a flowchart of another path detection method according to an embodiment of this application.

FIG. 11 is a flowchart of a path detection method according to an embodiment of this application. The method is applied to a scenario in which a smallest MTU from a source node to a destination node needs to be detected. In the embodiment shown in FIG. 11, a path is detected in a per-section mode. As shown in FIG. 11, the method includes the following steps.

Step 1101: A first node receives a first detection packet including multipath detection indication information and detection data collection indication information, where the multipath detection indication information is used to indicate that the detection packet is used to detect a plurality of paths from the source node to the destination node, and the detection data collection indication information is used to indicate that a type of to-be-collected detection data is a smallest MTU on the paths from the source node to the destination node.

For an implementation of step 1101, refer to step 801. Details are not described herein again.

Step 1102: The first node determines whether the first node has at least two next-hop nodes to a destination of the first detection packet, and when determining that the first node has at least two next-hop nodes to the destination of the first detection packet, the first node performs the step of reporting, to a control node or the source node in a communications network, an MTU on a link from the first node to a next-hop node of the first node and an existing MTU in the first detection packet based on the multipath detection indication information and the detection data collection indication information.

In the embodiment shown in FIG. 11, only a node that has a plurality of next-hop nodes reports an MTU collected by the node and the existing MTU in the detection packet to the control node or the source node, to save bandwidth required for transmitting the detection packet.

Step 1103: The first node sends the received first detection packet to the next-hop node of the first node.

In a specific implementation, when the first node has at least two next-hop nodes to a destination of the first detection packet, the following uses an example in which the first node has two next-hop nodes (referred to as a second node and a third node) to the destination of the first detection packet for description. The first node is connected to the second node through a first port, and is connected to the third node through a second port. In this scenario, an implementation process in which the first node sends the received first detection packet to the next-hop node of the first node includes that the first node sends the received first detection packet to the second node through the first port, and the first node sends the received first detection packet to the third node through the second port.

It should be noted that in the scenario of step 1102, because the first node has reported the collected MTU and the existing MTU in the packet to the control node and the source node, the first node only needs to send a first detection packet that does not include the MTUs to the next-hop node. To be specific, if the received first detection packet includes an MTU, the first node deletes the MTU, and then sends the first detection packet obtained after the data is deleted to the next-hop node. If the received first detection packet does not include an MTU, the first node directly sends the received first detection packet to the next-hop node of the first node.

Step 1104: If the first node has only one next-hop node to the destination of the first detection packet, the first node adds an MTU on a link from the first node to the next-hop node of the first node to the first detection packet.

Step 1105: The first node sends, to the next-hop node of the first node, the first detection packet to which the MTU on the link from the first node to the next-hop node of the first node is added.

In the scenario of step 1104, the first node adds, to the first node packet sent by the first node to the next-hop node, the MTU collected by the first node.

The following further describes step 1101 to step 1105 by using a communications network shown in FIG. 9.

It is assumed that the detection data collection indication information in the first detection packet is implemented by adding to-be-collected specific data to an instruction B or telemetry indication information. As shown in FIG. 9, the source node encapsulates an MTU value of the source node, for example, an MTU (1600), in the detection packet and sends the detection packet to R2. The following uses an example in which an intermediate node uses the first detection packet to carry detection data for reporting.

After receiving the first detection packet, the intermediate node R2 identifies, based on an instruction A, that multipath data collection needs to be performed. The node R2 encapsulates, based on the information collection instruction B or the telemetry indication information, information that needs to be carried. Further, the R2 detects that the R2 has a plurality of paths to a destination address, in other words, the R2 has N (N>1) outbound interfaces (two outbound interfaces in this embodiment). In other words, the R2 may have two next-hop nodes (R3 and R4) to the destination R6 of the first detection packet. In a specific implementation, technologies such as ECMP, UCMP, and LAG may be used to detect whether the R2 has a plurality of outbound interfaces to the destination of the detection packet. When the R2 detects that the R2 has a plurality of outbound interfaces to the destination of the detection packet, the R2 makes N−1 copies (in this embodiment, there are two outbound interfaces, and therefore, one copy is made) of the received detection packet, adds an MTU (1400) and an MTU (1300) to the two detection packets obtained after copy respectively, and then reports, to the control node, the two detection packets to which the MTUs are added or forwards the two detection packets to the source node. Then, the R2 deletes the existing MTUs in the two detection packets and sends, respectively through an outbound interface 1 and an outbound interface 2, two detection packets obtained after the MTUs are deleted.

It should also be noted that after the R2 reports, to the source node or the control node, the two detection packets to which the detection data is added, the R2 may directly continue to send the two packets to the two next-hop nodes respectively without deleting the data in the detection packets. In addition, when reporting the MTUs, the R2 may directly use one detection packet to carry the two MTUs for reporting, instead of reporting the two MTUs by using two detection packets respectively. Details are not described herein again.

When the R3 receives the first detection packet, if the R3 detects that the R3 has only one outbound interface to the destination R6, the R3 adds, to the first detection packet, MTU=1400 on a link from the R3 to R5, and sends, to the node R5, the first detection packet to which the MTU is added. A processing manner of the R5 is the same as that of the R3. The R5 adds, to the first detection packet, MTU=1400 on a link from the R5 to the R6, and sends, to the node R6, the first detection packet to which the MTU is added.

A processing process after the node R4 receives the first detection packet is the same as a processing manner of the node R3. The R4 adds, to the first detection packet, MTU=1300 on a link from the R4 to the R5, and sends, to the node R5, the first detection packet to which the MTU is added. The R5 adds, to the first detection packet, MTU=1400 on a link from the R5 to the R6, and sends, to the node R6, the first detection packet to which the MTU is added.

The node R6 receives two first detection packets. One first detection packet carries MTU=1400 on the link from the R3 to the R5, and MTU=1400 on the link from R5 to R6, the other first detection packet carries MTU=1300 on a link from the R4 to the R5, and MTU=1400 on the link from the R5 to the R6. The node R6 may report the data to the source node or the control node, and the source node or the control node analyzes the smallest MTU on the paths from the source node to the destination node. For a specific manner in which the source node or the control node analyzes the smallest MTU on the paths from the source node to the destination node, refer to the description in the foregoing embodiment. Details are not described herein again.

Compared with the information (all MTUs on the paths) carried in the detection packet in the embodiment shown in FIG. 8, information carried in the detection packet is reduced. Especially, if there are a plurality of multipath nodes (that is, like the R2 node, the multipath node has a plurality of paths to the destination node R6) on a path from the R2 to the R6, less content is added to the detection packet that arrives at the R6. This helps save resources such as bandwidth.

In addition, compared with the embodiment shown in FIG. 10, not all nodes need to report information to the control node or the source node. In this embodiment, only the multipath node reports detection data to the control node or the source node, thereby reducing interaction load between the nodes and the controller. In addition, because the multipath node reports the detection data, and the detection packet sent by the multipath node to a next-hop node carries only a part of the detection data, content added to the detection packet that arrives at the destination R6 is still less than content added to the detection packet that arrives at the R6 in the embodiment shown in FIG. 8. This helps save resources such as bandwidth. Therefore, compared with the embodiment shown in FIG. 10, this embodiment reduces interaction load between the nodes and the controller. Compared with the embodiment shown in FIG. 8, this embodiment saves resources such as bandwidth.

For the detailed implementations in FIG. 10 and FIG. 11, refer to the implementations shown in FIG. 6 and FIG. 7 respectively. Details are not described herein again.

According to the method for detecting MTUs of the nodes on the plurality of paths in this embodiment, problems of redundant detection packets, low detection efficiency, and low accuracy are resolved.

Figure 12:
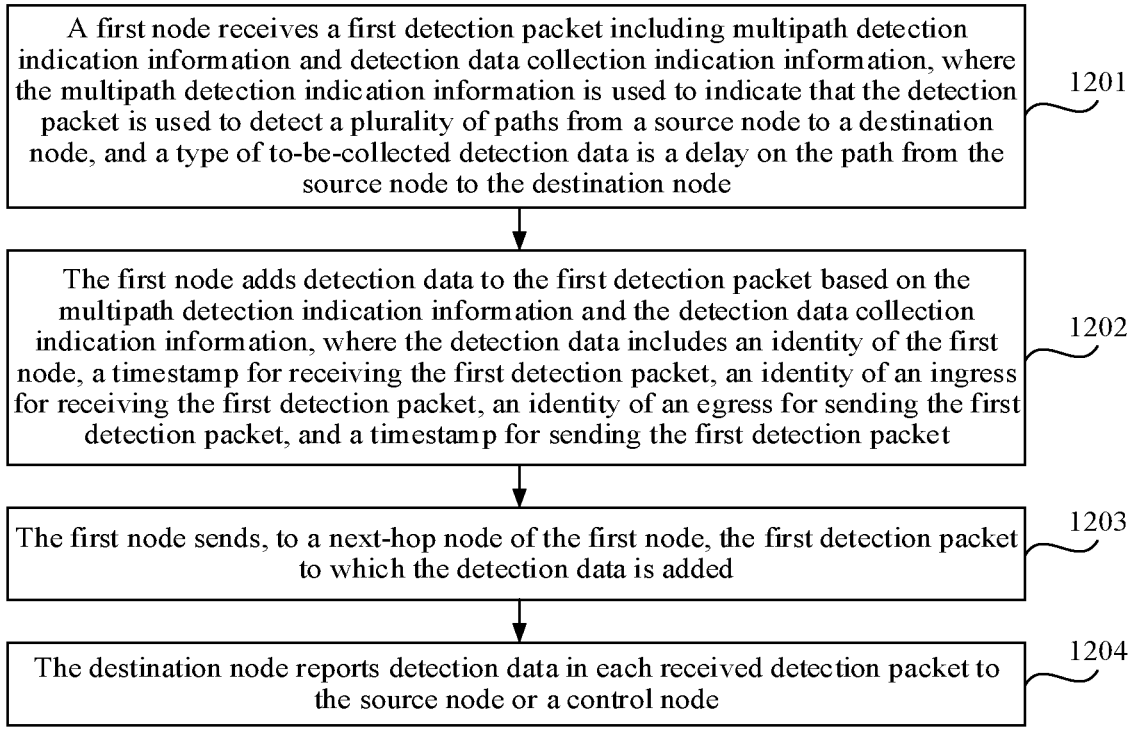
FIG. 12 is a flowchart of another path detection method according to an embodiment of this application.

FIG. 12 is a flowchart of a path detection method according to an embodiment of this application. The method is applied to a scenario in which a delay on a path from a source node to a destination node needs to be detected. In the embodiment shown in FIG. 12, a path is detected in a trace mode. As shown in FIG. 12, the method includes the following steps.

Step 1201: A first node receives a first detection packet including multipath detection indication information and detection data collection indication information, where the multipath detection indication information is used to indicate that the detection packet is used to detect a plurality of paths from the source node to the destination node, and a type of to-be-collected detection data is the delay on the path from the source node to the destination node.

Step 1202: The first node adds detection data to the first detection packet based on the multipath detection indication information and the detection data collection indication information, where the detection data includes an identity of the first node, a timestamp for receiving the first detection packet, an identity of an ingress for receiving the first detection packet, an identity of an egress for sending the first detection packet, and a timestamp for sending the first detection packet.

When receiving the first detection packet, the first node may add, to the first detection packet, the identity of the first node, the identity of the ingress for receiving the first detection packet, the timestamp for receiving the first detection packet, the identity of the egress for sending the first detection packet, and the timestamp for sending the first detection packet, and then send the first detection packet through the egress.

Step 1203: The first node sends, to a next-hop node of the first node, the first detection packet to which the detection data is added.

In a specific implementation, when the first node has at least two next-hop nodes to a destination of the first detection packet, the following uses an example in which the first node has two next-hop nodes (referred to as a second node and a third node) to the destination of the first detection packet for description. The first node is connected to the second node through a first port, and is connected to the third node through a second port. An identity of the first port is an identity of a first egress, and an identity of the second port is an identity of a second egress. In this scenario, an implementation process in which the first node sends, to a next-hop node of the first node, the first detection packet to which the detection data is added includes that the first node sends, to the second node, the first detection packet to which the identity of the first node, the identity of the ingress for receiving the first detection packet, the timestamp for receiving the first detection packet, an identity of a first egress for sending the first detection packet, and a timestamp for sending the first detection packet through the first port identified by the identity of the first egress are added, and the first node sends, to the third node, the first detection packet to which the identity of the first node, the identity of the ingress for receiving the first detection packet, the timestamp for receiving the first detection packet, an identity of a second egress for sending the first detection packet, and a timestamp for sending the first detection packet through the second port identified by the identity of the second egress are added.

That is, when the first node has at least two next-hop nodes to the destination of the first detection packet, the first node needs to copy the first detection packet, to send the first detection packet to each next-hop node, so that no path from the source node to the destination node is missed.

When receiving the first detection packet, the next-hop node may also continue to collect detection data and forward the first detection packet with reference to step 1201 to step 1203, until the destination node receives the first detection packet.

Step 1204: The destination node reports detection data in each received detection packet to the source node or a control node.

In a specific implementation, the destination node may directly modify a destination address of each received first detection packet, to report each received first detection packet to the control node or the source node in a communications network, and the control node or the source node analyzes the delay on the path from the source node to the destination node based on the detection data that is added by each node and that is carried by each received first detection packet. In another specific implementation, the destination node may alternatively report, to the control node or the source node in the communications network, the detection data that is added by each node and that is carried by each received first detection packet, the control node or the source node analyzes the delay on the path from the source node to the destination node based on the detection data added by each node. It may be understood that the detection data may be reported to the control node (for example, a packet format used for packet exchange between the control node and the destination node) or the source node by using another packet format.

For the plurality of received detection packets, the control node or the source node may associate, based on destination addresses and source addresses in the detection packets or instructions C in the detection packets, detection packets used to perform detection from a same source node to the destination node. For detection data in the associated detection packets, a multipath topology from the source node to the destination node is first restored based on node identities, node ingress identities, and node ingress identities in the detection data. For any two adjacent nodes in the multipath topology, a delay of a detection packet on each node and a delay of the detection packet on a link between the two nodes may be determined based on timestamps that are in detection data and that correspond to the two nodes.

Figure 13:
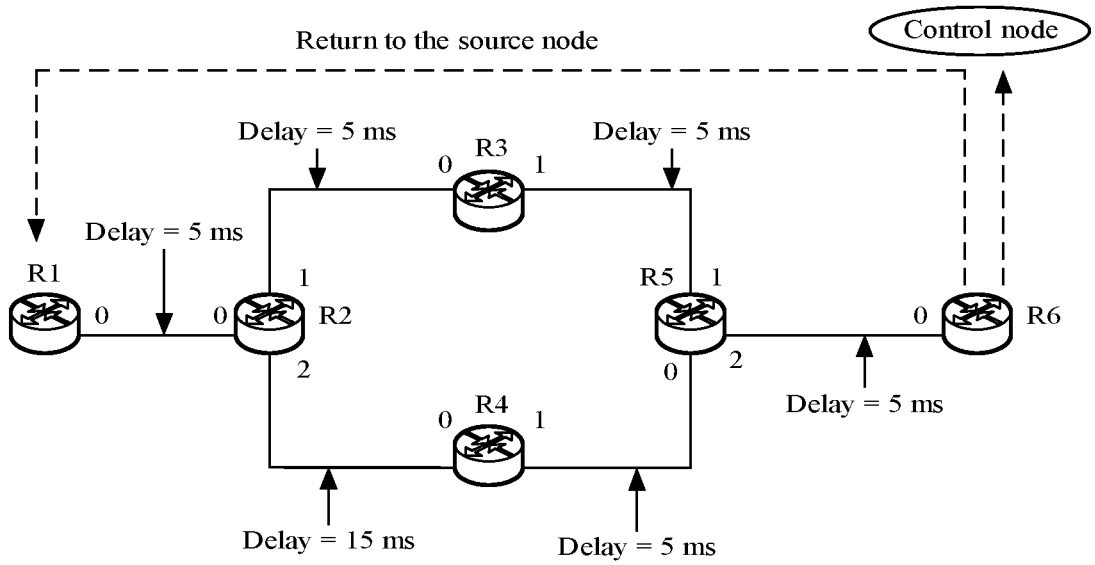
FIG. 13 is a schematic architectural diagram of another communications network according to an embodiment of this application.

The following further describes step 1201 to step 1204 by using a communications network shown in FIG. 13.

Assuming that the detection data collection indication information in the first detection packet is implemented by using an instruction B or telemetry indication information to carry to-be-collected specific data, the source node encapsulates a node ID (R1) of the source node, an ID (0) of an outbound interface for forwarding the detection packet, and a timestamp T2 for sending the detection packet in the detection packet, and forwards the encapsulated detection packet to an intermediate node R2.

After receiving the detection packet, the intermediate node R2 identifies, based on an instruction A, that multipath data collection needs to be performed. The node R2 encapsulates, based on the information collection instruction B or the telemetry indication information, information that needs to be carried. Further, the R2 detects that the R2 has a plurality of paths to a destination address, in other words, the R2 has N (N>1) outbound interfaces (two outbound interfaces in this embodiment). In other words, the R2 may have two next-hop nodes (R3 and R4) to the destination R6 of the first detection packet. In a specific implementation, technologies such as ECMP, UCMP, and LAG may be used to detect whether the R2 has a plurality of outbound interfaces to the destination of the detection packet. When the R2 detects that the R2 has a plurality of outbound interfaces to the destination of the detection packet, the R2 makes N−1 copies of the detection packet (in this embodiment, one copy is made), and encapsulates a node ID (R2), a detection packet inbound interface ID (0), a timestamp T1 for receiving the detection packet, corresponding outbound interface IDs, and corresponding timestamps for sending the detection packet in N packets obtained after copy. In this embodiment, the R2 encapsulates the node ID (R2), the detection packet ingress interface ID (0), the ingress node timestamp T1 of the detection packet, an identity of an outbound interface 1, and an egress node timestamp T2 in one packet, and encapsulates the node ID (R2), the detection packet inbound interface ID (0), the ingress node timestamp T1 of the detection packet, an identity of an outbound interface 2, and a timestamp T2 for sending the detection packet in the other packet. The R2 sends, through the outbound interface 1, the packet encapsulated with the outbound interface 1, and sends, through the outbound interface 2, the packet encapsulated with the outbound interface 2. In this embodiment, T2 in the two packets may be different, and T2 is a timestamp at which the detection packet leaves a forwarding interface of a node. In addition, T1 and T2 of each node are different.

The detection packet sent to the R3 passes through the R3 and R5, and is encapsulated with corresponding information, and is finally sent to the destination node R6. Information in the detection packet is R1(0&T2)-(0&T1)R2(1&T2)-(0&T1)R3(1&T2)-(1&T1)R5(2&T2)-(0&T1)R6.

The detection packet sent to the R4 passes through the R4 and the R5, and is encapsulated with corresponding information, and is finally sent to the destination node R6. Content in the detection packet finally received by the R6 is R1(0&T2)-(0&T1)R2(2&T2)-(0&T1)R4(1&T2)-(0&T1)R5(2&T2)-(0&T1)R6.

Finally, the R6 receives two detection packets, and the destination node R6 may modify destination addresses of the two detection packets and then report the two detection packets to the control node or forward the two detection packets to the source node. The control node or the source node calculates a delay on the path from the R1 to the R6 based on the received detection packets. As shown in FIG. 13, the source node or the control node determines, based on the received information, that a delay from the R1 to the R2 is 5 milliseconds (ms), a delay from the R2 to the R3 is 5 ms, a delay from the R3 to the R5 is 5 ms, a delay from the R5 to the R6 is 5 ms, a delay from the R2 to the R4 is 15 ms, and a delay from the R4 to the R5 is 5 ms.

For the received detection packets, the control node or the source node may associate, based on destination addresses and source addresses in the detection packets or instructions C in the detection packets, detection packets used to perform detection from a same source node to the destination node. For the associated detection packets, node identities, node ingress identities, timestamps for receiving the packets, node egress identities, and timestamps for sending the packets in the detection packets are obtained, and a delay on the path from the destination node to the source node may be restored based on the obtained data.

According to the method for detecting delays on the plurality of paths in this embodiment, problems of redundant detection packets, low detection efficiency, and low accuracy are resolved.

In the embodiment shown in FIG. 12, the destination node reports, to the source node or the control node, all the detection data added by the intermediate nodes to the first detection packet. In the embodiments of this application, alternatively, each intermediate node may report the detection data to the source node or the control node. This is explained and described in the following embodiments.

Figure 14:
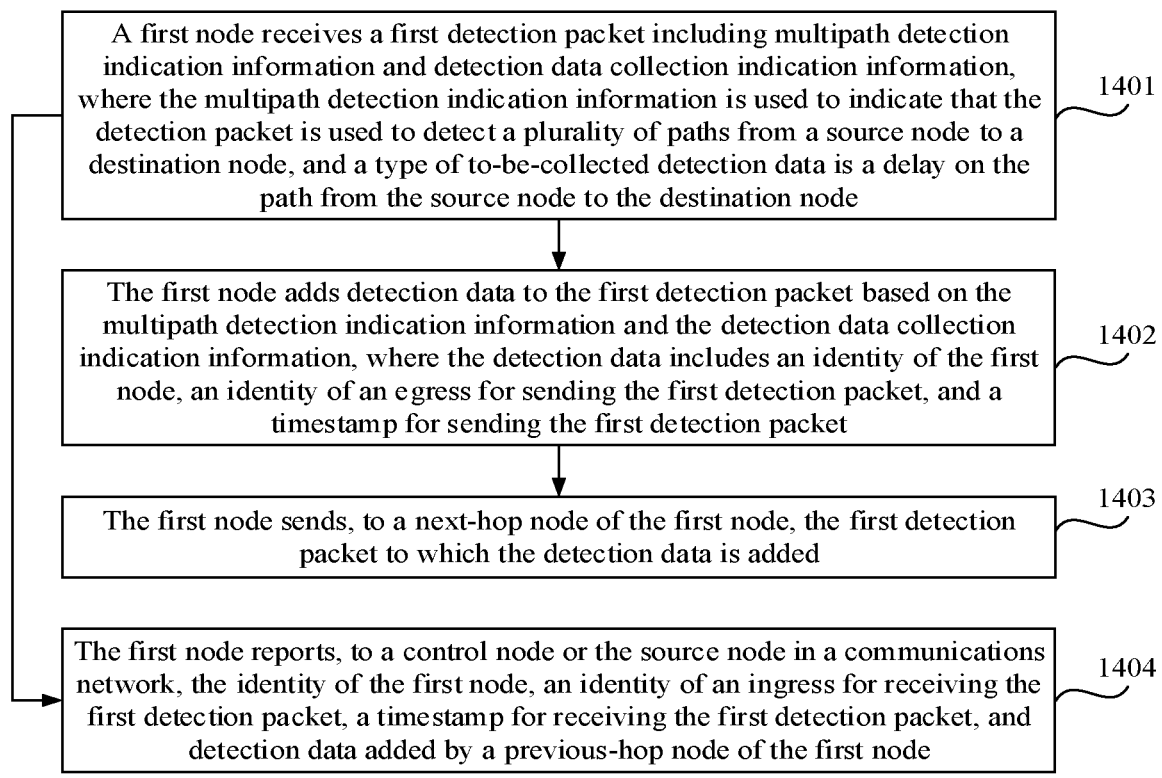
FIG. 14 is a flowchart of another path detection method according to an embodiment of this application.

FIG. 14 is a flowchart of a path detection method according to an embodiment of this application. The method is also applied to a scenario in which a delay on a path from a source node to a destination node needs to be detected. In the embodiment shown in FIG. 14, a path is detected in a per-hop. As shown in FIG. 14, the method includes the following steps.

Step 1401: A first node receives a first detection packet including multipath detection indication information and detection data collection indication information, where the multipath detection indication information is used to indicate that the detection packet is used to detect a plurality of paths from the source node to the destination node, and a type of to-be-collected detection data is the delay on the path from the source node to the destination node.

For an implementation of step 1401, refer to step 1201. Details are not described herein again.

Step 1402: The first node adds detection data to the first detection packet based on the multipath detection indication information and the detection data collection indication information, where the detection data includes an identity of the first node, an identity of an egress for sending the first detection packet, and a timestamp for sending the first detection packet.

In step 1402, the first node adds the identity of the first node, the identity of the egress for sending the detection packet, and the timestamp for sending the detection packet to the first detection packet. Data such as the identity of the first node, an ingress identity, a timestamp for receiving the detection packet, and detection data added by a previous-hop node of the first node is directly reported to the source node or a control node by using step 1404. In this way, load of the detection packet can be reduced, and efficiency of forwarding the detection packet can be improved.

Step 1403: The first node sends, to a next-hop node of the first node, the first detection packet to which the detection data is added.

In this embodiment, the first node needs to report the detection data to the source node or the control node. Therefore, in a specific implementation, when the first node has at least two next-hop nodes to a destination of the first detection packet, the following uses an example in which the first node has two next-hop nodes (referred to as a second node and a third node) to the destination of the first detection packet for description. The first node is connected to the second node through a first port, and is connected to the third node through a second port. An identity of the first port is an identity of a first egress, and an identity of the second port is an identity of a second egress. In this scenario, an implementation process in which the first node sends, to the next-hop node of the first node, the first detection packet to which the detection data is added includes that the first node sends, to the second node through the first port, the first detection packet to which the identity of the first node, the identity of the first egress for sending the first detection packet, and a timestamp for sending the first detection packet are added, and the first node sends, to the third node through the second port, the first detection packet to which the identity of the first node, the identity of the second egress for sending the first detection packet, and a timestamp for sending the first detection packet are added.

Step 1404: The first node reports, to the control node or the source node in a communications network, the identity of the first node, the identity of the ingress for receiving the first detection packet, the timestamp for receiving the first detection packet, and the detection data added by the previous-hop node of the first node.

By performing step 1404, the first node may report the detection data to the control node or the source node.

It may be understood that, for a solution in which a multipath node reports data to the control node or the source node, refer to the solution in which all path topologies from the source node to the destination node are detected in the embodiment shown in FIG. 6. A specific processing process and principle are similar, and details are not described herein again. A difference lies in that in the embodiment shown in FIG. 14, the timestamp for receiving the detection packet is added to the reported data, and the timestamp for sending the detection packet is added to the added data sent to the next-hop node.

The following further describes step 1401 to step 1405 by using a communications network shown in FIG. 13.

Assuming that the detection data collection indication information in the first detection packet is implemented by adding to-be-collected specific data to an instruction B or telemetry indication information, the source node encapsulates a node ID (R1) of the source node, an ID (0) of an outbound interface for forwarding the detection packet, a timestamp (T2) for sending the detection packet in the detection packet, and forwards the encapsulated detection packet to an intermediate node R2. The following uses an example in which each intermediate node adds detection data to the first detection packet for reporting.

After receiving the detection packet, the intermediate node R2 identifies, based on an instruction A, that multipath data collection needs to be performed. The intermediate node R2 encapsulates, based on the information collection instruction B or the telemetry indication information, information that needs to be carried, to be specific, encapsulates a node ID (R2) of the intermediate node R2, a detection packet inbound interface ID (0), and a timestamp (T1) for receiving the detection packet. The R2 detects that the R2 has a plurality of paths to a destination address of the first detection packet, in other words, the R2 has N (N>1) outbound interfaces (two outbound interfaces in this embodiment). In other words, the R2 may have two next-hop nodes (R3 and R4) to the destination of the first detection packet. In a specific implementation, the plurality of outbound interfaces may be detected by using technologies such as ECMP, UCMP, and LAG. The R2 reports the first detection packet encapsulated with (R1(0&T2)-(0&T1) R2) to the control node or forwards the first detection packet to the source node, and then deletes the ingress identity of the R2 and detection data added by another node (R1(0&T2) in this embodiment) in the encapsulated first detection packet. The R2 makes N−1 copies of the detection packet obtained after the data is deleted (in this embodiment, there are two outbound interfaces, and therefore one copy is made). The R2 encapsulates identities of corresponding outbound interfaces and corresponding timestamps for sending the detection packets in the N detection packets obtained after copy (in this embodiment, the R2 encapsulates an identity of an outbound interface 1 and a timestamp for sending the detection packet through the outbound interface 1 in one of two packets obtained after copy, and encapsulates an identity of an outbound interface 2 and a timestamp for sending the detection packet through the outbound interface 2 in the other detection packet). Then, the R2 sends the detection packet encapsulated with the node ID, the identity of the outbound interface 1, and the timestamp for sending the detection packet through the outbound interface 1 (R2 (1&T2)) to the R3 through the outbound interface 1, and sends the detection packet encapsulated with the node ID, the identity of the outbound interface 2, and the timestamp for sending the detection packet through the outbound interface 2 (R2 (2&T2)) to the R4 through the outbound interface 2.

It should be noted that, in this embodiment, the detection data is reported to the controller or the source node by using a detection packet, another manner of reporting the detection data is also applicable, and details are not described herein. In all scenarios in which the detection data is reported in the following embodiments, a manner of reporting the detection packet is used. In addition, it should be noted that detecting a quantity of outbound interfaces and encapsulating the node ID (R2), the detection packet inbound interface ID, and the timestamp for receiving the packet (0&T1) are not limited in sequence. After the detecting step, the node ID (R2), the detection packet inbound interface ID (0), and the timestamp for receiving the packet may be encapsulated in each of the two detection packets. In this case, only one of the detection packets needs to be reported. After one of the detection packets is reported, data in the two detection packets is deleted, and finally, corresponding outbound interface identities and corresponding timestamps for sending the packets are encapsulated in the detection packets obtained after the data is deleted. In addition, it should also be noted that after the R2 reports, to the source node or the control node, the two detection packets to which the detection data is added, the R2 may directly continue to send the two packets to the two next-hop nodes respectively without deleting the data in the detection packets.

After receiving the detection packet encapsulated with R2(1&T2), the R3 performs the same operation as the R2. The R3 encapsulates a node ID of the R3, an inbound interface ID, and a timestamp for receiving the packet, reports the packet encapsulated with R2(1&T2)-(0&T1)R3 to the control node or forwards the packet to the source node, and detects whether the R3 has a plurality of outbound interfaces to the destination (in this embodiment, the R3 has only one outbound interface to the destination R6), that is, the R3 may have one next-hop node (R5) to the destination of the first detection packet. The R3 deletes the data (R2 (1&T2) encapsulated by the R2 and the inbound interface identity and the timestamp for receiving the packet that are encapsulated by the R3 in the detection packet, then encapsulates an outbound interface identity R3(1) of the R3 and a timestamp T2 for sending the detection packet, and sends the detection packet encapsulated with R3(1&T2) to the R5.

The detection packet received by the R5 includes only information about the R3, that is, R3(1&T2). The R5 encapsulates a node ID (R5) of the R5, detection packet inbound interface ID (0), and a timestamp T1 for receiving the detection packet, and then reports the detection packet encapsulated with R3(1&T2)-(1&T1)R5 to the control node or forwards the detection packet to the source node. The R5 detects whether the R5 has a plurality of outbound interfaces to the destination address of the first detection packet (only one outbound interface in this embodiment). In other words, the R5 may have one next-hop node (R6) to the destination of the first detection packet. The R5 deletes the data (R3 (1&T2) encapsulated by the R3 and the inbound interface identity (1) and the timestamp for receiving the packet that are encapsulated by the R5 in the detection packet, then encapsulates an outbound interface identity (2) of the R5 and a timestamp for sending the detection packet, and sends the detection packet encapsulated with R5(2&T2) to the R6.

Another node performs processing similar to that of the R2. After receiving a detection packet sent by a previous-hop node, the other node adds a node identity and inbound interface identity of the other node, and a timestamp for receiving the packet, then reports the detection packet to the control node or forward the detection packet to the source node, then deletes the inbound interface identity, the timestamp for receiving the packet, and detection data added by another node, encapsulates an egress identity and a timestamp for sending the packet in the first detection packet obtained after the data is deleted, and sends the finally encapsulated first detection packet to a next-hop node. Details are not described herein again.

The R6 receives two detection packets from the R3 and the R4. Content of either detection packet is R5(2&T2)-(0&T1)R6. The R6 reports the two detection packets to the control node or forwards the two detection packets to the source node.

The control node or the source node receives seven detection packets in total, and content carried in the seven detection packets is R1(0&T2)-(0&T1)R2, R2(1 &T2)-(0&T1)R3, R2(2&T2)-(0&T1)R44, R3 (1&T2)-(0&T1)R5, R4(1&T2)-(0&T1)R5, R5(2&T2)-(0&T1)R6, and R5(2&T2)-(0&T1)R6, and delays in multipath topologies from the R1 to the R6 may be analyzed. For a specific manner, refer to the foregoing embodiments. Details are not described herein again.

For the plurality of received detection packets, the control node or the source node may associate, based on destination addresses and source addresses in the detection packets or instructions C in the detection packets, detection packets used to perform detection from a same source node to the destination node. For detection data in the associated detection packets, a multipath topology from the source node to the destination node is first restored based on node identities, node ingress identities, and node ingress identities in the detection data. For any two adjacent nodes in the multipath topology, a delay of a detection packet on each node and a delay on a link between the two nodes may be determined based on timestamps that are in the detection data and that correspond to the two nodes.

According to the method for detecting delays on the plurality of paths in this embodiment, problems of redundant detection packets, low detection efficiency, and low accuracy are resolved.

In the embodiment shown in FIG. 14, each of the intermediate nodes reports the detection data to the source node or the control node. In the embodiments of this application, some intermediate nodes in the intermediate nodes may report detection data, and other nodes do not need to report detection data. The intermediate node that reports the detection data may be an intermediate node that meets a specified condition. The specified condition may be that the intermediate node has a plurality of next-hop nodes to the destination node, or may be another specified condition. The following embodiment is described by using an example in which the specified condition is that the intermediate node has a plurality of next-hop nodes to the destination node.

Figure 15:
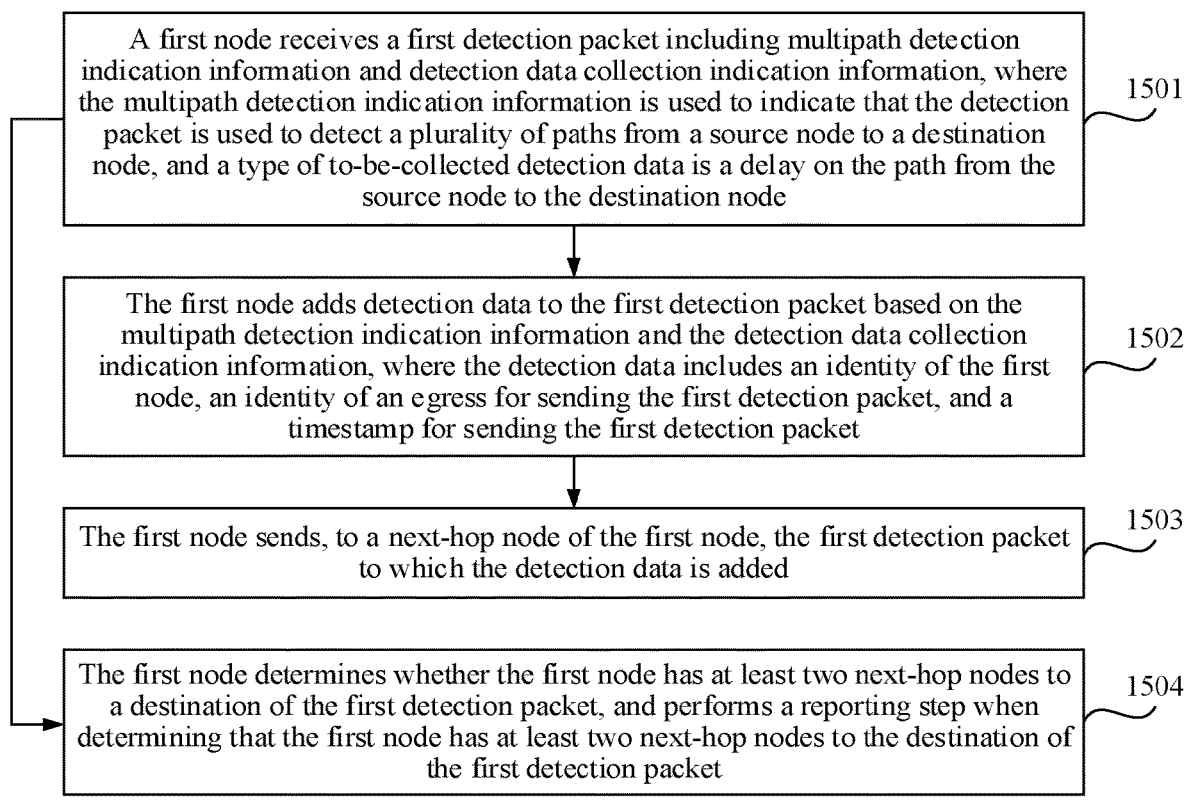
FIG. 15 is a flowchart of another path detection method according to an embodiment of this application.

FIG. 15 is a flowchart of a path detection method according to an embodiment of this application. The method is also applied to a scenario in which a delay on a path from a source node to a destination node needs to be detected. In the embodiment shown in FIG. 15, a path is detected in a per-section. As shown in FIG. 15, the method includes the following steps.

Step 1501: A first node receives a first detection packet including multipath detection indication information and detection data collection indication information, where the multipath detection indication information is used to indicate that the detection packet is used to detect a plurality of paths from the source node to the destination node, and a type of to-be-collected detection data is the delay on the path from the source node to the destination node.

For an implementation of step 1501, refer to step 1401. Details are not described herein again.

Step 1502: The first node adds detection data to the first detection packet based on the multipath detection indication information and the detection data collection indication information, where the detection data includes an identity of the first node, an identity of an egress for sending the first detection packet, and a timestamp for sending the first detection packet.

For an implementation of step 1502, refer to step 1402. Details are not described herein again.

Step 1503: The first node sends, to a next-hop node of the first node, the first detection packet to which the detection data is added.

For an implementation of step 1503, refer to step 1403. Details are not described herein again.

Step 1504: The first node determines whether the first node has at least two next-hop nodes to the destination of the first detection packet, and performs a reporting step when determining that the first node has at least two next-hop nodes to the destination of the first detection packet.

In this embodiment, the reporting step in step 1504 and step 1505 and the step of forwarding the first detection packet in step 1502 and step 1503 are performed only when the first node has a plurality of next-hop nodes to the destination node. Otherwise, the first node performs the steps of adding the detection data and forwarding the first detection packet in step 1202 and step 1203.

It may be understood that, for a solution in which a multipath node reports data to a control node or the source node, refer to the solution in which all path topologies from the source node to the destination node are detected in the embodiment shown in FIG. 7. A specific processing process and principle are similar, and details are not described herein again. A difference lies in that in the embodiment shown in FIG. 15, the timestamp for receiving the detection packet is added to the reported data, and the timestamp for sending the detection packet is added to the added data sent to the next-hop node.

The following further describes step 1501 to step 1504 by using a communications network shown in FIG. 13.

Assuming that the detection data collection indication information in the first detection packet is implemented by adding to-be-collected specific data to an instruction B or telemetry indication information, the source node encapsulates a node ID (R1) of the source node, an ID (0) of an outbound interface for forwarding the detection packet, a timestamp (T2) for sending the detection packet in the detection packet, and forwards the encapsulated detection packet to an intermediate node R2. The following uses an example in which each intermediate node adds detection data to the first detection packet for reporting.

After receiving the detection packet, the intermediate node R2 identifies, based on an instruction A, that multipath data collection needs to be performed. The intermediate node R2 encapsulates, based on the information collection instruction B or the telemetry indication information, information that needs to be carried, to be specific, encapsulates a node ID (R2) of the intermediate node R2, a detection packet inbound interface ID (0), and a timestamp (T1) for receiving the detection packet. The R2 detects that the R2 has a plurality of paths to a destination address of the first detection packet, in other words, the R2 has N (N>1) outbound interfaces (two outbound interfaces in this embodiment). In other words, the R2 may have two next-hop nodes (R3 and R4) to the destination of the first detection packet. In a specific implementation, the plurality of outbound interfaces may be detected by using technologies such as ECMP, UCMP, and LAG. The R2 reports the first detection packet encapsulated with (R1(0&T2)-(0&T1)R2) to the control node or forwards the first detection packet to the source node, and then deletes the ingress identity of the R2 and detection data added by another node (R1(0&T2) in this embodiment) from the encapsulated first detection packet. The R2 makes N−1 copies of the detection packet obtained after the data is deleted (in this embodiment, there are two outbound interfaces, and therefore one copy is made). The R2 encapsulates identities of corresponding outbound interfaces and corresponding timestamps for sending the detection packets in the N detection packets obtained after copy (in this embodiment, the R2 encapsulates an identity of an outbound interface 1 and a timestamp for sending the detection packet through the outbound interface 1 in one of two packets obtained after copy, and encapsulates an identity of an outbound interface 2 and a timestamp for sending the detection packet through the outbound interface 2 in the other detection packet). Then, the R2 sends the detection packet encapsulated with the node ID, the outbound interface 1, and the timestamp for sending the detection packet through the outbound interface 1 (R2 (1&T2)) to the R3 through the outbound interface 1, and sends the detection packet encapsulated with the node ID, the outbound interface 2, and the timestamp for sending the detection packet through the outbound interface 2 (R2 (2&T2)) to the R4 through the outbound interface 2. It should be noted that, in this embodiment, the detection data is reported to the controller or the source node by using a detection packet, another manner of reporting the detection data is also applicable, and details are not described herein. In all scenarios in which the detection data is reported in the following embodiments, a manner of reporting the detection packet is used. In addition, it should be noted that detecting a quantity of outbound interfaces and encapsulating the node ID (R2), the detection packet inbound interface ID, and the timestamp for receiving the packet (0&T1) are not limited in sequence. For a specific implementation, refer to the embodiment shown in FIG. 14. Details are not described herein again. In addition, it should also be noted that after the R2 reports, to the source node or the control node, the two detection packets to which the detection data is added, the R2 may directly continue to send the two packets to the two next-hop nodes respectively without deleting the data in the detection packets.

After receiving the detection packet, the R3 identifies, based on the instruction A, that multipath data collection needs to be performed, and the node R3 encapsulates a node ID of the node R3, a detection packet inbound interface ID, and a timestamp for receiving the detection packet based on the instruction B. After detecting that the R3 has only one outbound interface to the destination of the detection packet (in other words, the R3 has only one next-hop node to the destination of the detection packet), the R3 directly encapsulates the outbound interface ID and the timestamp for sending the detection packet in the detection packet without reporting the detection data, and then sends a detection packet encapsulated with (R2(1&T2)-(0&T1)R3(1&T2)) to R5. It should also be noted that detecting a quantity of outbound interfaces and encapsulating the node ID (R3), the detection packet inbound interface ID (0), and the timestamp for receiving the detection packet are not limited in sequence. After the detecting step, the node ID (R3), the detection packet inbound interface ID, and the timestamp for receiving the detection packet may be encapsulated in the detection packet.

After the R5 receives the packet, because the R5 has only one next-hop node to the destination node, the R5 performs the same operation as the R3, and then sends the detection packet encapsulated with (R2(1&T2)-(0&T1)R3(1&T2)-(1&T1)R5(2&T2)) to the destination node R6.

After receiving the detection packet, the R6 encapsulates an ID of the R6, a detection packet inbound interface ID, and a timestamp for receiving the detection packet in the detection packet. The finally encapsulated information in the detection packet is R2(1 &T2)-(0&T1)R3(1&T2)-(1&T1)R5(2&T2)-(0&T1)R6.

Other nodes (the R4 and the R5) perform processing similar to that of the R3. The R4 and the R5 each have only one next-hop node. Therefore, after receiving the detection packets sent by previous-hop nodes, the R4 and the R5 each directly add, to the detection packet, a node identity, an inbound interface identity, a timestamp for receiving the packet, an outbound interface identity, and a timestamp for sending the detection packet, and send, to a next-hop node, the detection packet to which the detection data is added. Details are not described herein again.

Finally, the R6 receives two detection packets, and reports the two detection packets to the control node or forwards the two detection packets to the source node. In this embodiment, the control node or the source node receives three detection packets in total. The control node or the source node associates, based on the detection packet (the detection data carried in the detection packet is R1(0&T2)-(0&T1)R2) reported by the R2, two detection packets (the detection data carried in the two detection packets is R2(1&T2)-(0&T1) R3(1&T2)-(1&T1)R5(2&T2)-(0&T1)R6 and R2(2&T2)-(0&T1)R4(1&T2)-(0&T1)R5(2&T2)-(0&T1)R6) reported by the R6, to obtain complete information about the three paths from the R1 to the R6 and delays between nodes on the paths from the three detection packets.

For the plurality of received detection packets, the control node or the source node may associate, based on destination addresses and source addresses in the detection packets or instructions C in the detection packets, detection packets used to perform detection from a same source node to the destination node. For detection data in the associated detection packets, a multipath topology from the source node to the destination node is first restored based on node identities, node ingress identities, and node ingress identities in the detection data. For any two adjacent nodes in the multipath topology, a delay of a detection packet on each node and a delay on a link between the two nodes may be determined based on timestamps that are in detection data and that correspond to the two nodes.

Compared with the information carried in the detection packet in the embodiment shown in FIG. 12, information carried in the packet is reduced. Especially, if there are a plurality of multipath nodes (that is, like the R2 node, the multipath node has a plurality of paths to the destination node R6) on a path from the R2 to the R6, less content is added to the detection packet that arrives at the R6. This helps save resources such as bandwidth.

In addition, compared with the embodiment shown in FIG. 14, not all nodes need to report information to the control node or the source node. In this embodiment, only the multipath node reports detection data to the control node or the source node, thereby reducing interaction load between the nodes and the controller. In addition, because the multipath node reports the detection data, and the detection packet sent by the multipath node to a next-hop node carries only a part of the detection data, content added to the detection packet that arrives at the destination R6 is still less than content added to the detection packet that arrives at the R6 in the embodiment shown in FIG. 12. This helps save resources such as bandwidth. Therefore, compared with the embodiment shown in FIG. 14, this embodiment reduces interaction load between the nodes and the controller. Compared with the embodiment shown in FIG. 12, this embodiment saves resources such as bandwidth.

According to the method for detecting delays on the plurality of paths in this embodiment, problems of redundant detection packets, low detection efficiency, and low accuracy are resolved.

Figure 16:
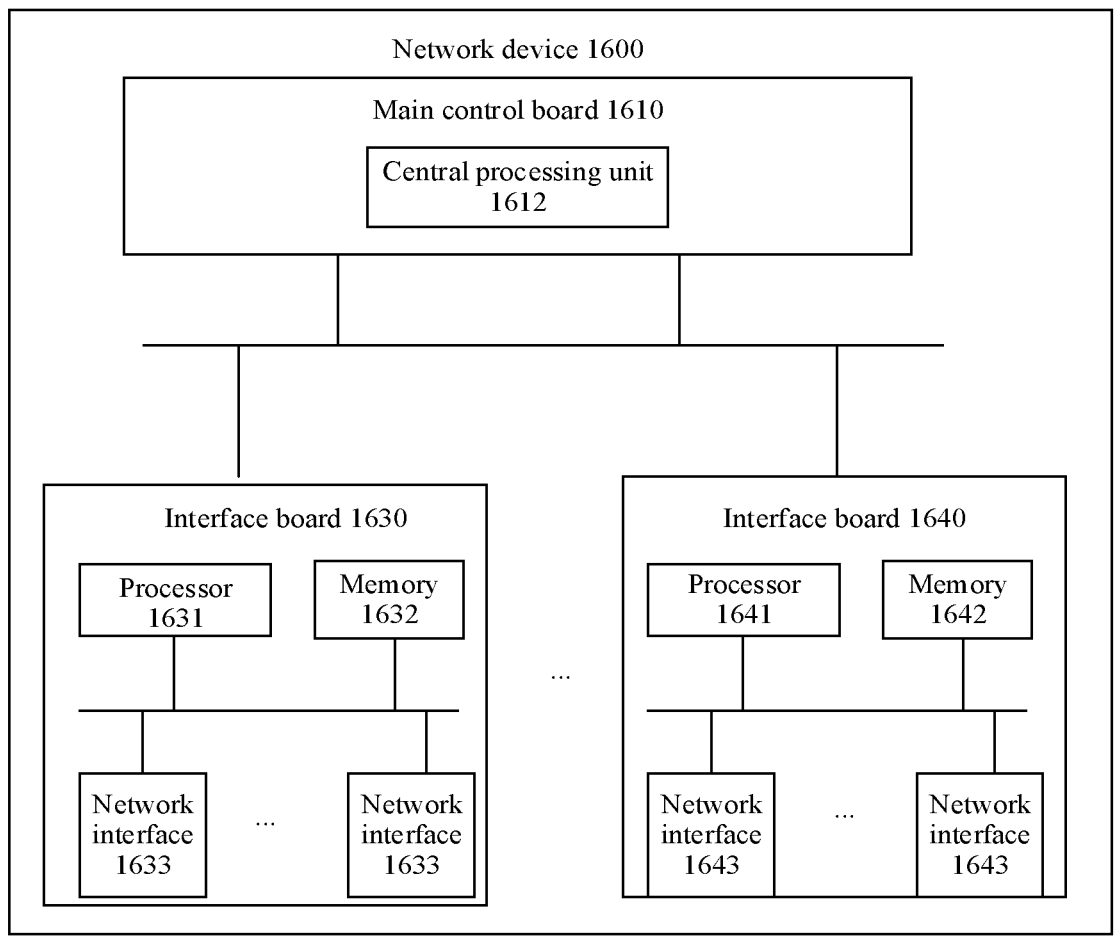
FIG. 16 is a schematic structural diagram of a network device according to an embodiment of this application.

FIG. 16 is a schematic structural diagram of a network device according to an embodiment of this application. The network device may be the first node 1600 in the embodiments shown in FIG. 2 to FIG. 15. The network device 1600 may be a switch, a router, or another network device that forwards a packet. In this embodiment, the network device 1600 includes a main control board 1610, an interface board 1630, and an interface board 1640. When there is a plurality of interface boards, a switch fabric (not shown in the figure) may be included. The switch fabric is configured to complete data exchange between interface boards (the interface board is also referred to as a line card or a service board).

The main control board 1610 is configured to complete functions such as system management, device maintenance, and protocol processing. The interface boards 1630 and 1640 are configured to provide various service interfaces (for example, a point of sale (POS) interface, a gigabit Ethernet (GE) interface, and an asynchronous transfer mode (ATM) interface), and forward a packet. The main control board 1610 mainly includes three types of function units: a system management and control unit, a system clock unit, and a system maintenance unit. The main control board 1610, the interface board 1630, and the interface board 1640 are connected to a system backplane through a system bus, to implement interworking. The interface board 1630 includes one or more processors 1631. The processor 1631 is configured to control and manage the interface board, communicate with a central processing unit (CPU) on the main control board, and forward a packet. A memory 1632 on the interface board 1630 is configured to store a forwarding entry, and the processor 1631 forwards a packet by searching the forwarding entry stored in the memory 1632.

The interface board 1630 includes one or more network interfaces 1633 configured to receive a detection packet sent by a previous-hop node, and send a processed detection packet to a next-hop network node based on an indication of the processor 1631. For a specific implementation process, refer to steps 202, 203, and 205 in the embodiment shown in FIG. 2, steps 401, 403, and 404 in the embodiment shown in FIG. 4, steps 601 and 603 in the embodiment shown in FIG. 6, steps 701 and 703 in the embodiment shown in FIG. 7, steps 801 and 803 in the embodiment shown in FIG. 8, steps 1001 and 1003 in the embodiment shown in FIG. 10, steps 1101 and 1103 in the embodiment shown in FIG. 11, steps 1201 and 1203 in the embodiment shown in FIG. 12, steps 1401 and 1403 in the embodiment shown in FIG. 14, and steps 1501 and 1503 in the embodiment shown in FIG. 15. Details are not described herein again.

The processor 1631 is configured to perform processing steps and functions of the first node described in the embodiments shown in FIG. 2 to FIG. 15. For details, refer to step 201 (processing when the first node is used as a source node) or step 204 (processing when the first node is used as an intermediate node) in the embodiment shown in FIG. 2, step 402 in the embodiment shown in FIG. 4, steps 602, 604, and 605 in the embodiment shown in FIG. 6, steps 702 and 704 in the embodiment shown in FIG. 7, step 802 in the embodiment shown in FIG. 8, step 1002 in the embodiment shown in FIG. 10, steps 1102 and 1104 in the embodiment shown in FIG. 11, step 1202 in the embodiment shown in FIG. 12, steps 1402 and 1404 in the embodiment shown in FIG. 14, and steps 1502 and 1504 in the embodiment shown in FIG. 15. Details are not described herein again.

It may be understood that, as shown in FIG. 16, in this embodiment, a plurality of interface boards is included, and a distributed forwarding mechanism is used. In this mechanism, an operation on the interface board 1640 is basically similar to an operation on the interface board 1630. For brevity, details are not described again. In addition, it may be understood that the processor 1631 and/or a processor

1641 in the interface board 1630 in FIG. 16 may be dedicated hardware or dedicated chip, for example, a network processor or an application-specific integrated circuit (ASIC), to implement the foregoing functions. This implementation is commonly referred to as a manner in which processing is performed by using the dedicated hardware or the dedicated chip on a forwarding plane. For a specific implementation of the dedicated hardware or the dedicated chip such as a network processor, refer to the following embodiment shown in FIG. 17. In another implementation, the processor 1631 and/or the processor 1641 may alternatively be a general-purpose processor, for example, a general-purpose CPU, to implement the foregoing functions.

In addition, it should be noted that there may be one main control board or a plurality of main control boards. When there is a plurality of main control boards, a primary main control board and a secondary main control board may be included. There may be one or more interface boards, and a device having a stronger data processing capability provides more interface boards. When there is a plurality of interface boards, the plurality of interface boards may communicate with each other through one or more switch fabrics. When there is a plurality of interface boards, the plurality of interface boards may jointly implement load sharing and redundancy backup. In a centralized forwarding architecture, the device may not need the switch fabric, and the interface board provides a function of processing service data of an entire system. In a distributed forwarding architecture, the device includes a plurality of interface boards, and data may be exchanged between the plurality of interface boards through the switch fabric, to provide a large-capacity data exchange and processing capability. Therefore, a data access and processing capability of a network device in the distributed architecture is better than that of a device in the centralized architecture. Which architecture is further used depends on a specific networking deployment scenario, and this is not limited herein.

In a specific embodiment, the memory 1632 may be a read-only memory (ROM) or another type of static storage device that can store static information and an instruction, or a random-access memory (RAM) or another type of dynamic storage device that can store information and an instruction, or may be an electrically erasable programmable ROM (EEPROM), a compact disc (CD) ROM (CD-ROM) or another compact disc storage medium, optical disc storage medium (including a CD, a laser disc, an optical disc, a DIGITAL VERSATILE DISC (DVD), a BLU-RAY disc, or the like) and a disk, another magnetic storage device, or any other medium that can be configured to carry or store expected program code in a form of an instruction or a data structure and that is accessible by a computer, but is not limited thereto. The memory 1632 may exist independently and is connected to the processor 1631 through a communications bus. The memory 1632 may alternatively be integrated with the processor 1631.

The memory 1632 is configured to store program code, and the processor 1631 controls execution of the program code, to perform the path detection method provided in the foregoing embodiments. The processor 1631 is configured to execute the program code stored in the memory 1632. The program code may include one or more software modules. The one or more software modules may be software modules provided in any one of the embodiments in FIG. 19, FIG. 20, or FIG. 21.

In a specific embodiment, the network interface 1633 is configured to communicate with another device or a communications network such as the Ethernet, a radio access network (RAN), or a wireless local area network (WLAN) by using any apparatus such as a transceiver.

Figure 17:
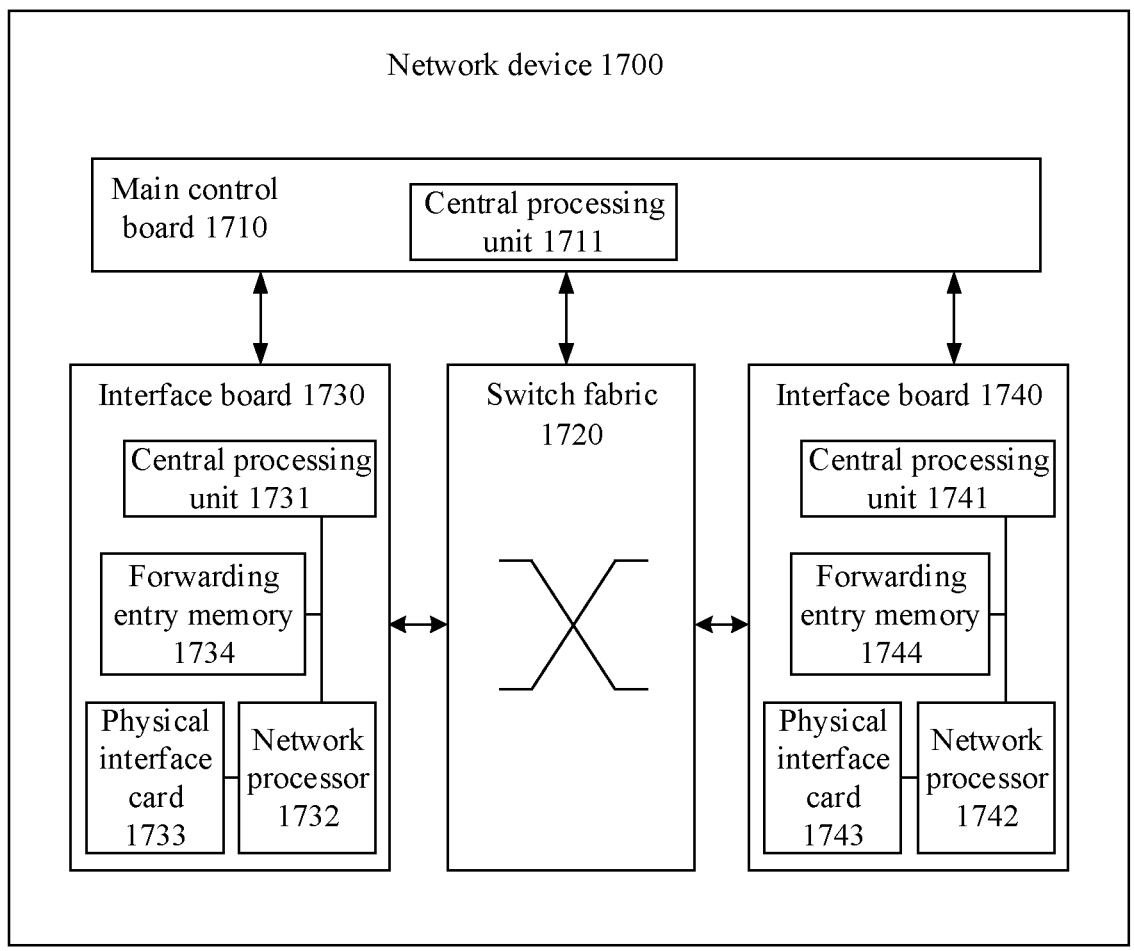
FIG. 17 is a schematic structural diagram of another network device according to an embodiment of this application.

FIG. 17 is a schematic structural diagram of another network device according to an embodiment of this application. The network device may be the first node 1700 in the embodiments shown in FIG. 2 to FIG. 15. The network device 1700 may be a switch, a router, or another network device that forwards a packet. In this embodiment, the network device 1700 includes a main control board 1710, an interface board 1730, a switch fabric 1720, and an interface board 1740. The main control board 1710 is configured to complete functions such as system management, device maintenance, and protocol processing. The switch fabric 1720 is configured to complete data exchange between interface boards (the interface board is also referred to as a line card or a service board). The interface boards 1730 and 1740 are configured to provide various service interfaces (for example, a POS interface, a GE interface, and an ATM interface), and forward a packet. A control plane includes management and control units of the main control board 1710 and management and control units on the interface board 1730 and the interface board 1740. The main control board 510 mainly includes three types of function units: a system management and control unit, a system clock unit, and a system maintenance unit. The main control board 1710, the interface board 1730, the interface board 1740, and the switch fabric 1720 are connected to a system backplane through a system bus, to implement interworking. A CPU 1731 on the interface board 1730 is configured to control and manage the interface board, and communicate with a CPU on the main control board. A forwarding entry memory 1734 on the interface board 1730 is configured to store a forwarding entry, and a network processor 1732 forwards a packet by searching the forwarding entry stored in the forwarding entry memory 1734.

A physical interface card 1733 on the interface board 1730 is configured to receive a detection packet sent by a previous-hop node. For a specific implementation process, refer to step 203 in the embodiment shown in FIG. 2, step 401 in the embodiment shown in FIG. 4, step 601 in the embodiment shown in FIG. 6, step 701 in the embodiment shown in FIG. 7, step 801 in the embodiment shown in FIG. 8, step 1001 in the embodiment shown in FIG. 10, step 1101 in the embodiment shown in FIG. 11, step 1201 in the embodiment shown in FIG. 12, steps 1401 and 1402 in the embodiment shown in FIG. 14, and steps 1501 and 1504 in the embodiment shown in FIG. 15. Details are not described herein again.

The processor 1732 is configured to perform processing steps and functions of the first node described in the embodiments shown in FIG. 2 to FIG. 15. For details, refer to step 201 (processing when the first node is used as a source node) or step 204 (processing when the first node is used as an intermediate node) in the embodiment shown in FIG. 2, step 402 in the embodiment shown in FIG. 4, steps 602, 604, and 605 in the embodiment shown in FIG. 6, steps 702 and 704 in the embodiment shown in FIG. 7, step 802 in the embodiment shown in FIG. 8, step 1002 in the embodiment shown in FIG. 10, steps 1102 and 1104 in the embodiment shown in FIG. 11, step 1202 in the embodiment shown in FIG. 12, steps 1402 and 1404 in the embodiment shown in FIG. 14, and steps 1502 and 1504 in the embodiment shown in FIG. 15. Details are not described herein again.

Then, a detection packet to which detection data is added is sent to a next-hop node of the first node through the physical interface card 1733. For details, refer to step 205 in the embodiment shown in FIG. 2, steps 403 and 404 in the embodiment shown in FIG. 4, step 603 in the embodiment shown in FIG. 6, step 703 in the embodiment shown in FIG. 7, steps 803 and 804 in the embodiment shown in FIG. 8, step 1003 in the embodiment shown in FIG. 10, step 1103 in the embodiment shown in FIG. 11, steps 1203 and 1204 in the embodiment shown in FIG. 12, step 1403 in the embodiment shown in FIG. 14, and step 1503 in the embodiment shown in FIG. 15. Details are not described herein again.

It may be understood that, as shown in FIG. 17, in this embodiment, a plurality of interface boards is included, and a distributed forwarding mechanism is used. In this mechanism, an operation on the interface board 1740 is basically similar to an operation on the interface board 1730. For brevity, details are not described again. In addition, as described above, functions of the network processors 1732 and 1742 in FIG. 17 may be implemented by using ASIC.

In addition, it should be noted that there may be one main control board or a plurality of main control boards. When there is the plurality of main control boards, a primary main control board and a secondary main control board may be included. There may be one or more interface boards, and a device having a stronger data processing capability provides more interface boards. There may also be one or more physical interface cards on the interface board. There may be no switch fabric or there may be one or more switch fabrics. When there is a plurality of switch fabrics, load sharing and redundancy backup may be implemented together. In a centralized forwarding architecture, the device may not need the switch fabric, and the interface board provides a function of processing service data of an entire system. In a distributed forwarding architecture, the device may have at least one switch fabric, and data is exchanged between a plurality of interface boards through the switch fabric, to provide a large-capacity data exchange and processing capability. Therefore, a data access and processing capability of a network device in the distributed architecture is better than that of a device in the centralized architecture. Which architecture is further used depends on a specific networking deployment scenario, and this is not limited herein.

Figure 18:
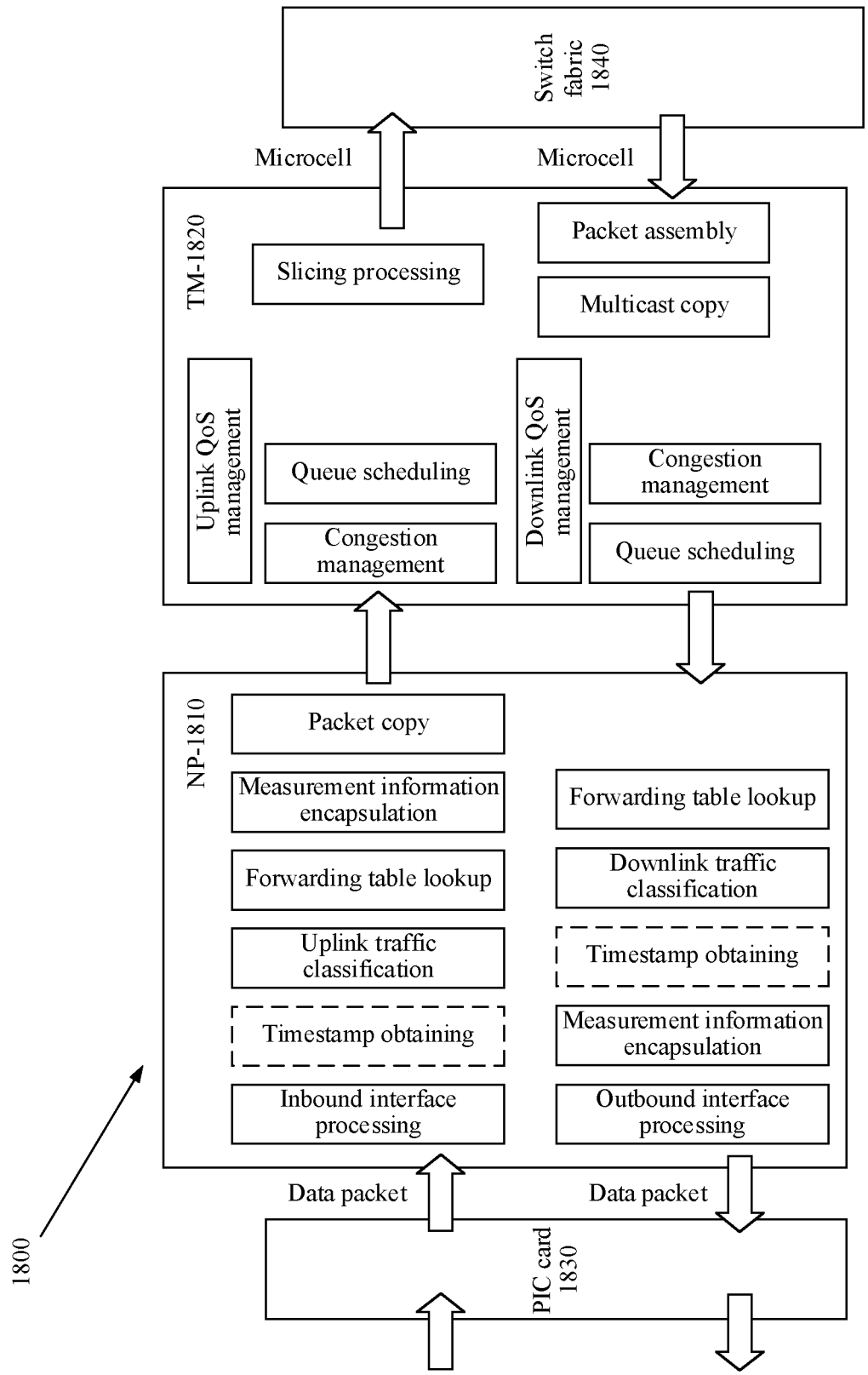
FIG. 18 is a schematic structural diagram of an interface board in a network device shown in FIG. 17 according to an embodiment of this application.

FIG. 18 is a schematic structural diagram of an interface board 1800 in the network device shown in FIG. 17 according to an embodiment of this application. The network device in which the interface board 1800 is located may be the first node in the embodiments shown in FIG. 2 to FIG. 15. The interface board 1800 may include a physical interface card (PIC) 1830, a network processor (NP) 1810, and a traffic management module 1820.

The PIC is configured to implement an interconnection function at a physical layer. Original traffic enters an interface board of a network device through the PIC and a processed packet are sent out through the PIC.

The network processor NP 1810 is configured to implement packet forwarding. Further, processing of an uplink packet includes packet inbound interface processing, timestamp obtaining (applied to the embodiments shown in FIG. 12 to FIG. 15), uplink traffic classification, forwarding table lookup, and measurement information encapsulation (for example, detection data encapsulation in the foregoing embodiments), and packet copy (for example, packet copy for a plurality of next-hop nodes in the foregoing embodiments). Processing of a downlink packet includes forwarding table lookup, downlink traffic classification, timestamp obtaining (applied to the embodiments shown in FIG. 12 to FIG. 15), measurement information encapsulation (for example, detection data encapsulation in the foregoing embodiments), outbound interface processing, and the like.

The traffic management (TM) module is configured to implement functions such as quality of service (QoS), line-rate forwarding, large-capacity buffer, and queue management. Further, uplink traffic management includes uplink QoS processing (such as congestion management and queue scheduling) and slice processing. Downstream traffic management includes packet assembly, multicast replication, and downstream QoS processing (such as congestion management and queue scheduling).

It may be understood that, if a network device has a plurality of interface boards 1800, the plurality of interface boards 1800 may communicate with each other through a switching network 1840.

It should be noted that FIG. 18 shows only a schematic processing procedure or modules in the NP. A processing sequence of the modules in a specific implementation is not limited thereto. In addition, in actual application, another module or processing procedure may be deployed as required. This is not limited in the embodiments of this application.

Figure 19:
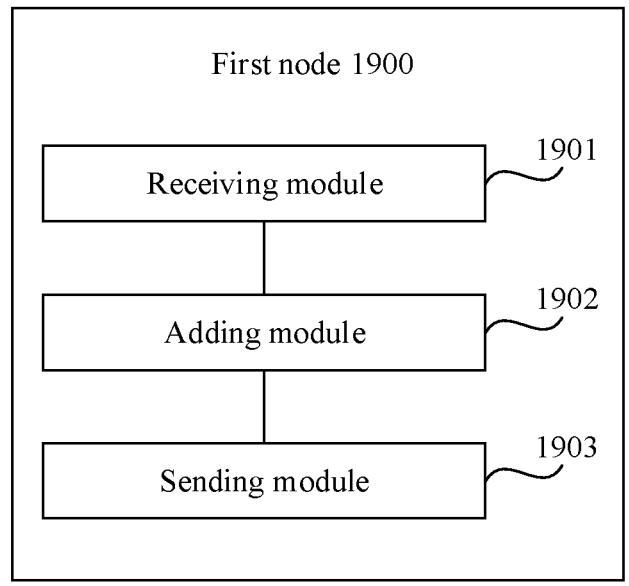
FIG. 19 is a schematic structural diagram of a first node according to an embodiment of this application.

Referring to FIG. 19, an embodiment of this application provides a first node 1900 in a communications network. The first node 1900 may be the first node in the embodiments shown in FIG. 2 to FIG. 9 and FIG. 12 to FIG. 15. The first node 1900 may be a switch, a router, or another network device that forwards a packet. The communications network includes a source node, one or more intermediate nodes, and a destination node, the first node is any one of the one or more intermediate nodes, and the first node 1900 includes a receiving module 1901, an adding module 1902, and a sending module 1904.

The receiving module 1901 is configured to receive a first detection packet including multipath detection indication information and detection data collection indication information, where the multipath detection indication information is used to indicate that the detection packet is used to detect a plurality of paths from the source node to the destination node, and the detection data collection indication information is used to indicate a type of to-be-collected detection data. For a specific implementation process, refer to step 203 in the embodiment shown in FIG. 2, step 401 in the embodiment shown in FIG. 4, step 601 in the embodiment shown in FIG. 6, step 701 in the embodiment shown in FIG. 7, step 801 in the embodiment shown in FIG. 8, step 1201 in the embodiment shown in FIG. 12, step 1401 in the embodiment shown in FIG. 14, and step 1501 in the embodiment shown in FIG. 15. Details are not described herein again.

The adding module 1902 is configured to add detection data to the first detection packet based on the multipath detection indication information and the detection data collection indication information. For a specific implementation process, refer to step 204 in the embodiment shown in FIG. 2, step 402 in the embodiment shown in FIG. 4, step 602 in the embodiment shown in FIG. 6, step 702 in the embodiment shown in FIG. 7, step 802 in the embodiment shown in FIG. 8, step 1202 in the embodiment shown in FIG. 12, step 1402 in the embodiment shown in FIG. 14, and step 1502 in the embodiment shown in FIG. 15. Details are not described herein again.

The sending module 1903 is configured to send, to a next-hop node of the first node, the first detection packet to which the detection data is added. For a specific implementation process, refer to step 205 in the embodiment shown in FIG. 2, step 403 in the embodiment shown in FIG. 4, step 603 in the embodiment shown in FIG. 6, step 703 in the embodiment shown in FIG. 7, step 803 in the embodiment shown in FIG. 8, step 1203 in the embodiment shown in FIG. 12, step 1403 in the embodiment shown in FIG. 14, and step 1503 in the embodiment shown in FIG. 15.

Optionally, the type of to-be-collected detection data is a path topology from the source node to the destination node and/or a packet loss rate on the path from the source node to the destination node. When the type of to-be-collected detection data includes the packet loss rate on the path from the source node to the destination node, the first detection packet further includes a packet sequence number. The first detection data includes an identity of the first node, an identity of an ingress for receiving the first detection packet, and an identity of an egress for sending the first detection packet.

Optionally, when the first node has at least two next-hop nodes to a destination of the first detection packet, and the at least two next-hop nodes include a second node and a third node, the sending module is configured to send, to the second node, the first detection packet to which the identity of the first node, the identity of the ingress for receiving the first detection packet, and an identity of a first egress for sending the first detection packet are added, where the first node is connected to the second node through a first port identified by the identity of the first egress for sending the first detection packet, and send, to the third node, the first detection packet to which the identity of the first node, the identity of the ingress for receiving the first detection packet, and an identity of a second egress for sending the first detection packet are added, where the first node is connected to the third node through a second port identified by the identity of the second egress for sending the first detection packet.

Optionally, when the type of to-be-collected detection data is a path topology from the source node to the destination node and/or a packet loss rate on the path from the source node to the destination node, the detection data includes an identity of the first node and an identity of an egress for sending the first detection packet, and when the type of to-be-collected detection data includes the packet loss rate on the path from the source node to the destination node, the first detection packet further includes a packet sequence number.

The first node further includes a reporting module configured to, when the type of to-be-collected detection data is the path topology from the source node to the destination node, report, to a control node or the source node in the communications network, the identity of the first node, an identity of an ingress for receiving the first detection packet, and detection data added by a previous-hop node of the first node, where the reporting module is alternatively configured to, when the type of to-be-collected detection data includes the packet loss rate on the path from the source node to the destination node, report the identity of the first node, an identity of an ingress for receiving the first detection packet, detection data added by a previous-hop node of the first node, and the packet sequence number to a control node or the source node in the communications network.

Optionally, when the first node has at least two next-hop nodes to a destination of the first detection packet, and the at least two next-hop nodes include a second node and a third node, the sending module is configured to send, to the second node, the first detection packet to which the identity of the first node and an identity of a first egress for sending the first detection packet are added, where the first node is connected to the second node through a first port identified by the identity of the first egress for sending the first detection packet, and send, to the third node, the first detection packet to which the identity of the first node and an identity of a second egress for sending the first detection packet are added, where the first node is connected to the third node through a second port identified by the identity of the second egress for sending the first detection packet.

Optionally, the reporting module is configured to determine whether the first node has at least two next-hop nodes to the destination of the first detection packet, and perform the reporting step when determining that the first node has at least two next-hop nodes to the destination of the first detection packet.

Optionally, when the type of to-be-collected detection data is a smallest MTU on the paths from the source node to the destination node, the adding module is further configured to reserve a smallest MTU after an MTU on a link from the first node to the next-hop node of the first node is compared with an existing MTU in the first detection packet. In this case, the sending module is further configured to send the first detection packet in which the smallest MTU is reserved to the next-hop node of the first node.

Optionally, when the first node has at least two next-hop nodes to a destination of the first detection packet, and the at least two next-hop nodes include a second node and a third node, the sending module is configured to send, to the second node through a first port, the first detection packet to which an MTU on a link from the first node to the second node is added, where the first node is connected to the second node through the first port, and send, to the third node through a second port, the first detection packet to which an MTU on a link from the first node to the third node is added, where the first node is connected to the third node through the second port.

Optionally, when the type of to-be-collected detection data is a smallest MTU on the paths from the source node to the destination node, the detection data includes a smallest MTU on the paths from the first node and the source node.

Optionally, the type of to-be-collected detection data includes a delay on the path from the source node to the destination node, and the detection data includes an identity of the first node, an identity of an ingress for receiving the first detection packet, a timestamp for receiving the first detection packet, an identity of an egress for sending the first detection packet, and a timestamp for sending the first detection packet.

Optionally, when the first node has at least two next-hop nodes to a destination of the first detection packet, and the at least two next-hop nodes include a second node and a third node, the sending module is configured to send, to the second node, the first detection packet to which the identity of the first node, the identity of the ingress for receiving the first detection packet, the timestamp for receiving the first detection packet, an identity of a first egress for sending the first detection packet, and a timestamp for sending the first detection packet through a first port identified by the identity of the first egress are added, where the first node is connected to the second node through the first port, and send, to the third node, the first detection packet to which the identity of the first node, the identity of the ingress for receiving the first detection packet, the timestamp for receiving the first detection packet, an identity of a second egress for sending the first detection packet, and a timestamp for sending the first detection packet through a second port identified by the identity of the second egress are added, where the first node is connected to the third node through the second port.

Optionally, the type of to-be-collected detection data includes a delay on the path from the source node to the destination node, and the detection data includes an identity of the first node, an identity of an egress for sending the first detection packet, and a timestamp for sending the first detection packet.

The first node further includes a reporting module configured to report, to a control node or the source node in the communications network, the identity of the first node, an identity of an ingress for receiving the first detection packet, a timestamp for receiving the first detection packet, and detection data added by a previous-hop node of the first node.

Optionally, when the first node has at least two next-hop nodes to a destination of the first detection packet, and the at least two next-hop nodes include a second node and a third node, the sending module is configured to send, to the second node, the first detection packet to which the identity of the first node, an identity of a first egress for sending the first detection packet, and a timestamp for sending the first detection packet through a first port identified by the identity of the first egress are added, where the first node is connected to the second node through the first port, and send, to the third node, the first detection packet to which the identity of the first node, an identity of a second egress for sending the first detection packet, and a timestamp for sending the first detection packet through a second port identified by the identity of the second egress are added, where the first node is connected to the third node through the second port.

Optionally, the reporting module is configured to determine whether the first node has at least two next-hop nodes to the destination of the first detection packet, and perform the reporting step when determining that the first node has at least two next-hop nodes to the destination of the first detection packet.

Optionally, the first detection packet includes a first instruction and a second instruction, the first instruction carries the multipath detection indication information, and the second instruction carries the detection data collection indication information.

Optionally, the first detection packet includes a first instruction and telemetry indication information, the first instruction carries the multipath detection indication information, and the telemetry indication information carries the detection data collection indication information.

Optionally, the detection data collection indication information includes a node identity, an identity of an ingress for receiving the first detection packet, and an identity of an egress for sending the first detection packet, and is used to indicate that the type of to-be-collected detection data is the path topology from the source node to the destination node and/or the packet loss rate on the path from the source node to the destination node, or the detection data collection indication information includes an MTU, and is used to indicate that the type of to-be-collected detection data is the smallest MTU on the paths from the source node to the destination node, or the detection data collection indication information includes a node identity, an identity of an ingress for receiving the first detection packet, a timestamp for receiving the first detection packet, an identity of an egress for sending the first detection packet, and a timestamp for sending the first detection packet, and is used to indicate that the type of to-be-collected detection data is the delay on the path from the source node to the destination node.

Optionally, the detection data collection indication information includes the type of to-be-collected detection data, and is used to indicate the first node to determine the to-be-collected data based on a correspondence between the type included in the detection data collection indication information and the to-be-collected data.

Optionally, the first detection packet further includes indication information indicating a source address and destination address pair of the packet.

In this application, the source node only needs to send the first detection packet including the multipath detection indication information and the detection data collection indication information, to detect a plurality of paths from the source node to the destination node. Therefore, the source node can detect a path without repeatedly sending a detection packet, thereby improving path detection efficiency. In addition, because the first node directly sends the first detection packet including the multipath detection indication information and the detection data collection indication information to the next-hop node, the next-hop node of the first node collects the detection data in a same manner as the first node, so that no path from the source node to the destination node is missed, thereby improving path detection accuracy.

It should be noted that, when the first node provided in the foregoing embodiments performs path detection, division into the function modules is only used as an example for description. In actual application, the foregoing functions may be allocated to different function modules for implementation as required. In other words, an internal structure of a device is divided into different function modules to implement all or some of the foregoing functions. In addition, the first node provided in the foregoing embodiments is based on a same concept as the embodiments illustrating the data detection method. For a specific implementation process, refer to the method embodiments. Details are not repeatedly described herein.

Figure 20:
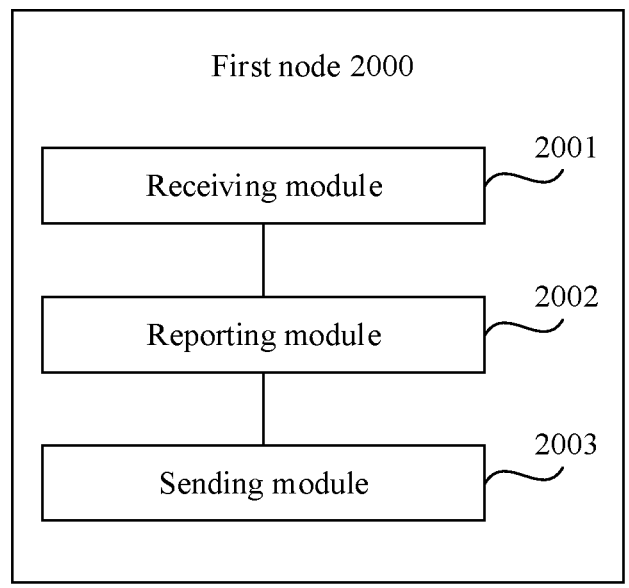
FIG. 20 is a schematic structural diagram of another first node according to an embodiment of this application.

Referring to FIG. 20, an embodiment of this application provides a first node in a communications network. The first node may be the first node 2000 in the embodiments shown in FIG. 10 and FIG. 11. The first node 2000 may be a switch, a router, or another network device that forwards a packet. The communications network includes a source node, one or more intermediate nodes, and a destination node, the first node is any one of the one or more intermediate nodes, and the first node 2000 includes a receiving module 2001, a reporting module 2002, and a sending module 2003.

The receiving module 2001 is configured to receive a first detection packet including multipath detection indication information and detection data collection indication information, where the multipath detection indication information is used to indicate that the detection packet is used to detect a plurality of paths from the source node to the destination node, and the detection data collection indication information is used to indicate that a type of to-be-collected detection data is a smallest MTU on the paths from the source node to the destination node. For a specific implementation process, refer to step 1001 in the embodiment shown in FIG. 10 and step 1101 in the embodiment shown in FIG. 11. Details are not described herein again.

The reporting module 2002 is configured to report, to a control node or the source node in the communications network, an MTU on a link from the first node to a next-hop node of the first node based on the multipath detection indication information and the detection data collection indication information. For a specific implementation process, refer to step 1002 in the embodiment shown in FIG. 10 and step 1102 in the embodiment shown in FIG. 11.

The sending module 2003 is configured to send the received first detection packet to the next-hop node of the first node. For a specific implementation process, refer to step 1003 in the embodiment shown in FIG. 10 and step 1103 in the embodiment shown in FIG. 11.

Optionally, when the first node has at least two next-hop nodes to a destination of the first detection packet, and the at least two next-hop nodes include a second node and a third node, the sending module is configured to send, by the first node, the received first detection packet to the second node through a first port, where the first node is connected to the second node through the first port, and send, by the first node, the received first detection packet to the third node through a second port, where the first node is connected to the third node through the second port.

Optionally, the reporting module is further configured to determine whether the first node has at least two next-hop nodes to the destination of the first detection packet, and when determining that the first node has at least two next-hop nodes to the destination of the first detection packet, perform the step of reporting, to a control node or the source node in the communications network, an MTU on a link from the first node to a next-hop node of the first node based on the multipath detection indication information and the detection data collection indication information. In this case, the first node further includes an adding module configured to report, by the first node, an existing MTU in the first detection packet to the control node or the source node.

Optionally, if the first node has only one next-hop node to the destination of the first detection packet, the adding module is further configured to add an MTU on a link from the first node to the next-hop node of the first node to the first detection packet.

The sending module is further configured to send, to the next-hop node of the first node, the first detection packet to which the MTU on the link from the first node to the next-hop node of the first node is added.

In this application, the source node only needs to send the first detection packet including the multipath detection indication information and the detection data collection indication information, to detect a plurality of paths from the source node to the destination node. Therefore, the source node can detect a path without repeatedly sending a detection packet, thereby improving path detection efficiency. In addition, because the first node directly sends the first detection packet including the multipath detection indication information and the detection data collection indication information to the next-hop node, the next-hop node of the first node collects the detection data in a same manner as the first node, so that no path from the source node to the destination node is missed, thereby improving path detection accuracy.

It should be noted that, when the first node provided in the foregoing embodiments performs path detection, division into the function modules is only used as an example for description. In actual application, the foregoing functions may be allocated to different function modules for implementation as required. In other words, an internal structure of a device is divided into different function modules to implement all or some of the foregoing functions. In addition, the first node provided in the foregoing embodiments is based on a same concept as the embodiments illustrating the data detection method. For a specific implementation process, refer to the method embodiments. Details are not repeatedly described herein.

Figure 21:
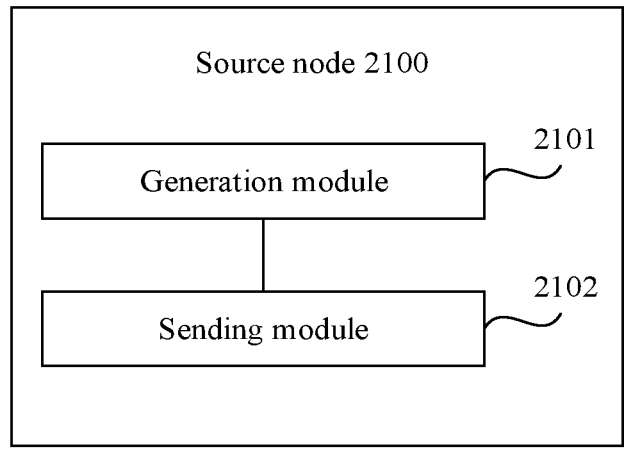
FIG. 21 is a schematic structural diagram of a source node according to an embodiment of this application.

Referring to FIG. 21, an embodiment of this application provides a source node in a communications network. The source node may be the source node 2100 in the embodiments shown in FIG. 2 to FIG. 15. The source node 2100 may be a switch, a router, or another network device that forwards a packet. The communications network includes the source node, one or more intermediate nodes, and a destination node. The source node 2100 includes a generation module 2101 and a sending module 2102.

The generation module 2101 is configured to generate a first detection packet including multipath detection indication information and detection data collection indication information, where the multipath detection indication information is used to indicate that the detection packet is used to detect a plurality of paths from the source node to the destination node, and the detection data collection indication information is used to indicate a type of to-be-collected detection data. For a specific implementation process, refer to step 201 in the embodiment in FIG. 2.

The sending module 2102 is configured to send the first detection packet to a next-hop node of the source node, to indicate the next-hop node of the source node to perform the path detection method in any one of FIG. 4 to FIG. 15. For a specific implementation process, refer to step 202 in the embodiment in FIG. 2.

Optionally, the type of to-be-collected detection data includes one or more of a path topology from the source node to the destination node, a packet loss rate on the path from the source node to the destination node, a smallest MTU on the paths from the source node to the destination node, and a delay on the path from the source node to the destination node.

Optionally, the first detection packet includes a first instruction and a second instruction, the first instruction carries the multipath detection indication information, and the second instruction carries the detection data collection indication information.

Optionally, the first detection packet includes a first instruction and telemetry indication information, the first instruction carries the multipath detection indication information, and the telemetry indication information carries the detection data collection indication information.

Optionally, the detection data collection indication information includes a node identity, an identity of an ingress for receiving the first detection packet, and an identity of an egress for sending the first detection packet, and is used to indicate that the type of to-be-collected detection data is the path topology from the source node to the destination node and/or the packet loss rate on the path from the source node to the destination node, or the detection data collection indication information includes an MTU, and is used to indicate that the type of to-be-collected detection data is the smallest MTU on the paths from the source node to the destination node, or the detection data collection indication information includes a node identity, an identity of an ingress for receiving the first detection packet, a timestamp for receiving the first detection packet, an identity of an egress for sending the first detection packet, and a timestamp for sending the first detection packet, and is used to indicate that the type of to-be-collected detection data is the delay on the path from the source node to the destination node.

In this application, the source node only needs to send the first detection packet including the multipath detection indication information and the detection data collection indication information, to detect a plurality of paths from the source node to the destination node. Therefore, the source node can detect a path without repeatedly sending a detection packet, thereby improving path detection efficiency. In addition, because the first node directly sends the first detection packet including the multipath detection indication information and the detection data collection indication information to the next-hop node, the next-hop node of the first node collects the detection data in a same manner as the first node, so that no path from the source node to the destination node is missed, thereby improving path detection accuracy.

It should be noted that, when the source node provided in the foregoing embodiments performs path detection, division into the function modules is only used as an example for description. In actual application, the foregoing functions may be allocated to different function modules for implementation as required. In other words, an internal structure of a device is divided into different function modules to implement all or some of the foregoing functions. In addition, the source node provided in the foregoing embodiments is based on a same concept as the embodiments illustrating the data detection method. For a specific implementation process, refer to the method embodiments. Details are not repeatedly described herein.

In addition, an embodiment of this application further provides a path detection system. As shown in FIG. 1, the path detection system includes a source node, one or more intermediate nodes, and a destination node. Any one of the one or more intermediate nodes is configured to perform the method according to any one of FIG. 4 to FIG. 15, and the source node is configured to perform step 201 and step 202 in FIG. 2.

Optionally, the path detection system may further include a control node. The control node or the source node is configured to analyze, based on collected detection data, one or more of a path topology from the source node to the destination node, a smallest MTU on paths from the source node to the destination node, a delay on the path from the source node to the destination node, and a packet loss rate on the path from the source node to the destination node.

Related functions of the source node, the intermediate node, the destination node, and the control node in the path detection system are described in detail in the foregoing embodiments, and details are not described herein again.

Figure 22:
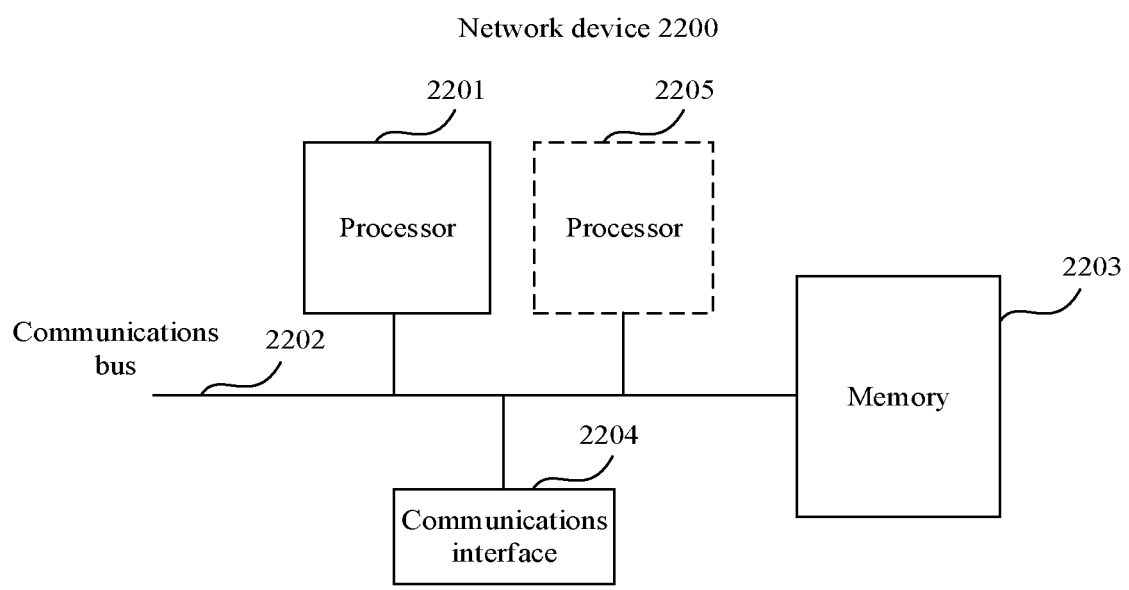
FIG. 22 is a schematic structural diagram of a network device according to an embodiment of this application.

FIG. 22 is a schematic structural diagram of a network device 2200 according to an embodiment of this application. Both the source node and the intermediate node in the embodiments in FIG. 2 to FIG. 15 may be implemented by using the network device 2200 shown in FIG. 22. In this case, the network device 2200 may be a switch, a router, or another network device that forwards a packet. In addition, the destination node and the control node in the embodiments in FIG. 2 to FIG. 15 may also be implemented by the network device 2200 shown in FIG. 22. In this case, for specific functions of the network device 2200, refer to specific implementations of the destination node and the control node in any one of the foregoing embodiments in FIG. 2 to FIG. 15. Details are not described herein again. Referring to FIG. 22, the network device includes at least one processor 2201, a communications bus 2202, a memory 2203, and at least one communications interface 2204.

The processor 2201 may be a general-purpose CPU, a microprocessor, an ASIC, or one or more integrated circuits configured to control program execution of the solutions in this application.

The communications bus 2202 may include a path used to transmit information between the foregoing components.

The memory 2203 may be a ROM or another type of static storage device that can store static information and an instruction, or a RAM or another type of dynamic storage device that can store information and an instruction, or may be an EEPROM, a CD-ROM or another CD storage medium, optical disc storage medium (including a CD, a laser disc, an optical disc, a DVD, a BLU-RAY disc, or the like) and a disk, another magnetic storage device, or any other medium that can be configured to carry or store expected program code in a form of an instruction or a data structure and that is accessible by a computer, but is not limited thereto. The memory 2203 may exist independently, and is connected to the processor 2201 through the communications bus 2202. The memory 2203 may alternatively be integrated with the processor 2201.

The memory 2203 is configured to store program code, and the processor 2201 controls execution of the program code, to perform the path detection method provided in any one of the foregoing embodiments. The processor 2201 is configured to execute the program code stored in the memory 2203. The program code may include one or more software modules. Any node in the communications network in FIG. 1 may determine, by using the processor 2201 and one or more software modules in the program code in the memory 2203, data used to develop an application. The one or more software modules may be software modules provided in any one of the embodiments in FIG. 19, FIG. 20, and FIG. 21.

The communications interface 2204 is configured to communicate with another device or a communications network such as the Ethernet, a RAN, or a wireless local area network (WLAN) by using any apparatus such as a transceiver.

In a specific implementation, in an embodiment, the network device may include a plurality of processors such as the processor 2201 and a processor 2205 in FIG. 19. Each of the processors may be a single-core (single-CPU) processor or a multi-core (multi-CPU) processor. The processor herein may refer to one or more devices, circuits, and/or processing cores configured to process data (for example, a computer program instruction).

It may be understood that, when the network device shown in FIG. 22 is the first node in the foregoing method embodiments, in this embodiment, a virtual first node may also be implemented based on a general physical server in combination with a network functions virtualization (NFV) technology. The virtual first node is a virtual router, and a second node, a third node, and an $N^{th}$ node may be virtualized (based on an actual requirement). The virtual first node may be a virtual machine (VM) on which a program used for a message sending function runs, and the virtual machine is deployed on a hardware device (for example, a physical server). The virtual machine is a complete computer system simulated by software, having a complete hardware system function, and running in an isolated environment. After reading this application, with reference to the NFV technology, a person skilled in the art may virtualize a plurality of first nodes having the foregoing functions on the general physical server. Details are not described herein.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A method, comprising:
   receiving, by a first node, a first detection packet comprising multipath detection indication information and detection data collection indication information, wherein the multipath detection indication information indicates that the first detection packet is used to detect a plurality of paths from a source node of a communications network to a destination node of the communications network, and wherein the detection data collection indication information indicates a type of to-be-collected detection data;
   collecting, by the first node, based on the detection data collection indication information, first data corresponding to the type of to-be-collected detection data, wherein the first node has at least two next-hop nodes to the destination node of the first detection packet, and wherein the at least two next-hop nodes comprise a second node and a third node;
   adding, to the first detection packet, a first identity of the first node, a second identity of an ingress interface for receiving the first detection packet, and a fourth identity of a first egress interface for sending a first modified detection packet;
   sending, to the second node, the first modified detection packet to which the first identity, the second identity, and the fourth identity are added, wherein the first node is coupled to the second node through a first port identified by the fourth identity;
   adding, to the first detection packet, the first identity, the second identity, and a fifth identity of a second egress interface for sending a second modified detection packet; and
   sending, to the third node, the second modified detection packet to which the first identity, the second identity, and the fifth identity are added, wherein the first node is coupled to the third node through a second port identified by the fifth identity, wherein the first modified detection packet instructs the second node to collect second data corresponding to the type of to-be-collected detection data and add the second data to the first modified detection packet, wherein the second modified detection packet instructs the third node to collect third data corresponding to the type of to-be-collected detection data and add the third data to the second modified detection packet, and wherein the first node is one of one or more intermediate nodes in the communications network.

2. The method of claim 1, wherein the type of to-be-collected detection data comprises a packet loss rate on a path from the source node to the destination node, and, wherein the first detection packet further comprises a packet sequence number.

3. The method of claim 1, wherein the type of to-be-collected detection data comprises a smallest maximum transmission unit (MTU), and wherein the to-be-collected detection data comprises a first MTU on a first link from the first node to the second node.

4. The method of claim 1, wherein the type of to-be-collected detection data comprises a smallest maximum transmission unit (MTU), and wherein the method further comprises:
   reserving the smallest MTU after comparing an MTU on a link from the first node to the second node with an existing MTU in the first detection packet; and
   sending the first modified detection packet in which the smallest MTU is reserved to the second node.

5. The method of claim 1, wherein the type of to-be-collected detection data comprises a delay on a path from the source node to the destination node, and wherein the to-be-collected detection data comprises a first timestamp for receiving the first detection packet, and a second timestamp for sending the first detection packet.

6. The method of claim 1, wherein the type of to-be-collected detection data comprises a delay on a path from the source node to the destination node, wherein the to-be-collected detection data comprises a first timestamp for sending the first detection packet, and wherein the method further comprises reporting, to a control node in the communications network or the source node, a second timestamp for receiving the first detection packet.

7. A first node, comprising:
   a memory configured to store instructions; and
   one or more processors coupled to the memory and configured to execute the instructions to cause the first node to:
   receive a first detection packet comprising multipath detection indication information and detection data collection indication information, wherein the multipath detection indication information indicates that the first detection packet is used to detect a plurality of paths from a source node in a communications network to a destination node in the communications network, and wherein the detection data collection indication information indicates a type of to-be-collected detection data;
   collect, based on the detection data collection indication information, first data corresponding to the type of to-be-collected detection data, wherein the first node has at least two next-hop nodes to the destination node of the first detection packet, and wherein the at least two next-hop nodes comprise a second node and a third node;
   add, to the first detection packet, a first identity of the first node, a second identity of an ingress interface for receiving the first detection packet, and a fourth identity of a first egress interface for sending a first modified detection packet;
   send, to the second node, the first modified detection packet to which the first identity, the second identity, and the fourth identity are added, wherein the first node is coupled to the second node through a first port identified by the fourth identity;

add, to the first detection packet, the first identity, the second identity, and a fifth identity of a second egress interface for sending a second modified detection packet; and send, to the third node, the second modified detection packet to which the first identity, the second identity, and the fifth identity are added, wherein the first node is coupled to the third node through a second port identified by the fifth identity, wherein the first modified detection packet instructs the second node to collect second data corresponding to the type of to-be-collected detection data and add the second data to the first modified detection packet, wherein the second modified detection packet instructs the third node to collect third data corresponding to the type of to-be-collected detection data and add the third data to the second modified detection packet, and wherein the first node is one of one or more intermediate nodes in the communications network.

8. The first node of claim 7, wherein the type of to-be-collected detection data comprises a packet loss rate on a path from the source node to the destination node, and wherein the first detection packet further comprises a packet sequence number.

9. A computer program product comprising instructions that are stored on a non-transitory computer-readable storage medium and that, when executed by one or more processors, cause a first node to:

receive a first detection packet comprising multipath detection indication information and detection data collection indication information, wherein the multipath detection indication information indicates that the first detection packet is used to detect a plurality of paths from a source node in a communications network to a destination node in the communications network, and wherein the detection data collection indication information indicates a type of to-be-collected detection data;

collect, based on the detection data collection indication information, first data corresponding to the type of to-be-collected detection data, wherein the first node has at least two next-hop nodes to the destination node of the first detection packet, and wherein the at least two next-hop nodes comprise a second node and a third node;

add, to the first detection packet, a first identity of the first node, a second identity of an ingress interface for receiving the first detection packet, and a fourth identity of a first egress interface for sending a first modified detection packet;

send, to the second node, the first modified detection packet to which the first identity, the second identity, and the fourth identity are added, wherein the first node is coupled to the second node through a first port identified by the fourth identity;

add, to the first detection packet, the first identity, the second identity, and a fifth identity of a second egress interface for sending a second modified detection packet; and send, to the third node, the second modified detection packet to which the first identity, the second identity, and the fifth identity are added, wherein the first node is coupled to the third node through a second port identified by the fifth identity, wherein the first modified detection packet instructs the second node to collect second data corresponding to the type of to-be-collected detection data and add the second data to the first modified detection packet, wherein the second modified detection packet instructs the third node to collect third data corresponding to the type of to-be-collected detection data and add the third data to the second modified detection packet, and wherein the first node is one of one or more intermediate nodes in the communications network.

* * * * *